United States Patent
Nguyen et al.

(10) Patent No.: US 12,534,725 B2
(45) Date of Patent: Jan. 27, 2026

(54) METHOD FOR CONTROLLING MICRORNA EXPRESSION

(71) Applicant: The Hong Kong University of Science and Technology, Hong Kong (CN)

(72) Inventors: Tuan Anh Nguyen, Hong Kong (CN); Thuy Linh Nguyen, Hong Kong (CN); Trung Duc Nguyen, Hong Kong (CN); Sheng Bao, Hong Kong (CN); Shaohua Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 974 days.

(21) Appl. No.: 17/597,782

(22) PCT Filed: Jul. 31, 2020

(86) PCT No.: PCT/CN2020/106239
§ 371 (c)(1),
(2) Date: Jan. 24, 2022

(87) PCT Pub. No.: WO2021/023114
PCT Pub. Date: Feb. 11, 2021

(65) Prior Publication Data
US 2022/0220475 A1 Jul. 14, 2022

Related U.S. Application Data

(60) Provisional application No. 62/922,198, filed on Aug. 2, 2019.

(51) Int. Cl.
*C12N 15/113* (2010.01)
*A61K 48/00* (2006.01)

(52) U.S. Cl.
CPC ........ *C12N 15/113* (2013.01); *A61K 48/0066* (2013.01); *C12N 2310/141* (2013.01); *C12N 2310/531* (2013.01); *C12N 2330/50* (2013.01)

(58) Field of Classification Search
CPC ............ C12N 15/113; C12N 2310/141; C12N 2310/531; C12N 15/111; A61K 48/0066
See application file for complete search history.

(56) References Cited

U.S. PATENT DOCUMENTS 7,683,036 B2 * 3/2010 Esau ................ A61P 37/00
536/23.1

FOREIGN PATENT DOCUMENTS

WO   WO-2009150431 A1 * 12/2009 ............. A61P 25/00
WO   WO-2016077689 A1 *  5/2016 ......... A61K 31/7088
WO        2017201248 A1   11/2017

OTHER PUBLICATIONS

Sun, Aberrant microRNA expression in peripheral plasma and mononuclear cells as specific blood-based biomarkers in schizophrenia patients. Journal of Clinical Neuroscience 22 (2015) 570-574 (Year: 2015).*
Huang, Advances in MicroRNA Therapy for Heart Failure Clinical Trials, Preclinical Studies, and Controversies. Cardiovascular Drugs and Therapy 39:221-232 (Year: 2015).*
Sperber, miRNA sensitivity to Drosha levels correlates with pre-miRNA secondary structure. RNA 20:621-631 (Year: 2014).*
Kocerha, Altered microRNA expression in frontotemporal lobar degeneration with TDP-43 pathology caused by progranulin mutations. BMC Genomics 12:527 (Year: 2011).*
Sun, Aberrant microRNA expression in peripheral plasma and mononuclear cells as specific blood-based biomarkers in schizophrenia patients. Journal of Clinical Neuroscience 22: 570-574 (Year: 2015).*
Kim, MicroRNA trends in clinical trials of cancer diagnosis and therapy strategies. Experimental & Molecular Medicine 55:1314-1321 (Year: 2023).*
Seyhan, Trials and Tribulations of MicroRNA Therapeutics. Int. J. Mol. Sci. 25, 1469 (Year: 2024).*
Huang, Advances in MicroRNA Therapy for Heart Failure Clinical Trials, Preclinical Studies, and Controversies. Cardiovascular Drugs and Therapy 39:221-232 (Year: 2025).*
Nguyen, T.L. et. al. The internal loops in the lower stem of primary microRNA transcripts facilitate single cleavage of human Microprocessor. Nucleic Acids Research. Jan. 20, 2020 No. 5 vol. 48 pp. 2579-2593.

* cited by examiner

*Primary Examiner* — J. E. Angell
*Assistant Examiner* — Julio Washington Gomez Rodriguez
(74) *Attorney, Agent, or Firm* — S&F/WEHRW

(57) ABSTRACT

Disclosed are methods of producing single cut precursor microRNA (pre-miRNA) in a host cell from a primary microRNA (pri-miRNA). Also disclosed are method of increasing production levels of single cut precursor microRNA (pre-miRNA) and decreasing production levels of double cut precursor microRNA (pre-miRNA) in a host cell from a primary microRNA (pri-miRNA); a method of decreasing production levels of single cut precursor microRNA (pre-miRNA) and increasing production of double cut precursor microRNA (pre-miRNA) in a host cell from a primary microRNA (pri-miRNA); a method of modulating expression levels of microRNA (miRNA) in a host cell; a method of modulating expression levels of microRNA (miRNA) in a subject; a method of treating a disease in a subject. Also disclosed herein is a genetically modified primary microRNA (pri-miRNA).

16 Claims, 12 Drawing Sheets
Specification includes a Sequence Listing.

A

B

A

A

Pri-mir-92a-1

AIL3/8

AIL3/9

AIL3/6 (WT)

AIL3/3

AIL2/2

AIL1/1

B

A

Pri-mir-133a-1, AIL3/3 (WT)

AIL0/0

AIL7/3

AIL3/7

B

Pri-mir-133a-1

E

Pri-mir-204, AIL3/3 (WT)

AIL1/1

AIL3/5

F

G

Pri-mir-181a-1, AIL2/2 (WT)

AIL0/0

AIL2/5

H

A

Pri-mir-216a, AIL2/1 (WT)

AIL0/0

AIL2/2

AIL6/2

AIL8/2

B

A

B

A

B

C

SEQUENCE LISTING

<160> NUMBER OF SEQ ID NOS: 121

<210> SEQ ID NO 1
<211> LENGTH: 105
<212> TYPE: RNA
<213> ORGANISM: Artificial Sequence
<220> FEATURE:
<223> OTHER INFORMATION: Pri-mir-92a-1; Pri-mir-92a-1 AIL3/6 (WT)

<400> SEQUENCE: 1
gggaaacuca aaccccuuuc uacacagguu gggaucgguu gcaaugcugu guuucuguau      60
gguauugcac uugcccggc cuguugaguu ugguggggau uguga                     105

<210> SEQ ID NO 2
<211> LENGTH: 25
<212> TYPE: RNA
<213> ORGANISM: Artificial Sequence
<220> FEATURE:
<223> OTHER INFORMATION: Pri-mir-92a-1 F1; Pri-mir-92a-1 AIL3/6 (WT) F1;
      Pri-mir-92a-1 AIL3/8 F1; Pri-mir-92a-1 AIL3/9 F1; Pri-mir-92a-1
      AIL3/3 F1; Pri-mir-92a-1 AIL2/2 F1; Pri-mir-92a-1 AIL1/1 F1

<400> SEQUENCE: 2
gggaaacuca aaccccuuuc uacac                                           25

<210> SEQ ID NO 3
<211> LENGTH: 59
<212> TYPE: RNA
<213> ORGANISM: Artificial Sequence
<220> FEATURE:
<223> OTHER INFORMATION: Pri-mir-92a-1 F2; Pri-mir-92a-1 AIL3/8 F2;
      Pri-mir-92a-1 AIL3/9 F2; Pri-mir-92a-1 AIL3/6 (WT) F2; Pri-mir-
      92a-1 AIL3/3 F2; Pri-mir-92a-1 AIL2/2 F2; Pri-mir-92a-1 AIL1/1 F2

<400> SEQUENCE: 3
agguugggau cgguugcaau gcuguguuuc uguaugguau ugcacuuguc ccggccugu      59

<210> SEQ ID NO 4
<211> LENGTH: 21
<212> TYPE: RNA
<213> ORGANISM: Artificial Sequence
<220> FEATURE:
<223> OTHER INFORMATION: Pri-mir-92a-1 F3; Pri-mir-92a-1 AIL3/6 (WT) F3

<400> SEQUENCE: 4
ugaguuuggu ggggauugug a                                               21

<210> SEQ ID NO 5
<211> LENGTH: 109
<212> TYPE: RNA
<213> ORGANISM: Artificial Sequence
<220> FEATURE:

```
<223> OTHER INFORMATION: Pri-mir-216a; Pri-mir-216a AIL2/1 (WT)

<400> SEQUENCE: 5
ggguaacagg auggcuguga guuggcuuaa ucucagcugg caacugugag auguucauac      60
aaucccucac aggucucu gggauuaugc uaaacagagc aauuccua                    109

<210> SEQ ID NO 6
<211> LENGTH: 27
<212> TYPE: RNA
<213> ORGANISM: Artificial Sequence
<220> FEATURE:
<223> OTHER INFORMATION: Pri-mir-216 F1; Pri-mir-216a AIL2/1 (WT) F1;
      Pri-mir-216a AIL2/2 F1

<400> SEQUENCE: 6
ggguaacagg auggcuguga guuggcu                                          27

<210> SEQ ID NO 7
<211> LENGTH: 61
<212> TYPE: RNA
<213> ORGANISM: Artificial Sequence
<220> FEATURE:
<223> OTHER INFORMATION: Pri-mir-216a F2; Pri-mir-216a AIL2/1 (WT) F2;
      Pri-mir-216a AIL0/0 F2; Pri-mir-216a AIL2/2 F2; Pri-mir-216a
      AIL6/2 F2;  Pri-mir-216a AIL8/2 F2

<400> SEQUENCE: 7
uaaucucagc uggcaacugu gagauguuca uacaaucccu cacagugguc ucgggauua      60 u                                                                     61

<210> SEQ ID NO 8
<211> LENGTH: 21
<212> TYPE: RNA
<213> ORGANISM: Artificial Sequence
<220> FEATURE:
<223> OTHER INFORMATION: Pri-mir-216a F3; Pri-mir-216a AIL2/1 (WT) F3

<400> SEQUENCE: 8
gcuaaacaga gcaauuuccu a                                                21

<210> SEQ ID NO 9
<211> LENGTH: 108
<212> TYPE: RNA
<213> ORGANISM: Artificial Sequence
<220> FEATURE:
<223> OTHER INFORMATION: Pri-mir-217; Pri-mir-217 AIL3/3 (WT)

<400> SEQUENCE: 9
gggauuacau aguuuugau gucgcagaua cugcaucagg aacugauugg auaagaauca       60
gucaccauca guuccuaaug cauugccuuc agcaucuaaa caagcacc                  108

<210> SEQ ID NO 10
<211> LENGTH: 28
<212> TYPE: RNA
<213> ORGANISM: Artificial Sequence
<220> FEATURE:
<223> OTHER INFORMATION: Pri-mir-217 F1; Pri-mir-217 AIL3/3 (WT) F1;
      Pri-mir-217 AIL0/0 F1

<400> SEQUENCE: 10
gggauuacau aguuuugau gucgcaga                                          28

<210> SEQ ID NO 11
<211> LENGTH: 59
```

```
<212> TYPE: RNA
<213> ORGANISM: Artificial Sequence
<220> FEATURE:
<223> OTHER INFORMATION: Pri-mir-217 F2; Pri-mir-217 AIL3/3 (WT) F2;
      Pri-mir-217 AIL0/0 F2; Pri-mir-217 AIL5/3 F2

<400> SEQUENCE: 11
uacugcauca ggaacugauu ggauaagaau cagucaccau caguuccuaa ugcauugcc      59

<210> SEQ ID NO 12
<211> LENGTH: 21
<212> TYPE: RNA
<213> ORGANISM: Artificial Sequence
<220> FEATURE:
<223> OTHER INFORMATION: Pri-mir-217 F3; Pri-mir-217 AIL3/3 (WT) F3;
      Pri-mir-217 AIL5/3 F3

<400> SEQUENCE: 12
uucagcaucu aaacaagcac c                                               21

<210> SEQ ID NO 13
<211> LENGTH: 41
<212> TYPE: RNA
<213> ORGANISM: Artificial Sequence
<220> FEATURE:
<223> OTHER INFORMATION: Pri-mir-217 unproductive product 1; Pri-mir-217
      AIL3/3 (WT) unproductive product 1; Pri-mir-217 AIL0/0
      unproductive product 1

<400> SEQUENCE: 13
gggauuacau aguuuuugau gucgcagaua cugcaucagg a                         41

<210> SEQ ID NO 14
<211> LENGTH: 33
<212> TYPE: RNA
<213> ORGANISM: Artificial Sequence
<220> FEATURE:
<223> OTHER INFORMATION: Pri-mir-217 unproductive product 2; Pri-mir-217
      AIL3/3 (WT) unproductive product 2; Pri-mir-217 AIL0/0
      unproductive product 2; Pri-mir-217 AIL5/3 unproductive product 2

<400> SEQUENCE: 14
acugauugga uaagaaucag ucaccaucag uuc                                  33

<210> SEQ ID NO 15
<211> LENGTH: 34
<212> TYPE: RNA
<213> ORGANISM: Artificial Sequence
<220> FEATURE:
<223> OTHER INFORMATION: Pri-mir-217 unproductive product 3; Pri-mir-217
      AIL3/3 (WT) unproductive product 3; Pri-mir-217 AIL5/3
      unproductive product 3

<400> SEQUENCE: 15
cuaaugcauu gccuucagca ucuaaacaag cacc                                 34

<210> SEQ ID NO 16
<211> LENGTH: 105
<212> TYPE: RNA
<213> ORGANISM: Artificial Sequence
<220> FEATURE:
<223> OTHER INFORMATION: Pri-mir-654

<400> SEQUENCE: 16
gggagcccuc caggguaagu ggaaagaugg ugggccgcag aacaugugcu gaguucgugc      60
cauaugucug cugaccauca ccuuuagaag cccccuuucg cugag                    105
```

```
<210> SEQ ID NO 17
<211> LENGTH: 27
<212> TYPE: RNA
<213> ORGANISM: Artificial Sequence
<220> FEATURE:
<223> OTHER INFORMATION: Pri-mir-654 F1

<400> SEQUENCE: 17
gggagcccuc caggguaagu ggaaaga                                          27

<210> SEQ ID NO 18
<211> LENGTH: 57
<212> TYPE: RNA
<213> ORGANISM: Artificial Sequence
<220> FEATURE:
<223> OTHER INFORMATION: Pri-mir-654 F2

<400> SEQUENCE: 18 ugugggccg cagaacaugu gcugaguucg ugccauaugu cugcugacca ucaccuu         57

<210> SEQ ID NO 19
<211> LENGTH: 21
<212> TYPE: RNA
<213> ORGANISM: Artificial Sequence
<220> FEATURE:
<223> OTHER INFORMATION: Pri-mir-654 F3

<400> SEQUENCE: 19
uagaagcccc cuuucgcuga g                                               21

<210> SEQ ID NO 20
<211> LENGTH: 40
<212> TYPE: RNA
<213> ORGANISM: Artificial Sequence
<220> FEATURE:
<223> OTHER INFORMATION: Pri-mir-654 unproductive product 1

<400> SEQUENCE: 20
gggagcccuc caggguaagu ggaaagaugg ugggccgcag                            40

<210> SEQ ID NO 21
<211> LENGTH: 29
<212> TYPE: RNA
<213> ORGANISM: Artificial Sequence
<220> FEATURE:
<223> OTHER INFORMATION: Pri-mir-654 unproductive product 2

<400> SEQUENCE: 21
aacaugugcu gaguucgugc cauaugucu                                        29

<210> SEQ ID NO 22
<211> LENGTH: 36
<212> TYPE: RNA
<213> ORGANISM: Artificial Sequence
<220> FEATURE:
<223> OTHER INFORMATION: Pri-mir-654 unproductive product 3

<400> SEQUENCE: 22
gcugaccauc accuuuagaa gcccccuuuc gcugag                                36

<210> SEQ ID NO 23
<211> LENGTH: 107
<212> TYPE: RNA
<213> ORGANISM: Artificial Sequence
<220> FEATURE:
<223> OTHER INFORMATION: Pri-mir-200b
```

<400> SEQUENCE: 23
gggcggaccc agcucgggca gccguggcca ucuuacuggg cagcauugga uggagucagg    60
ucucuaauac ugccugguaa ugaugacggc ggagcccugc acgcagc                107

<210> SEQ ID NO 24
<211> LENGTH: 29
<212> TYPE: RNA
<213> ORGANISM: Artificial Sequence
<220> FEATURE:
<223> OTHER INFORMATION: Pri-mir-200b F1

<400> SEQUENCE: 24
gggcggaccc agcucgggca gccguggcc                                     29

<210> SEQ ID NO 25
<211> LENGTH: 57
<212> TYPE: RNA
<213> ORGANISM: Artificial Sequence
<220> FEATURE:
<223> OTHER INFORMATION: Pri-mir-200b F2

<400> SEQUENCE: 25
aucuuacugg gcagcauugg auggagucag gucucuaaua cugccgguaa augauga      57

<210> SEQ ID NO 26
<211> LENGTH: 21
<212> TYPE: RNA
<213> ORGANISM: Artificial Sequence
<220> FEATURE:
<223> OTHER INFORMATION: Pri-mir-200b F3

<400> SEQUENCE: 26
cggcggagcc cugcacgcag c                                             21

<210> SEQ ID NO 27
<211> LENGTH: 198
<212> TYPE: RNA
<213> ORGANISM: Artificial Sequence
<220> FEATURE:
<223> OTHER INFORMATION: Pri-let-7e

<400> SEQUENCE: 27
gggcccuccc ccucaucccu gguccuccug gucccugucu gucugucugu cgggucuguc    60
caccugccgc gcccccgggc ugagguagga gguuguaua guugaggagg acacccaagg   120
agaucacuau acggccuccu agcuuucccc aggcugcgcc cugcacggga cggggcccgg   180
cggggacccc cagcccca                                                198

<210> SEQ ID NO 28
<211> LENGTH: 81
<212> TYPE: RNA
<213> ORGANISM: Artificial Sequence
<220> FEATURE:
<223> OTHER INFORMATION: Pri-let-7e F1

<400> SEQUENCE: 28
gggcccuccc ccucaucccu gguccuccug gucccugucu gucugucugu cgggucuguc    60
caccugccgc gcccccggg c                                              81

<210> SEQ ID NO 29
<211> LENGTH: 67
<212> TYPE: RNA

```
<213> ORGANISM: Artificial Sequence
<220> FEATURE:
<223> OTHER INFORMATION: Pri-let-7e F2

<400> SEQUENCE: 29
ugagguagga gguuguauag uugaggagga cacccaagga gaucacuaua cggccuccua    60
gcuuucc                                                             67

<210> SEQ ID NO 30
<211> LENGTH: 50
<212> TYPE: RNA
<213> ORGANISM: Artificial Sequence
<220> FEATURE:
<223> OTHER INFORMATION: Pri-let-7e F3

<400> SEQUENCE: 30
ccaggcugcg cccugcacgg gacggggccc ggcggggacc cccagcccca              50

<210> SEQ ID NO 31
<211> LENGTH: 190
<212> TYPE: RNA
<213> ORGANISM: Artificial Sequence
<220> FEATURE:
<223> OTHER INFORMATION: Pri-mir-100

<400> SEQUENCE: 31
ggguuggauu aaugguugua auauuuuauu uucagacaug ucacagcccc aaaagagaga   60
agauauugag gccuguugcc acaaacccgu agaccgaac uuguggauu aguccgcaca    120 agcuuguauc uauagguaug ugucuguuag gcaaucucac ggaccugggg cuuugcuuau  180
augccauuca                                                        190

<210> SEQ ID NO 32
<211> LENGTH: 83
<212> TYPE: RNA
<213> ORGANISM: Artificial Sequence
<220> FEATURE:
<223> OTHER INFORMATION: Pri-mir-100 F1

<400> SEQUENCE: 32
ggguuggauu aaugguugua auauuuuauu uucagacaug ucacagcccc aaaagagaga   60
agauauugag gccuguugcc aca                                           83

<210> SEQ ID NO 33
<211> LENGTH: 57
<212> TYPE: RNA
<213> ORGANISM: Artificial Sequence
<220> FEATURE:
<223> OTHER INFORMATION: Pri-mir-100 F2

<400> SEQUENCE: 33
aacccguaga uccgaacuug ugguauuagu ccgcacaagc uuguaucuau agguaug      57

<210> SEQ ID NO 34
<211> LENGTH: 50
<212> TYPE: RNA
<213> ORGANISM: Artificial Sequence
<220> FEATURE:
<223> OTHER INFORMATION: Pri-mir-100 F3

<400> SEQUENCE: 34
ugucuguuag gcaaucucac ggaccugggg cuuugcuuau augccauuca              50
```

```
<210> SEQ ID NO 35
<211> LENGTH: 193
<212> TYPE: RNA
<213> ORGANISM: Artificial Sequence
<220> FEATURE:
<223> OTHER INFORMATION: Pri-mir-29a

<400> SEQUENCE: 35
gggaaagagc ccaauguaug cuggauuuag uaagauuugg gcccucccaa cccucacgac      60
cuucugugac cccuuagagg augacugauu ucuuuuggug uucagaguca auauaauuuu     120
cuagcaccau cugaaaucgg uuauaaugau uggggaagag caccaugaug cugacugcug     180
agaggaaaug uau                                                        193

<210> SEQ ID NO 36
<211> LENGTH: 83
<212> TYPE: RNA
<213> ORGANISM: Artificial Sequence
<220> FEATURE:
<223> OTHER INFORMATION: Pri-mir-29a F1

<400> SEQUENCE: 36
gggaaagagc ccaauguaug cuggauuuag uaagauuugg gcccucccaa cccucacgac      60
cuucugugac cccuuagagg aug                                              83

<210> SEQ ID NO 37
<211> LENGTH: 60
<212> TYPE: RNA
<213> ORGANISM: Artificial Sequence
<220> FEATURE:
<223> OTHER INFORMATION: Pri-mir-29a F2

<400> SEQUENCE: 37
acugauuucu uuggguguuc agagucaaua uaauuuucua gcaccaucug aaaucgguua      60

<210> SEQ ID NO 38
<211> LENGTH: 50
<212> TYPE: RNA
<213> ORGANISM: Artificial Sequence
<220> FEATURE:
<223> OTHER INFORMATION: Pri-mir-29a F3

<400> SEQUENCE: 38
uaaugauugg ggaagagcac caugaugcug acugcugaga ggaaauguau                 50

<210> SEQ ID NO 39
<211> LENGTH: 193
<212> TYPE: RNA
<213> ORGANISM: Artificial Sequence
<220> FEATURE:
<223> OTHER INFORMATION: Pri-mir-367

<400> SEQUENCE: 39
ggguguuuga guguggug uccuaccuaa ucagcaauug cguuaacgcc cacacugugu      60
gcaguucuug gcuacaggcc auuacuguug cuaauaugca acucuguuga auauaaauug     120
gaauugcacu uuagcaaugg ugauggauug uuaagccaau gacagaauuu aaaccacaga     180
cuuacuuuga uag                                                        193

<210> SEQ ID NO 40
<211> LENGTH: 83
<212> TYPE: RNA
<213> ORGANISM: Artificial Sequence
<220> FEATURE:
```

<223> OTHER INFORMATION: Pri-mir-367 F1

<400> SEQUENCE: 40 gguguuuga guguggüggu uccuaccuaa ucagcaauug cguuaacgcc cacacugugu    60
gcaguucuug gcuacaggcc auu    83

<210> SEQ ID NO 41
<211> LENGTH: 60
<212> TYPE: RNA
<213> ORGANISM: Artificial Sequence
<220> FEATURE:
<223> OTHER INFORMATION: Pri-mir-367 F2

<400> SEQUENCE: 41
acuguugcua auaugcaacu cguugaauua uaaauuggaa uugcacuuua gcaaugguga    60

<210> SEQ ID NO 42
<211> LENGTH: 50
<212> TYPE: RNA
<213> ORGANISM: Artificial Sequence
<220> FEATURE:
<223> OTHER INFORMATION: Pri-mir-367 F3

<400> SEQUENCE: 42
uggauuguua agccaaugac agaauuuaaa ccacagacuu acuuugauag    50

<210> SEQ ID NO 43
<211> LENGTH: 194
<212> TYPE: RNA
<213> ORGANISM: Artificial Sequence
<220> FEATURE:
<223> OTHER INFORMATION: Pri-mir-181a-1; Pri-mir-181a-1 AIL2/2 (WT)

<400> SEQUENCE: 43
ggguuucugu cucccauccc cuucagauac uuacagauac uguaaaguga guagaauucu    60
gaguuuugag guugcuucag ugaacauuca acgcugucgg ugaguuugga auuaaaauca    120
aaaccaucga ccguugauug uacccuaugg cuaaccauca ucuacuccau ggugcucaga    180
auucgcugaa gaca    194

<210> SEQ ID NO 44
<211> LENGTH: 82
<212> TYPE: RNA
<213> ORGANISM: Artificial Sequence
<220> FEATURE:
<223> OTHER INFORMATION: Pri-mir-181a-1 F1; Pri-mir-181a-1 AIL2/2 (WT)
      F1; Pri-mir-181a-1 AIL0/0 F1; Pri-mir-181a-1 AIL2/5 F1

<400> SEQUENCE: 44
ggguuucugu cucccauccc cuucagauac uuacagauac uguaaaguga guagaauucu    60
gaguuuugag guugcuucag ug    82

<210> SEQ ID NO 45
<211> LENGTH: 62
<212> TYPE: RNA
<213> ORGANISM: Artificial Sequence
<220> FEATURE:
<223> OTHER INFORMATION: Pri-mir-181a-1 F2; Pri-mir-181a-1 AIL2/2 (WT)
      F2; Pri-mir-181a-1 AIL0/0 F2; Pri-mir-181a-1 AIL2/5 F2

<400> SEQUENCE: 45
aacauucaac gcugucggug aguuuggaau uaaaaucaaa accaucgacc guugauugua    60
cc    62

<210> SEQ ID NO 46
<211> LENGTH: 50
<212> TYPE: RNA
<213> ORGANISM: Artificial Sequence
<220> FEATURE:
<223> OTHER INFORMATION: Pri-mir-181a-1 F3; Pri-mir-181a-1 AIL2/2 (WT)
    F3

<400> SEQUENCE: 46
cuauggcuaa ccaucaucua cuccauggug cucagaauuc gcugaagaca         50

<210> SEQ ID NO 47
<211> LENGTH: 194
<212> TYPE: RNA
<213> ORGANISM: Artificial Sequence
<220> FEATURE:
<223> OTHER INFORMATION: Pri-mir-19b-1

<400> SEQUENCE: 47
gggaaguacu gcuagcugua gaacuccagc uucggccugu cgcccaauca aacuguccug    60
uuacugaaca cuguucuaug guuaguuuug cagguuugca uccagcugug ugauauucug   120
cugugcaaau ccaugcaaaa cugacugugg uagugaaaag ucuagaaaa aguaagggaa   180 acucaaaccc cuuu                                                    194

<210> SEQ ID NO 48
<211> LENGTH: 83
<212> TYPE: RNA
<213> ORGANISM: Artificial Sequence
<220> FEATURE:
<223> OTHER INFORMATION: Pri-mir-19b-1 F1

<400> SEQUENCE: 48
gggaaguacu gcuagcugua gaacuccagc uucggccugu cgcccaauca aacuguccug    60
uuacugaaca cuguucuaug guu                                           83

<210> SEQ ID NO 49
<211> LENGTH: 61
<212> TYPE: RNA
<213> ORGANISM: Artificial Sequence
<220> FEATURE:
<223> OTHER INFORMATION: Pri-mir-19b-1 F2

<400> SEQUENCE: 49
aguuuugcag guuugcaucc agcuguguga uauucugcug ugcaaaucca ugcaaaacug    60
a                                                                   61

<210> SEQ ID NO 50
<211> LENGTH: 50
<212> TYPE: RNA
<213> ORGANISM: Artificial Sequence
<220> FEATURE:
<223> OTHER INFORMATION: Pri-mir-19b-1 F3

<400> SEQUENCE: 50
cugugguagu gaaaagucug uagaaaagua agggaaacuc aaaccccuuu              50

<210> SEQ ID NO 51
<211> LENGTH: 107
<212> TYPE: RNA
<213> ORGANISM: Artificial Sequence
<220> FEATURE:
<223> OTHER INFORMATION: Pri-mir-92a-1 AIL3/8

<400> SEQUENCE: 51
gggaaacuca aaccccuuuc uacacagguu gggaucgguu gcaaugcugu guuucuguau    60
gguauugcac uugucccggc cguugaguu uuuggugggg auuguga    107

<210> SEQ ID NO 52
<211> LENGTH: 23
<212> TYPE: RNA
<213> ORGANISM: Artificial Sequence
<220> FEATURE:
<223> OTHER INFORMATION: Pri-mir-92a-1 AIL3/8 F3

<400> SEQUENCE: 52
ugaguuuuug gugggauug uga    23

<210> SEQ ID NO 53
<211> LENGTH: 108
<212> TYPE: RNA
<213> ORGANISM: Artificial Sequence
<220> FEATURE:
<223> OTHER INFORMATION: Pri-mir-92a-1 AIL3/9

<400> SEQUENCE: 53
gggaaacuca aaccccuuuc uacacagguu gggaucgguu gcaaugcugu guuucuguau    60
gguauugcac uugucccggc cguugaguu uuuggugggg gauuguga    108

<210> SEQ ID NO 54
<211> LENGTH: 24
<212> TYPE: RNA
<213> ORGANISM: Artificial Sequence
<220> FEATURE:
<223> OTHER INFORMATION: Pri-mir-92a-1 AIL3/9 F3

<400> SEQUENCE: 54
ugaguuuuuu ggugggauu guga    24

<210> SEQ ID NO 55
<211> LENGTH: 102
<212> TYPE: RNA
<213> ORGANISM: Artificial Sequence
<220> FEATURE:
<223> OTHER INFORMATION: Pri-mir-92a-1 AIL3/3

<400> SEQUENCE: 55
gggaaacuca aaccccuuuc uacacagguu gggaucgguu gcaaugcugu guuucuguau    60
gguauugcac uugucccggc cguugaguu uggggauugu ga    102

<210> SEQ ID NO 56
<211> LENGTH: 18
<212> TYPE: RNA
<213> ORGANISM: Artificial Sequence
<220> FEATURE:
<223> OTHER INFORMATION: Pri-mir-92a-1 AIL3/3 F3

<400> SEQUENCE: 56
ugaguuuggg gauuguga    18

<210> SEQ ID NO 57
<211> LENGTH: 102
<212> TYPE: RNA
<213> ORGANISM: Artificial Sequence
<220> FEATURE:
<223> OTHER INFORMATION: Pri-mir-92a-1 AIL2/2

```
<400> SEQUENCE: 57
gggaaacuca aacccccuuuc uacacagguu gggaucgguu gcaaugcugu guuucuguau      60
gguauugcac uugucccggc cuguugaguu gggggauugu ga                         102

<210> SEQ ID NO 58
<211> LENGTH: 18
<212> TYPE: RNA
<213> ORGANISM: Artificial Sequence
<220> FEATURE:
<223> OTHER INFORMATION: Pri-mir-92a-1 AIL2/2 F3

<400> SEQUENCE: 58
ugaguugggg gauuguga                                                    18

<210> SEQ ID NO 59
<211> LENGTH: 102
<212> TYPE: RNA
<213> ORGANISM: Artificial Sequence
<220> FEATURE:
<223> OTHER INFORMATION: Pri-mir-92a-1 AIL1/1

<400> SEQUENCE: 59
gggaaacuca aacccccuuuc uacacagguu gggaucgguu gcaaugcugu guuucuguau      60
gguauugcac uugucccggc cuguugaggg uggggauugu ga                         102

<210> SEQ ID NO 60
<211> LENGTH: 18
<212> TYPE: RNA
<213> ORGANISM: Artificial Sequence
<220> FEATURE:
<223> OTHER INFORMATION: Pri-mir-92a-1 AIL1/1 F3

<400> SEQUENCE: 60 ugagggugggg gauuguga                                                   18

<210> SEQ ID NO 61
<211> LENGTH: 107
<212> TYPE: RNA
<213> ORGANISM: Artificial Sequence
<220> FEATURE:
<223> OTHER INFORMATION: Pri-mir-133a-1 AIL3/3 (WT)

<400> SEQUENCE: 61
gggcuagcag cacuacaaug cuuugcuaga gcugguaaaa uggaaccaaa ucgccucuuc       60
aauggauuug gucccccuuca accagcugua gcuaugcauu gauuacu                   107

<210> SEQ ID NO 62
<211> LENGTH: 29
<212> TYPE: RNA
<213> ORGANISM: Artificial Sequence
<220> FEATURE:
<223> OTHER INFORMATION: Pri-mir-133a-1 AIL3/3 (WT) F1; Pri-mir-133a-1
      AIL3/7 F1

<400> SEQUENCE: 62
gggcuagcag cacuacaaug cuuugcuag                                        29

<210> SEQ ID NO 63
<211> LENGTH: 59
<212> TYPE: RNA
<213> ORGANISM: Artificial Sequence
<220> FEATURE:
<223> OTHER INFORMATION: Pri-mir-133a-1 AIL3/3 (WT) F2; Pri-mir-133a-1
      AIL0/0 F2; Pri-mir-133a-1 AIL7/3 F2
```

<400> SEQUENCE: 63
agcugguaaa auggaaccaa aucgccucuu caauggauuu gguccccuuc aaccagcug        59

<210> SEQ ID NO 64
<211> LENGTH: 19
<212> TYPE: RNA
<213> ORGANISM: Artificial Sequence
<220> FEATURE:
<223> OTHER INFORMATION: Pri-mir-133a-1 AIL3/3 (WT) F3; Pri-mir-133a-1
      AIL0/0 F3; Pri-mir-133a-1 AIL7/3 F3

<400> SEQUENCE: 64
uagcuaugca uugauuacu                                                   19

<210> SEQ ID NO 65
<211> LENGTH: 41
<212> TYPE: RNA
<213> ORGANISM: Artificial Sequence
<220> FEATURE:
<223> OTHER INFORMATION: Pri-mir-133a-1 AIL3/3 (WT) unproductive product
      1; Pri-mir-133a-1 AIL3/7 unproductive product 1

<400> SEQUENCE: 65
gggcuagcag cacuacaaug cuuugcuaga gcugguaaaa u                           41

<210> SEQ ID NO 66
<211> LENGTH: 36
<212> TYPE: RNA
<213> ORGANISM: Artificial Sequence
<220> FEATURE:
<223> OTHER INFORMATION: Pri-mir-133a-1 AIL3/3 (WT) unproductive product
      2; Pri-mir-133a-1 AIL0/0 unproductive product 2; Pri-mir-133a-1
      AIL7/3 unproductive product 2; Pri-mir-133a-1 AIL3/7 unproductive
      product 2

<400> SEQUENCE: 66
ggaaccaaau cgccucuuca auggauuugg uccccu                                 36

<210> SEQ ID NO 67
<211> LENGTH: 30
<212> TYPE: RNA
<213> ORGANISM: Artificial Sequence
<220> FEATURE:
<223> OTHER INFORMATION: Pri-mir-133a-1 AIL3/3 (WT) unproductive product
      3; Pri-mir-133a-1 AIL0/0 unproductive product 3; Pri-mir-133a-1
      AIL7/3 unproductive product 3

<400> SEQUENCE: 67
ucaaccagcu guagcuaugc auugauuacu                                        30

<210> SEQ ID NO 68
<211> LENGTH: 107
<212> TYPE: RNA
<213> ORGANISM: Artificial Sequence
<220> FEATURE:
<223> OTHER INFORMATION: Pri-mir-133a-1 AIL0/0

<400> SEQUENCE: 68
gggcuagcag cacuacaaug cguagcuaga gcugguaaaa uggaaccaaa ucgccucuuc        60
aauggauuug guccccuuca accagcugua gcuaugcauu gauuacu                    107

<210> SEQ ID NO 69
<211> LENGTH: 29
<212> TYPE: RNA
<213> ORGANISM: Artificial Sequence

```
<220> FEATURE:
<223> OTHER INFORMATION: Pri-mir-133a-1 AIL0/0 F1

<400> SEQUENCE: 69
gggcuagcag cacuacaaug cguagcuag                                        29

<210> SEQ ID NO 70
<211> LENGTH: 41
<212> TYPE: RNA
<213> ORGANISM: Artificial Sequence
<220> FEATURE:
<223> OTHER INFORMATION: Pri-mir-133a-1 AIL0/0 unproductive product 1

<400> SEQUENCE: 70
gggcuagcag cacuacaaug cguagcuaga gcugguaaaa u                          41

<210> SEQ ID NO 71
<211> LENGTH: 111
<212> TYPE: RNA
<213> ORGANISM: Artificial Sequence
<220> FEATURE:
<223> OTHER INFORMATION: Pri-mir-133a-1 AIL7/3

<400> SEQUENCE: 71
gggcuagcag cacuacaaug cuuuuuugc uagagcuggu aaaauggaac caaaucgccu        60
cuucaaugga uuuggucccc uucaaccagc uguagcuaug cauugauuac u              111

<210> SEQ ID NO 72
<211> LENGTH: 33
<212> TYPE: RNA
<213> ORGANISM: Artificial Sequence
<220> FEATURE:
<223> OTHER INFORMATION: Pri-mir-133a-1 AIL7/3 F1

<400> SEQUENCE: 72
gggcuagcag cacuacaaug cuuuuuugc uag                                    33

<210> SEQ ID NO 73
<211> LENGTH: 45
<212> TYPE: RNA
<213> ORGANISM: Artificial Sequence
<220> FEATURE:
<223> OTHER INFORMATION: Pri-mir-133a-1 AIL7/3 unproductive product 1

<400> SEQUENCE: 73
gggcuagcag cacuacaaug cuuuuuugc uagagcuggu aaaau                       45

<210> SEQ ID NO 74
<211> LENGTH: 111
<212> TYPE: RNA
<213> ORGANISM: Artificial Sequence
<220> FEATURE:
<223> OTHER INFORMATION: Pri-mir-133a-1 AIL3/7

<400> SEQUENCE: 74
gggcuagcag cacuacaaug cuuugcuaga gcugguaaaa uggaaccaaa ucgccucuuc      60
aauggauuug gucccccuuca accagcugua gcuuuuaug cauugauuac u              111

<210> SEQ ID NO 75
<211> LENGTH: 58
<212> TYPE: RNA
<213> ORGANISM: Artificial Sequence
<220> FEATURE:
<223> OTHER INFORMATION: Pri-mir-133a-1 AIL3/7 F2
```

```
<400> SEQUENCE: 75
gcugguaaaa uggaaccaaa ucgccucuuc aauggauuug gucccuuca accagcug        58

<210> SEQ ID NO 76
<211> LENGTH: 23
<212> TYPE: RNA
<213> ORGANISM: Artificial Sequence
<220> FEATURE:
<223> OTHER INFORMATION: Pri-mir-133a-1 AIL3/7 F3

<400> SEQUENCE: 76
uagcuuuuua ugcauugauu acu                                            23

<210> SEQ ID NO 77
<211> LENGTH: 34
<212> TYPE: RNA
<213> ORGANISM: Artificial Sequence
<220> FEATURE:
<223> OTHER INFORMATION: Pri-mir-133a-1 AIL3/7 unproductive product 3

<400> SEQUENCE: 77
ucaaccagcu guagcuuuuu augcauugau uacu                                34

<210> SEQ ID NO 78
<211> LENGTH: 108
<212> TYPE: RNA
<213> ORGANISM: Artificial Sequence
<220> FEATURE:
<223> OTHER INFORMATION: Pri-mir-217 AIL0/0

<400> SEQUENCE: 78
gggauuacau aguuuuugau gucgcagaua cugcaucagg aacugauugg auaagaauca    60
gucaccauca guuccuaaug cauugccugc ggcaucuaaa caagcacc                108

<210> SEQ ID NO 79
<211> LENGTH: 21
<212> TYPE: RNA
<213> ORGANISM: Artificial Sequence
<220> FEATURE:
<223> OTHER INFORMATION: Pri-mir-217 AIL0/0 F3

<400> SEQUENCE: 79
ugcggcaucu aaacaagcac c                                              21

<210> SEQ ID NO 80
<211> LENGTH: 34
<212> TYPE: RNA
<213> ORGANISM: Artificial Sequence
<220> FEATURE:
<223> OTHER INFORMATION: Pri-mir-217 AIL0/0 unproductive product 3

<400> SEQUENCE: 80
cuaaugcauu gccugcggca ucuaaacaag cacc                                34

<210> SEQ ID NO 81
<211> LENGTH: 110
<212> TYPE: RNA
<213> ORGANISM: Artificial Sequence
<220> FEATURE:
<223> OTHER INFORMATION: Pri-mir-217 AIL5/3

<400> SEQUENCE: 81
gggauuacau aguuuuugau gucgcuuaga uacugcauca ggaacugauu ggauaagaau    60
cagucaccau caguuccuaa ugcauugccu ucagcaucua aacaagcacc              110
```

<210> SEQ ID NO 82
<211> LENGTH: 30
<212> TYPE: RNA
<213> ORGANISM: Artificial Sequence
<220> FEATURE:
<223> OTHER INFORMATION: Pri-mir-217 AIL5/3 F1

<400> SEQUENCE: 82
gggauuacau aguuuuugau gucgcuuaga                              30

<210> SEQ ID NO 83
<211> LENGTH: 43
<212> TYPE: RNA
<213> ORGANISM: Artificial Sequence
<220> FEATURE:
<223> OTHER INFORMATION: Pri-mir-217 AIL5/3 unproductive product 1

<400> SEQUENCE: 83
gggauuacau aguuuuugau gucgcuuaga uacugcauca gga               43

<210> SEQ ID NO 84
<211> LENGTH: 192
<212> TYPE: RNA
<213> ORGANISM: Artificial Sequence
<220> FEATURE:
<223> OTHER INFORMATION: Pri-mir-204 AIL3/3 (WT)

<400> SEQUENCE: 84
gggagggugg ggguggaggc aagcagagga cuuccugauc gcguacccau ggcuacaguc   60
uuucuucaug ugacucgugg acuucccuuu gucauccuau gccugagaau auaugaagga  120
ggcugggaag gcaaagggac guucaauugu caucacuggc aucuuuuug aucauugcac  180 caucaucaaa ug                                                     192

<210> SEQ ID NO 85
<211> LENGTH: 82
<212> TYPE: RNA
<213> ORGANISM: Artificial Sequence
<220> FEATURE:
<223> OTHER INFORMATION: Pri-mir-204 AIL3/3 (WT) F1; Pri-mir-204 AIL1/1
      F1; Pri-mir-204 AIL3/5 F1

<400> SEQUENCE: 85
gggagggugg ggguggaggc aagcagagga cuuccugauc gcguacccau ggcuacaguc   60
uuucuucaug ugacucgugg ac                                           82

<210> SEQ ID NO 86
<211> LENGTH: 60
<212> TYPE: RNA
<213> ORGANISM: Artificial Sequence
<220> FEATURE:
<223> OTHER INFORMATION: Pri-mir-204 AIL3/3 (WT) F2; Pri-mir-204 AIL1/1
      F2; Pri-mir-204 AIL3/5 F2

<400> SEQUENCE: 86
uucccuuugu cauccuaugc cugagaauau augaaggagg cugggaaggc aaagggacgu   60

<210> SEQ ID NO 87
<211> LENGTH: 50
<212> TYPE: RNA
<213> ORGANISM: Artificial Sequence
<220> FEATURE:
<223> OTHER INFORMATION: Pri-mir-204 AIL3/3 (WT) F3

<400> SEQUENCE: 87
ucaauuguca ucacuggcau cuuuuuugau cauugcacca ucaucaaaug                    50

<210> SEQ ID NO 88
<211> LENGTH: 192
<212> TYPE: RNA
<213> ORGANISM: Artificial Sequence
<220> FEATURE:
<223> OTHER INFORMATION: Pri-mir-204 AIL1/1

<400> SEQUENCE: 88
gggagggugg ggguggaggc aagcagagga cuuccugauc gcguacccau ggcuacaguc         60
uuucuucaug ugacucgugg acuucccuuu gucauccuau gccugagaau auaugaagga        120
ggcugggaag gcaaagggac guucaagagu caucacuggc aucuuuuug aucauugcac         180 caucaucaaa ug                                                            192

<210> SEQ ID NO 89
<211> LENGTH: 50
<212> TYPE: RNA
<213> ORGANISM: Artificial Sequence
<220> FEATURE:
<223> OTHER INFORMATION: Pri-mir-204 AIL1/1 F3

<400> SEQUENCE: 89
ucaagaguca ucacuggcau cuuuuuugau cauugcacca ucaucaaaug                    50

<210> SEQ ID NO 90
<211> LENGTH: 194
<212> TYPE: RNA
<213> ORGANISM: Artificial Sequence
<220> FEATURE:
<223> OTHER INFORMATION: Pri-mir-204 AIL3/5

<400> SEQUENCE: 90
gggagggugg ggguggaggc aagcagagga cuuccugauc gcguacccau ggcuacaguc         60
uuucuucaug ugacucgugg acuucccuuu gucauccuau gccugagaau auaugaagga        120
ggcugggaag gcaaagggac guucaaauuu gucaucacug gcaucuuuuu ugaucauugc        180
accaucauca aaug                                                          194

<210> SEQ ID NO 91
<211> LENGTH: 52
<212> TYPE: RNA
<213> ORGANISM: Artificial Sequence
<220> FEATURE:
<223> OTHER INFORMATION: Pri-mir-204 AIL3/5 F3

<400> SEQUENCE: 91
ucaaauuugu caucacuggc aucuuuuuug aucauugcac caucaucaaa ug                 52

<210> SEQ ID NO 92
<211> LENGTH: 194
<212> TYPE: RNA
<213> ORGANISM: Artificial Sequence
<220> FEATURE:
<223> OTHER INFORMATION: Pri-mir-181a-1 AIL0/0

<400> SEQUENCE: 92
ggguuucugu cucccauccc cuucagauac uuacagauac uguaaaguga guagaauucu         60
gaguuuugag guugcuucag ugaacauuca acgcugucgg ugaguuugga auuaaaauca        120
aaaccaucga ccguugauug uacccugagg cuaaccauca ucuacuccau ggugcucaga        180

```
auucgcugaa gaca                                                          194

<210> SEQ ID NO 93
<211> LENGTH: 50
<212> TYPE: RNA
<213> ORGANISM: Artificial Sequence
<220> FEATURE:
<223> OTHER INFORMATION: Pri-mir-181a-1 AIL0/0 F3

<400> SEQUENCE: 93
cugaggcuaa ccaucaucua cuccaugguc ucagaauuc gcugaagaca                    50

<210> SEQ ID NO 94
<211> LENGTH: 197
<212> TYPE: RNA
<213> ORGANISM: Artificial Sequence
<220> FEATURE:
<223> OTHER INFORMATION: Pri-mir-181a-1 AIL2/5

<400> SEQUENCE: 94
ggguuucugu cucccauccc cuucagauac uuacagauac uguaaaguga guagaauucu        60 gaguuugag guugcuucag ugaacauuca acgcugucgg ugaguuugga auuaaaauca        120
aaaccaucga ccguugauug uacccuaaaa uggcuaacca ucaucuacuc cauggugcuc      180
agaauucgcu gaagaca                                                      197

<210> SEQ ID NO 95
<211> LENGTH: 53
<212> TYPE: RNA
<213> ORGANISM: Artificial Sequence
<220> FEATURE:
<223> OTHER INFORMATION: Pri-mir-181a-1 AIL2/5 F3

<400> SEQUENCE: 95
cuaaaauggc uaaccaucau cuacuccaug gugcucagaa uucgcugaag aca               53

<210> SEQ ID NO 96
<211> LENGTH: 110
<212> TYPE: RNA
<213> ORGANISM: Artificial Sequence
<220> FEATURE:
<223> OTHER INFORMATION: Pri-mir-216a AIL0/0

<400> SEQUENCE: 96
ggguaacagg auggcuguga guuggcuuaa ucucagcugg caacugugag auguucauac        60
aaucccucac aguggucucu gggauuaugc uaacucagag caauuccua                  110

<210> SEQ ID NO 97
<211> LENGTH: 28
<212> TYPE: RNA
<213> ORGANISM: Artificial Sequence
<220> FEATURE:
<223> OTHER INFORMATION: Pri-mir-216a AIL0/0 F1

<400> SEQUENCE: 97
ggguaacacg gauggcugug aguuggcu                                           28

<210> SEQ ID NO 98
<211> LENGTH: 22
<212> TYPE: RNA
<213> ORGANISM: Artificial Sequence
<220> FEATURE:
<223> OTHER INFORMATION: Pri-mir-216a AIL0/0 F3
```

```
<400> SEQUENCE: 98
gcuaacucag agcaauuucc ua                                          22

<210> SEQ ID NO 99
<211> LENGTH: 110
<212> TYPE: RNA
<213> ORGANISM: Artificial Sequence
<220> FEATURE:
<223> OTHER INFORMATION: Pri-mir-216a AIL2/2

<400> SEQUENCE: 99
ggguaacagg auggcuguga guuggcuuaa ucucagcugg caacugugag auguucauac   60
aaucccucac aguggucucu gggauuaugc uaaaacagag caauuccua             110

<210> SEQ ID NO 100
<211> LENGTH: 22
<212> TYPE: RNA
<213> ORGANISM: Artificial Sequence
<220> FEATURE:
<223> OTHER INFORMATION: Pri-mir-216a AIL2/2 F3; Pri-mir-216a AIL6/2 F3;
      Pri-mir-216a AIL8/2 F3

<400> SEQUENCE: 100
gcuaaaacag agcaauuucc ua                                          22

<210> SEQ ID NO 101
<211> LENGTH: 114
<212> TYPE: RNA
<213> ORGANISM: Artificial Sequence
<220> FEATURE:
<223> OTHER INFORMATION: Pri-mir-216a AIL6/2

<400> SEQUENCE: 101
ggguaacagg auggcuguga aaaguuggc uuaaucucag cuggcaacug ugagauguuc    60
auacaauccc ucacaguggu cucugggauu augcuaaaac agagcaauuu ccua        114

<210> SEQ ID NO 102
<211> LENGTH: 31
<212> TYPE: RNA
<213> ORGANISM: Artificial Sequence
<220> FEATURE:
<223> OTHER INFORMATION: Pri-mir-216a AIL6/2 F1

<400> SEQUENCE: 102
ggguaacagg auggcuguga aaaguuggc u                                  31

<210> SEQ ID NO 103
<211> LENGTH: 43
<212> TYPE: RNA
<213> ORGANISM: Artificial Sequence
<220> FEATURE:
<223> OTHER INFORMATION: Pri-mir-216a AIL6/2 unproductive product 1

<400> SEQUENCE: 103
ggguaacagg auggcuguga aaaguuggc uuaaucucag cug                     43

<210> SEQ ID NO 104
<211> LENGTH: 39
<212> TYPE: RNA
<213> ORGANISM: Artificial Sequence
<220> FEATURE:
<223> OTHER INFORMATION: Pri-mir-216a AIL6/2 unproductive product 2;
      Pri-mir-216a AIL8/2 unproductive product 2

<400> SEQUENCE: 104
```
gcaacuguga gauguucaua caaucccuca cagugucu            39

<210> SEQ ID NO 105
<211> LENGTH: 32
<212> TYPE: RNA
<213> ORGANISM: Artificial Sequence
<220> FEATURE:
<223> OTHER INFORMATION: Pri-mir-216a AIL6/2 unproductive product 3;
      Pri-mir-216a AIL8/2 unproductive product 3

<400> SEQUENCE: 105
cugggauuau gcuaaaacag agcaauuucc ua            32

<210> SEQ ID NO 106
<211> LENGTH: 116
<212> TYPE: RNA
<213> ORGANISM: Artificial Sequence
<220> FEATURE:
<223> OTHER INFORMATION: Pri-mir-216a AIL8/2

<400> SEQUENCE: 106
ggguaacagg auggcuguga aaaaaaguug gcuuaaucuc agcuggcaac ugugagaugu            60
ucauacaauc ccucacagug gucucuggga uuaugcuaaa acagagcaau uccua            116

<210> SEQ ID NO 107
<211> LENGTH: 33
<212> TYPE: RNA
<213> ORGANISM: Artificial Sequence
<220> FEATURE:
<223> OTHER INFORMATION: Pri-mir-216a AIL8/2 F1

<400> SEQUENCE: 107
ggguaacagg auggcuguga aaaaaaguug gcu            33

<210> SEQ ID NO 108
<211> LENGTH: 45
<212> TYPE: RNA
<213> ORGANISM: Artificial Sequence
<220> FEATURE:
<223> OTHER INFORMATION: Pri-mir-216a AIL8/2 unproductive product 1

<400> SEQUENCE: 108
ggguaacagg auggcuguga aaaaaaguug gcuuaaucuc agcug            45

<210> SEQ ID NO 109
<211> LENGTH: 37
<212> TYPE: DNA
<213> ORGANISM: Artificial Sequence
<220> FEATURE:
<223> OTHER INFORMATION: F-miR92a XhoI primer

<400> SEQUENCE: 109
cgcctcgagc tgtggtagtg aaagtctgt agaaaag            37

<210> SEQ ID NO 110
<211> LENGTH: 34
<212> TYPE: DNA
<213> ORGANISM: Artificial Sequence
<220> FEATURE:
<223> OTHER INFORMATION: R-92a XbaI (WT, and AIL3/9) primer

<400> SEQUENCE: 110
ggctctagac agtggaagtc gaaatcttca gtaa            34

```
<210> SEQ ID NO 111
<211> LENGTH: 32
<212> TYPE: DNA
<213> ORGANISM: Artificial Sequence
<220> FEATURE:
<223> OTHER INFORMATION: F-mir216a-HindIII primer

<400> SEQUENCE: 111
agacccaagc ttgggtaaca cggatggctg tg                              32

<210> SEQ ID NO 112
<211> LENGTH: 33
<212> TYPE: DNA
<213> ORGANISM: Artificial Sequence
<220> FEATURE:
<223> OTHER INFORMATION: R-mir216a-BamHI primer

<400> SEQUENCE: 112
actagtggat cctaggaaat tgctctgttt agc                             33

<210> SEQ ID NO 113
<211> LENGTH: 34
<212> TYPE: DNA
<213> ORGANISM: Artificial Sequence
<220> FEATURE:
<223> OTHER INFORMATION: R-mir216a2MM-BamHI (AIL6/2 and AIL8/2) primer

<400> SEQUENCE: 113
actagtggat cctaggaaat tgctctgttt tagc                            34

<210> SEQ ID NO 114
<211> LENGTH: 37
<212> TYPE: DNA
<213> ORGANISM: Artificial Sequence
<220> FEATURE:
<223> OTHER INFORMATION: F-mir217-HindIII primer

<400> SEQUENCE: 114
agacccaagc ttgggattac atagttttg atgtcgc                          37

<210> SEQ ID NO 115
<211> LENGTH: 32
<212> TYPE: DNA
<213> ORGANISM: Artificial Sequence
<220> FEATURE:
<223> OTHER INFORMATION: R-mir217-BamHI (WT and AIL5/3) primer

<400> SEQUENCE: 115
actagtggat ccggtgcttg tttagatgct ga                              32

<210> SEQ ID NO 116
<211> LENGTH: 34
<212> TYPE: DNA
<213> ORGANISM: Artificial Sequence
<220> FEATURE:
<223> OTHER INFORMATION: F-mir654-HindIII primer

<400> SEQUENCE: 116
agacccaagc ttgggagccc tccagggtaa gtgg                            34

<210> SEQ ID NO 117
<211> LENGTH: 33
<212> TYPE: DNA
<213> ORGANISM: Artificial Sequence
<220> FEATURE:
<223> OTHER INFORMATION: F-mir654 AIL8/3-HindIII primer
```

```
<400> SEQUENCE: 117
agacccaagc ttgggagccc tccagggtaa aag                                    33

<210> SEQ ID NO 118
<211> LENGTH: 36
<212> TYPE: DNA
<213> ORGANISM: Artificial Sequence
<220> FEATURE:
<223> OTHER INFORMATION: R-mir654-BamHI primer

<400> SEQUENCE: 118
actagtggat ccctcagcga aaggggggctt ctaaag                                 36

<210> SEQ ID NO 119
<211> LENGTH: 33
<212> TYPE: DNA
<213> ORGANISM: Artificial Sequence
<220> FEATURE:
<223> OTHER INFORMATION: F-mir133a1-HindIII primer

<400> SEQUENCE: 119
agacccaagc ttgggctagc agcactacaa tgc                                    33

<210> SEQ ID NO 120
<211> LENGTH: 35
<212> TYPE: DNA
<213> ORGANISM: Artificial Sequence
<220> FEATURE:
<223> OTHER INFORMATION: R-mir133a1-BamHI (WT and AIL7/3) primer

<400> SEQUENCE: 120
actagtggat ccagtaatca atgcatagct acagc                                  35

<210> SEQ ID NO 121
<211> LENGTH: 39
<212> TYPE: DNA
<213> ORGANISM: Artificial Sequence
<220> FEATURE:
<223> OTHER INFORMATION: R-mir133a1 AIL3/7-BamHI primer

<400> SEQUENCE: 121
actagtggat ccagtaatca atgcataaaa agctacagc                              39
```

METHOD FOR CONTROLLING MICRORNA EXPRESSION

CROSS-REFERENCE TO RELATED APPLICATIONS

This application is a National Phase entry application of PCT International Application No. PCT/CN2020/106239, filed Jul. 31, 2020, which claims the benefit of priority of US patent application Ser. No. 62/922,198, filed 2 Aug. 2019, the contents of which are herein incorporated by reference in their entirety for all purposes.

FIELD OF THE INVENTION

The present invention generally relates to molecular biology. In particular, the present invention relates to means of controlling microRNA processing and expression.

BACKGROUND OF THE INVENTION microRNAs (miRNAs) play important roles in gene regulation and are involved in many essential cellular processes. Their importance is exemplified by the many diseases that are associated with aberrations in miRNAs. Therefore, it would be imperative to control the levels of miRNAs expression in cells so as to restore normal levels of miRNA expression, especially in diseased cells.

Conventional methods of gene editing include mediating microRNA (miRNA) expression in cells by knocking-out or knocking-down target miRNA sequences. However, these methods contain inherent disadvantages, such as the production of unexpected miRNA sequences, off-target gene expression, and difficulty in controlling the level of miRNA expression. In addition, it is also not possible to increase the level miRNA expression using conventional methods.

In view of the above, there is a need to provide alternative methods that address some of the above problems.

SUMMARY

In one aspect, there is provided a method of producing single cut precursor microRNA (pre-miRNA) in a host cell from a primary microRNA (pri-miRNA) comprising the following structure:

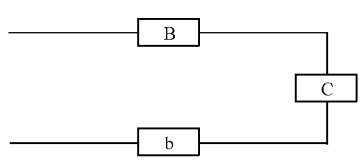

Formula 1 wherein [B] to [b] is in the 5' to 3' directionality to form a stem loop structure, and wherein:
  motifs [B] and [b] each constitute a cleavage site in the stem region;
  motif [C] constitute a loop region;
the method comprising:
introducing one or more mutations in a region upstream of motif [B] and/or downstream of motif [b] to produce a genetically modified primary microRNA (pri-miRNA) comprising the following structure:

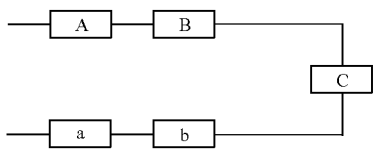

Formula II wherein motifs [A] and [a] constitute the asymmetric internal loop (AIL) region in the stem region;
  a) transfecting the genetically modified primary microRNA (pri-miRNA) from step b) to the host cell;
wherein the single cut precursor microRNA (pre-miRNA) is produced from cleaving at motif [B].

In another aspect, there is provided a method of producing single cut precursor microRNA (pre-miRNA) in a host cell from a primary microRNA (pri-miRNA) comprising the following structure:

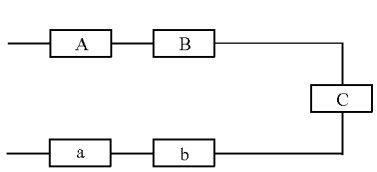

Formula II wherein [A] to [a] is in the 5' to 3' directionality to form a stem loop structure, and wherein:
  motifs [A] and [a] constitute the asymmetric internal loop (AIL) region in the stem region;
  motifs [B] and [b] each constitute a cleavage site in the stem region;
  motif [C] constitute a loop region;
the method comprising:
  a) introducing one or more mutations at one or both of motifs [A] and [a] to modulate the size of the asymmetric internal loop (AIL) region;
  b) transfecting the primary microRNA (pri-miRNA) from step b) to the host cell;
wherein the single cut precursor microRNA (pre-miRNA) is produced from cleaving at motif [B].

In yet another aspect, there is provided a method of increasing production levels of single cut precursor microRNA (pre-miRNA) and decreasing production levels of double cut precursor microRNA (pre-miRNA) in a host cell from a primary microRNA (pri-miRNA) comprising the following structure:

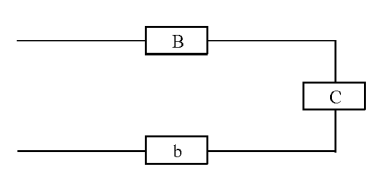

Formula 1 wherein [B] to [b] is in the 5' to 3' directionality to form a stem loop structure, and wherein:
  motifs [B] and [b] each constitute a cleavage site in the stem region;
  motif [C] constitute a loop region;

the method comprising:
a) introducing one or more mutations in a region upstream of motif [B] and/or downstream of motif [b] to produce a genetically modified primary microRNA (pri-miRNA) comprising the following structure:

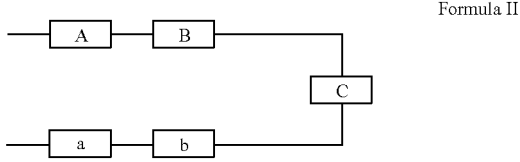

Formula II wherein motifs [A] and [a] constitute the asymmetric internal loop (AIL) region in the stem region;
b) transfecting the genetically modified primary microRNA (pri-miRNA) from step b) to the host cell;
c) producing one or both single cut precursor microRNA (pre-miRNA) and double cut precursor microRNA (pre-miRNA) by controlling cleaving at one or both motifs [B] and [b];
wherein the single cut precursor microRNA (pre-miRNA) is produced from cleaving at motif [B];
wherein the double cut precursor microRNA (pre-miRNA) is produced from cleaving at motifs [B] and [b].

In yet another aspect, there is provided a method of increasing production levels of single cut precursor microRNA (pre-miRNA) and decreasing production of double cut precursor microRNA (pre-miRNA) in a host cell from a primary microRNA (pri-miRNA) comprising the following structure:

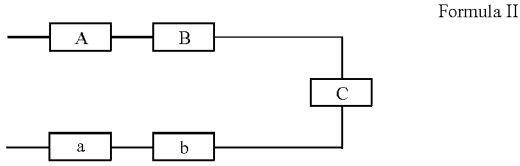

Formula II wherein [A] to [a] is in the 5' to 3' directionality to form a stem loop structure, and wherein:
motifs [A] and [a] constitute the asymmetric internal loop (AIL) region in the stem region;
motifs [B] and [b] each constitute a cleavage site in the stem region;
motif [C] constitute a loop region;
the method comprising:
a) introducing one or more mutations at one or both of motifs [A] and [a] to modulate the size of the asymmetric internal loop (AIL) region;
b) transfecting the primary microRNA (pri-miRNA) from step b) to the host cell;
c) producing one or both single cut precursor microRNA (pre-miRNA) and double cut precursor microRNA (pre-miRNA) by controlling cleaving at one or both motifs [B] and [b];
wherein the single cut precursor microRNA (pre-miRNA) is produced from cleaving at motif [B];
wherein the double cut precursor microRNA (pre-miRNA) is produced from cleaving at motifs [B] and [b].

In yet another aspect, there is provided a method of decreasing production levels of single cut precursor microRNA (pre-miRNA) and increasing production of double cut precursor microRNA (pre-miRNA) in a host cell from a primary microRNA (pri-miRNA) comprising the following structure:

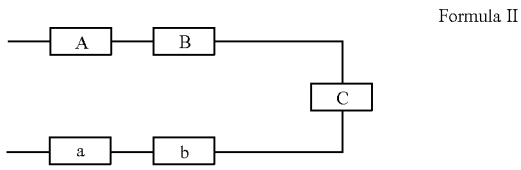

Formula II wherein [A] to [a] is in the 5' to 3' directionality to form a stem loop structure, and wherein:
motifs [A] and [a] constitute the asymmetric internal loop (AIL) region in the stem region;
motifs [B] and [b] each constitute a cleavage site in the stem region;
motif [C] constitute a loop region;
the method comprising:
a) introducing one or more mutations at one or both of motifs [A] and [a] to modulate the size of the asymmetric internal loop (AIL) region;
b) transfecting the primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b];
wherein the single cut precursor microRNA (pre-miRNA) is produced from cleaving at motif [B];
wherein the double cut precursor microRNA (pre-miRNA) is produced from cleaving at motifs [B] and [b].

In yet another aspect, there is provided a method of modulating expression levels of microRNA (miRNA) in a host cell comprising modulating expression levels of one or both of single cut precursor microRNA (pre-miRNA) and double cut precursor microRNA (pre-miRNA) using the methods as disclosed herein.

In yet another aspect, there is provided a method of modulating expression levels of microRNA (miRNA) in a subject comprising modulating expression levels of one or both of single cut precursor microRNA (pre-miRNA) and double cut precursor microRNA (pre-miRNA) using the methods as disclosed herein.

In yet another aspect, there is provided a method of treating a disease in a subject, comprising:
a) detecting the presence or absence of a mutation in a microRNA related to the disease, wherein the mutation alters or disrupts expression of microRNA;
b) modulating expression levels of one or both of single cut precursor microRNA (pre-miRNA) and double cut precursor microRNA (pre-miRNA) in a host cell using the methods as disclosed herein.

In yet another aspect, there is provided a genetically modified primary microRNA (pri-miRNA) comprising the following structure:

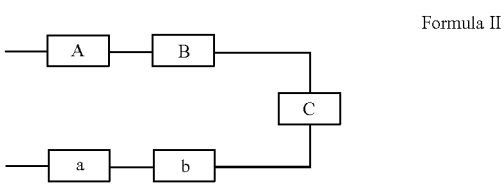

Formula II wherein [A] to [a] is in the 5' to 3' directionality to form a stem loop structure, and wherein:
   motifs [A] and [a] constitute an asymmetric internal loop (AIL) region in the stem region;
   motifs [B] and [b] each constitute a cleavage site in the stem region;
   motif [C] constitute a loop region;
      wherein one or both motifs [A] and [a] comprise 0-9 nucleotides;
         wherein motif [A] comprises at least 1 nucleotide that does not match to any nucleotide in motif [a]; or
wherein motif [a] comprises at least 1 nucleotide that does not match to any nucleotide in motif [A].

In yet another aspect, there is provided a genetically modified primary microRNA (pri-miRNA) comprising SEQ ID NO: 1.

BRIEF DESCRIPTION OF THE DRAWINGS

The invention will be better understood with reference to the detailed description when considered in conjunction with the non-limiting examples and the accompanying drawings, in which:

FIG. 1A illustrates the structure of an exemplary primary microRNA (pri-miRNA) comprising a stem and loop structure, wherein the stem region can further comprise an upper stem and lower stem. The apical and basal junctions are identified by the dotted arrows, and the cleavage sites are identified by the white and black arrowheads. The lower stem region is the area wherein an asymmetrical internal loop (AIL) region can exist. FIG. 1B shows the following: (left) a modified primary microRNA (pri-miRNA) without an asymmetric internal loop (AIL) region is cleaved at the cleavage site on the 5' stem of the primary microRNA (pri-miRNA) (denoted by white arrowhead) and the cleavage site on the 3' stem of the primary microRNA (pri-miRNA) (denoted by black arrowhead), resulting in the production of a double cut precursor microRNA (pre-miRNA) that is exported out of the cell nucleus to be further processed into a microRNA (miRNA); (right) a modified primary microRNA (pri-miRNA) with a large asymmetric internal loop (AIL) region is cleaved at the cleavage site on the 5' stem of the primary microRNA (pri-miRNA) (denoted by white arrowhead) only, resulting in the production of a single cut precursor microRNA (pre-miRNA) that is trapped in the cell nucleus and degraded; (center) a modified primary microRNA (pri-miRNA) with a small asymmetric internal loop (AIL) region is cleaved at the cleavage site on the 5' stem of the primary microRNA (pri-miRNA) (denoted by white arrowhead) and the cleavage site on the 3' stem of the primary microRNA (pri-miRNA), wherein the levels of cleaving in the cleavage site on the 3' stem of the primary microRNA (pri-miRNA) is less than that in the scenario depicted on the left (denoted by a smaller black arrowhead), resulting in the production of both double cut precursor microRNA (pre-miRNA) that is exported out of the cell nucleus to be further processed into a microRNA (miRNA) and single cut precursor microRNA (pre-miRNA) that is trapped in the cell nucleus and degraded.

FIG. 2A shows 11 images of exemplary primary microRNA (pri-miRNA) pri-mir-92a-1, pri-mir-216a, pri-mir-217, pri-mir-654, pri-mir-200b, pri-let-7e, pri-mir-100, pri-mir-29a, pri-mir-367, pri-mir-181a-1 and pri-mir-19b-1. The sequences of the exemplary primary microRNA (pri-miRNA) are shown in each image, wherein the sequence of the resulting double cut precursor microRNA (pre-miRNA) region is shown in capital letters. The black arrowheads indicate the cleavage sites that would result in the double cut precursor microRNA (pre-miRNA). The white arrowheads indicate the cleavage site that would result in the 5' single cut product (single cut precursor microRNA (pre-miRNA)). FIG. 2B shows 5 images of RNA bands visualized on Urea polyacrylamide gel electrophoresis (Urea PAGE) gels of pri-miRNA processing assays of pri-mir-92a-1, pri-mir-216a, pri-mir-217, pri-mir-654, pri-mir-200b by wild type (WT) Microprocessor, or TN1 mutant Microprocessor that cleaves pri-miRNA only at its 5' strand. The band representing single cut products (single cut precursor microRNA (pre-miRNA)) align to the white arrowhead. The bands representing double cut products (double cut precursor microRNA (pre-miRNA)) align to the black arrowhead named F2. F1 represents the fragment from 5' end to 5' cleavage site; F2 represents the fragment between 5' and 3' cleavage sites, which is the (double cut precursor microRNA (pre-miRNA)); and F3 represents the fragment from 3' cleavage site to 3' end. FIG. 2C shows 1 image of RNA bands visualized on Urea polyacrylamide gel electrophoresis (Urea PAGE) gels of pri-miRNA processing assays of pri-let-7e, pri-mir-100, pri-mir-654, pri-mir-204, pri-mir-29a, pri-mir-367, pri-mir-181a-1 and pri-mir-19b-1 by Microprocessor (WT). FIG. 2C (lower panel) shows the single cut products (single cut precursor microRNA (pre-miRNA)) (indicated by white arrow heads in FIG. 2C upper panel) were cut from the gel and cloned, after which next-generation sequencing (NGS) reads were aligned with pri-miRNA sequences. The single-cut products (single cut precursor microRNA (pre-miRNA)) were selected and visualized by IGV software. Thus, FIG. 2 illustrates that Microprocessor exhibit single cut activity on investigated pri-miRNAs.

FIG. 3A shows 6 images of primary microRNA (pri-miRNA) pri-mir-92a-1, including wild-type AIL3/6, and the mutated variants AIL3/8, AIL3/9, AIL3/3, AIL2/2 and AIL1/l. The sequence of each primary microRNA (pri-miRNA) is shown in each image, wherein the underlined nucleotides are exemplary mutation in the variants by insertion or substitution. Each dash represents the space created by one extra nucleotide on the opposing strand. The sequence of the resulting double cut precursor microRNA (pre-miRNA) region is shown in capital letters. The black arrowheads indicate the cleavage sites that would result in the double cut precursor microRNA (pre-miRNA). The white arrowheads indicate the cleavage site that would result in the 5' single cut product (single cut precursor microRNA (pre-miRNA)). FIG. 3B shows 1 image of RNA bands visualized on Urea polyacrylamide gel electrophoresis (Urea PAGE) gels of pri-miRNA processing assays of the six pri-mir-92a-1 (wild-type AIL3/6, the mutated variants AIL3/8, AIL3/9, AIL3/3, AIL2/2 and AIL1/1) by wild type (WT) Microprocessor. The band representing single cut products (single cut precursor microRNA (pre-miRNA)) align to the white arrowhead. The bands representing double cut products (double cut precursor microRNA (pre-miRNA)) align to the black arrowhead named F2. F1 represents the fragment from 5' end to 5' cleavage site; F2 represents the fragment between 5' and 3' cleavage sites, which is the (double cut precursor microRNA (pre-miRNA)); and F3 represents the fragment from 3' cleavage site to 3' end. Thus, FIG. 3 illustrates that larger AIL size leads to increased production of single cut products (single cut precursor microRNA (pre-miRNA)) from pri-mir-92a-1.

FIG. 4A shows 4 images of primary microRNA (pri-miRNA) pri-mir-133a-1, including wild-type AIL3/3, and the mutated variants AIL0/0, AIL7/3 and AIL3/7. FIG. 4B shows 1 image of RNA bands visualized on Urea polyacrylamide gel electrophoresis (Urea PAGE) gels of pri-miRNA processing assays of the four pri-mir-133a-1 (wild-type AIL3/3, the mutated variants AIL0/0, AIL7/3 and AIL3/7) by wild type (WT) Microprocessor. FIG. 4C shows 3 images of primary microRNA (pri-miRNA) pri-mir-217, including wild-type AIL3/3, and the mutated variants AIL0/0 and AIL5/3. FIG. 4D shows 1 image of RNA bands visualized on Urea polyacrylamide gel electrophoresis (Urea PAGE) gels of pri-miRNA processing assays of the three pri-mir-217 (wild-type AIL3/3, the mutated variants AIL0/0 and AIL5/3) by wild type (WT) Microprocessor. FIG. 4E shows 3 images of primary microRNA (pri-miRNA) pri-mir-204, including wild-type AIL3/3, and the mutated variants AIL1/1 and AIL3/5. FIG. 4F shows 1 image of RNA bands visualized on Urea polyacrylamide gel electrophoresis (Urea PAGE) gels of pri-miRNA processing assays of the three pri-mir-204 (wild-type AIL3/3, the mutated variants AIL1/1 and AIL3/5) by wild type (WT) Microprocessor. FIG. 4G shows 3 images of primary microRNA (pri-miRNA) pri-mir-181a-1, including wild-type AIL2/2, and the mutated variants AIL0/0 and AIL2/5. FIG. 4H shows 1 image of RNA bands visualized on Urea polyacrylamide gel electrophoresis (Urea PAGE) gels of pri-miRNA processing assays of the three pri-mir-181a-1 (wild-type AIL2/2, the mutated variants AIL0/O and AIL2/5) by wild type (WT) Microprocessor. In FIGS. 4A, 4C, 4E and 4G, the sequence of each primary microRNA (pri-miRNA) shown in each image, wherein the underlined nucleotides are exemplary mutation in the variants by insertion or substitution. Each dash represents the space created by one extra nucleotide on the opposing strand. The sequence of the resulting double cut precursor microRNA (pre-miRNA) region is shown in capital letters. The black arrowheads indicate the cleavage sites that would result in the double cut precursor microRNA (pre-miRNA). The white arrowheads indicate the cleavage site that would result in the 5' single cut products (single cut precursor microRNA (pre-miRNA)). In FIGS. 4B, 4D, 4F and 4H, the band representing single cut products (single cut precursor microRNA (pre-miRNA)) align to the white arrowhead. The bands representing double cut products (double cut precursor microRNA (pre-miRNA)) align to the black arrowhead named F2. F1 represents the fragment from 5' end to 5' cleavage site; F2 represents the fragment between 5' and 3' cleavage sites, which is the (double cut precursor microRNA (pre-miRNA)); and F3 represents the fragment from 3' cleavage site to 3' end. Thus, FIG. 4 illustrates that larger AIL size leads to increased production of single cut products (single cut precursor microRNA (pre-miRNA)) from mir-133a-1, pri-mir-217, pri-mir-204, pri-mir-181a-1.

FIG. 5A shows 5 images of primary microRNA (pri-miRNA) pri-mir-216a-1, including wild-type AIL2/1, and the mutated variants AIL0/0, AIL2/2, AIL6/2 and AIL8/2. The sequence of each primary microRNA (pri-miRNA) is shown in each image, wherein the underlined nucleotides are exemplary mutation in the variants by insertion or substitution. Each dash represents the space created by one extra nucleotide on the opposing strand. The sequence of the resulting double cut precursor microRNA (pre-miRNA) region is shown in capital letters. The black arrowheads indicate the cleavage sites that would result in the double cut precursor microRNA (pre-miRNA). The white arrowheads indicate the cleavage site that would result in the 5' single cut product (single cut precursor microRNA (pre-miRNA)). FIG. 5B shows 1 image of RNA bands visualized on Urea polyacrylamide gel electrophoresis (Urea PAGE) gels of pri-miRNA processing assays of the five pri-mir-216a-1 (wild type and the mutated variants AIL0/0, AIL2/2, AIL6/2 and AIL8/2) by wild type (WT) Microprocessor. The band representing single cut products (single cut precursor microRNA (pre-miRNA)) align to the white arrowhead. The bands representing double cut products (double cut precursor microRNA (pre-miRNA)) align to the black arrowhead named F2. F1 represents the fragment from 5' end to 5' cleavage site; F2 represents the fragment between 5' and 3' cleavage sites, which is the (double cut precursor microRNA (pre-miRNA)); and F3 represents the fragment from 3' cleavage site to 3' end. Thus, FIG. 5 illustrates that the introduction of larger AIL leads to increased production of single cut products (single cut precursor microRNA (pre-miRNA)) from pri-mir-216a-1.

FIG. 6A shows an experimental scheme of estimating the miRNA expression altered by AILs. The DNA sequence encoding for wild type or mutant pri-miRNA was cloned in the pcDNA3 vector. Each cloned vector was co-transfected with pcDNA3 expressing pri-mir-16-1 into HCT116 cells as described in the Method section. The RNA transcription in human cells was carried out under the CMV promoter of the pcDNA3 vector. The expression of miRNAs was quantified by real time quantitative polymerase chain reaction (RT-qPCR) and normalized against that of miR-16-1. FIG. 6B is a column graph that shows the expression of miRNAs was quantified by RT-qPCR and normalized against that of miR-16-1. Thus, FIG. 6 illustrates that miRNA expression in human cells can be modulated by increasing the size of AILs.

FIG. 7A shows an experimental scheme of modulating miRNA expression in human cell by changing AIL sizes using CRISPR-Cas9 technique. The CRISPR-Cas9 technique is employed to modify the genomic DNA sequence encoding for the AIL at the lower stem of a pri-miRNA. The single cut activity of Microprocessor resulting in single cut products is correlated with the size of the AILs, and is anti-correlated with the miRNA expression. FIG. 7B shows the authenticity of the pri-mir-92a-1 AIL3/9 knock-in cells. The genomic DNA region covering the knock-in site in pri-mir-92a-1 was amplified by polymerase chain reaction (PCR), and after which the PCR products were sequenced by both Sanger sequencing and next generation sequencing (NGS). Three knock-in cell lines were generated. FIG. 7C is a column graph that shows the expression of miR-92a-1 and 8 other miRNAs in HCT116 (parental cells) and pri-mir-92a-1 AIL3/9 knock-in cells which were quantified by RT-qPCR and normalized against that of U6. Thus, FIG. 7 illustrates that miRNA expression can be modulated using gene editing techniques.

DETAILED DESCRIPTION

Human cells produce ~2500 microRNAs (miRNAs) that are small and non-coding ribonucleic acids (RNAs) of ~21-22 nucleotides (nt). miRNAs play important roles in gene regulation and they are involved in most essential cellular processes. The malfunction of miRNAs is associated with various human diseases.

Figure 1:
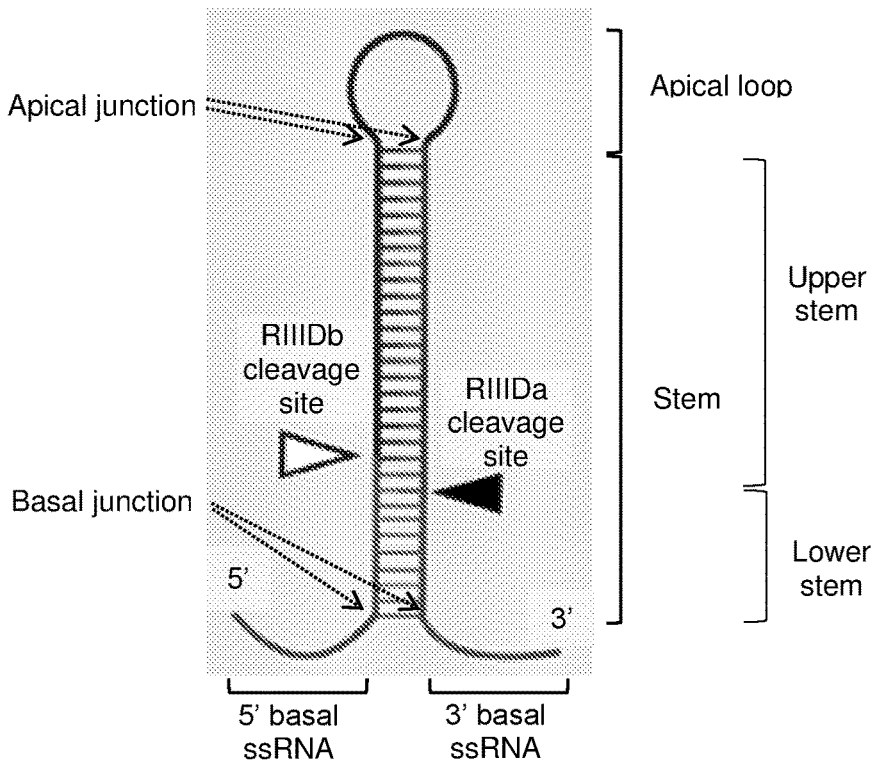
FIG. 1 shows 2 cartoons illustrating the structure of a primary microRNA (pri-miRNA) and an example of the downstream pathways of primary microRNA (pri-miRNA) using the method as described herein.
Figure 1:
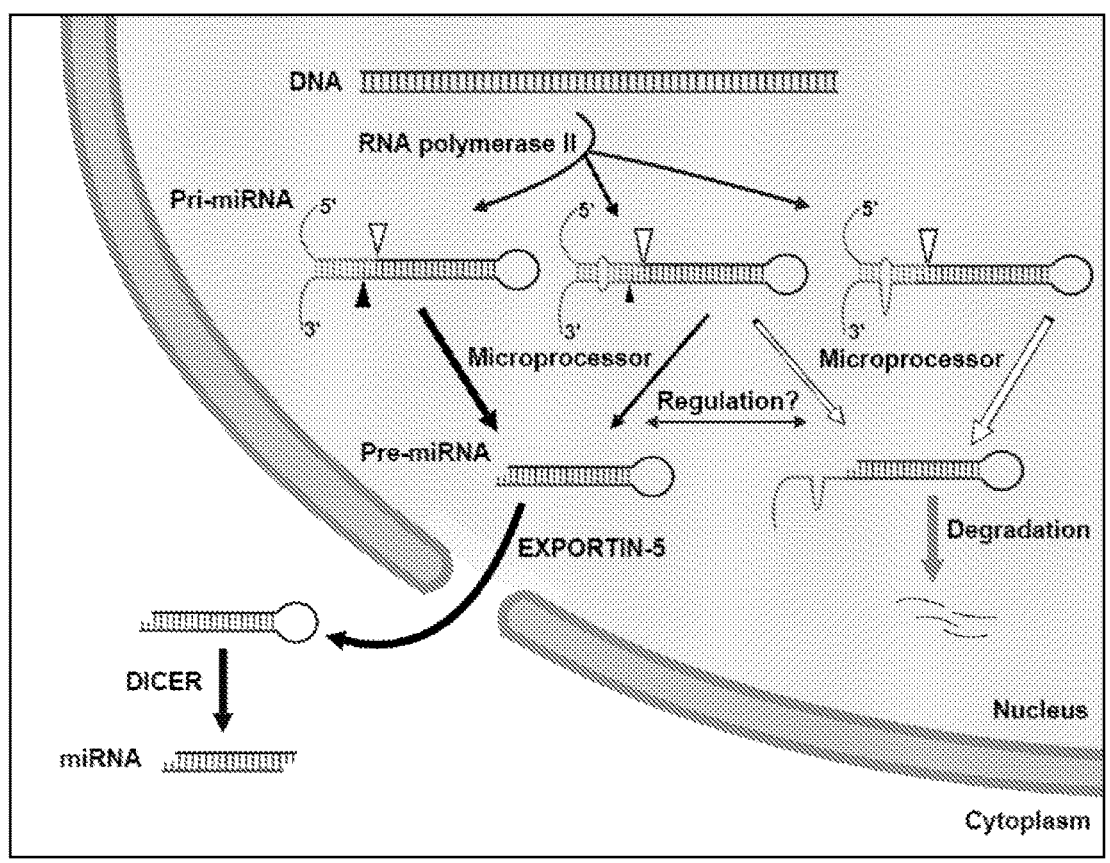

During miRNA biogenesis, Microprocessor and DICER sequentially process primary miRNA transcripts (pri-miRNAs) to generate miRNAs. As used herein, the terms "primary microRNA" and "pri-miRNA" are used interchangeably and in their broadest sense refer to a small ribonucleic acids (RNAs) consisting of a chain of nucleotides in which the sugar is ribose (or variations thereof) and the bases are adenine, cytosine, guanine, and uracil. A typical pri-miRNA usually has a stem and loop structure that contains a double-stranded RNA (dsRNA) stem of about 35 base pairs (bp), an apical loop (also known as a loop region), and two basal single-stranded RNA (ssRNA) segments. The dsRNA-ssRNA junction between the stem and the apical loop, and between the stem and basal segments are called apical and basal junctions, respectively (FIG. 1A). Specifically, the dsRNA-ssRNA junction between the 5' stem and the apical loop is the 5' apical junction; the dsRNA-ssRNA junction between the 3' stem and the apical loop is the 3' apical junction; the dsRNA-ssRNA junction between the 5' stem and the basal loop is the 5' basal junction; and the dsRNA-ssRNA junction between the 3' stem and the basal loop is the 3' basal junction. In one example, the dsRNA-ssRNA junction pri-miRNAs are processed by Microprocessor to generate miRNA precursors (pre-miRNAs), wherein the stem of the pri-miRNAs is divided by Microprocessor cleavage sites into lower and upper stems (FIG. 1A). In one example, the pri-microRNA comprises the following structure:

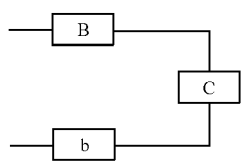

Formula I wherein [B] to [b] is in the 5' to 3' directionality to form a stem loop structure, and wherein: motifs [B] and [b] each constitute a cleavage site in the stem region; motif [C] constitute a loop region. In another example, the pri-microRNA comprises the following structure:

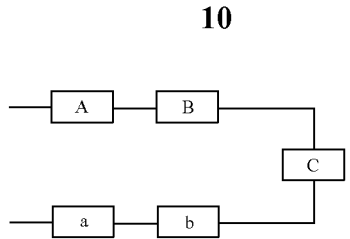

Formula II wherein [A] to [a] is in the 5' to 3' directionality to form a stem loop structure, and wherein: motifs [A] and [a] constitute the asymmetric internal loop (AIL) region in the stem region; motifs [B] and [b] each constitute a cleavage site in the stem region; motif [C] constitute a loop region. In one example, the primary microRNA is selected from a group consisting of pri-mir-92a-1, pri-mir-216a, pri-mir-217, pri-mir-654, pri-mir-200b, pri-mir-133a-1, pri-mir-16a-1, pri-mir-19b, pri-mir-17 and pri-mir-20a.

Microprocessor refers to a complex comprising the RNase III enzyme Drosha and the double-stranded RNA-binding protein DGCR8 (DiGeorge syndrome critical region 8 gene). The Microprocessor recognizes various features of pri-miRNAs to interact and place the 3' cleavage site and a 5' cleavage site on the pri-miRNA. As used herein, the terms "3' cleavage site" and "5' cleavage site" refer to the cleavage sites of DROSHA RIIIDa and DROSHA RIHDb, wherein the cleavage sites of DROSHA RIIIDa and DROSHA RIIIDb are located approximately 11 and 13 nucleotides (nt) from the 3' basal junction and the 5' basal junction respectively. The 3' cleavage site and a 5' cleavage site on the pri-miRNA are represented by motifs [b] and [B] respectively. In the nucleus, the Microprocessor may cleave pri-miRNAs at both 3' cleavage site and a 5' cleavage sites to produce double cut precursor miRNAs (pre-miRNAs), which are then exported to the cytoplasm. Subsequently, cytoplasmic DICER creates double cuts on the double cut pre-miRNAs to generate miRNAs, which leads to the expression of the mature miRNAs. The Microprocessor may also cleave pri-miRNAs at the 5' cleavage site only to produce single cut precursor miRNAs (pre-miRNAs), which are trapped in the nucleus. The single cut pre-miRNAs are then degraded, therefore no miRNA would be expressed (FIG. 1B).

Due to the complexities of the miRNA biogenesis processes, it is not a surprise that abnormal miRNA expression commonly occurs. Abnormal miRNA expression is associated with numerous human diseases, for example, cancer, viral diseases, immune-related diseases, and neurodegenerative diseases. Specific and accurate manipulation of miRNA biogenesis is essential to correct aberrant miRNA expression in such diseases. Presently, different methods are available to correct aberrant miRNA expression. For example, the use of oligonucleotides complementary to miRNA sequences, for example small interfering RNAs (siRNAs), to knockdown aberrant miRNA expressions. However, this method has proven challenging as it is difficult to control the extent of knockdown of miRNA expression. In addition, this method is time consuming and may not be effective, as repeated treatment of the oligonucleotides that are complementary to miRNA sequence, for example siRNAs, to the cells would be required to obtain an acceptable level of knockdown of miRNA expression. Another example includes the use of gene editing technology to mutate the genomic DNA region that encodes for miRNA sequences, thereby knocking out or blocking miRNA synthesis. However, this method might lead to the production of unexpected or unwanted miRNA sequences that leads to off-target gene expression. In addition, this method might also lead to complete removal of miRNA expression that would be required for normal cellular processes. Furthermore, both of the aforementioned methods cannot be used to increase miRNA expression.

In view of the above problems, the inventors of the present disclosure have set out to provide alternative methods to control miRNA expression and preserve normal cellular functions of miRNAs by targeting the AIL region, wherein controlling the size of the AIL region may control the single cut activity or double cut activity of the Microprocessor on primary miRNA transcripts (pri-miRNAs) to produce single cut pre-miRNAs or double cut pre-miRNAs. The alternative methods also do not cause a complete knock-out of miRNA expression like those in the conventional gene editing techniques. Instead, the alternative methods can increase or reduce miRNA expression to a different level. As the AIL region does not form part of a miRNA sequence, it does not lead to the synthesis of unexpected miRNA sequences and avoids any off-target effects, therefore the alternative methods would not affect the miRNA expression for the essential normal cellular functions in a cell.

As used herein, the terms "precursor microRNA" and "pre-miRNA" are used interchangeably and in their broadest sense refer to a hairpin precursor of a miRNA formed by the cleavage of a primary miRNA by the Microprocessor. The cleavage may occur at the 5' and 3' cleavage sites, otherwise known as a double cut activity, to produce a double cut pre-miRNA, or may occur at the 5' cleavage site to produce a single cut pre-miRNA. As used herein, the term "double cut pre-miRNA" refers to a pre-miRNA that is cleaved at the 5' and 3' cleavage sites, which is then exported to the cytoplasm where it would be further cleaved by DICER and processed to form a miRNA. As used herein, the term "single cut pre-miRNA" refers to a pre-miRNA that is cleaved only at the 5' cleavage site, which results in an incompletely cleaved pre-miRNA that would be retained in nucleus and degraded. Therefore, no miRNA would be produced from single cut pre-miRNA.

The pri-miRNA basal junction recognition is crucial for the Microprocessor activity. The lower stem of pri-miRNAs is usually an almost perfect dsRNA region that may only accept few mismatches or small bulges. As shown in the present disclosure, the asymmetric internal loop (AIL) at the lower stem of pri-miRNAs stimulated the single cut activity of Microprocessor which cleaves only one strand of these pri-miRNAs. Consequently, this activity reduced miRNA synthesis. Therefore, the introduction or removal of the AIL region from the lower stem of pri-miRNA could control the expression of miRNAs in human cells. In addition, modulating the size of the AIL region could also modulate miRNA expression.

As used herein, the terms "asymmetric internal loop", "asymmetric internal loop region", "AIL" and "AIL region" are used interchangeably and in their broadest sense refer to a secondary structure on the lower stem region of the pri-miRNA that resembles a bulge. As used herein, the term "bulge" refers to a protrusion or swelling from an otherwise flat surface of the pri-miRNA. Formation and size of the bulge is the result of the size of the AIL region. The size of the AIL region is dependent on the number of nucleotides on motifs [A] and [a]. In one example, the number of nucleotides on either one of motifs [A] or [a] may be 0-15. In another example, the number of nucleotides on motif [A] or [a] may be 0-9. In another example, the number of nucleotides on motif [A] or [a] may be 0, 1, 2, 3, 4, 5, 6, 7, 8, 9, 10, 11, 12, 13, 14, or 15. As used herein, the term "AILx/y" refers to a pri-miRNA that comprises an AIL region, wherein "x" and "y" refer to the numbers of nucleotides on the 5' and 3' strands of the AIL region respectively. In one example, "x" or "y" may be 0, 1, 2, 3, 4, 5, 6, 7, 8, 9, 10, 11, 12, 13, 14 or 15. In one example, the pri-miRNA that comprises an AIL region may be AIL0/0, AIL0/1, AIL0/2, AIL0/3, AIL0/4, AIL0/5, AIL0/6, AIL0/7, AIL0/8, AIL0/9, AIL0/10, AIL0/11, AIL0/12, AIL0/12, AIL0/13, AIL0/14, AIL0/15, AIL1/0, AIL1/1, AIL1/2, AIL1/3, AIL1/4, AIL1/5, AIL1/6, AIL1/7, AIL1/8, AIL1/9, AIL1/10, AIL1/11, AIL1/12, AIL1/12, AIL1/13, AIL1/14, AIL1/15, AIL2/0, AIL2/1, AIL2/2, AIL2/3, AIL2/4, AIL2/5, AIL2/6, AIL2/7, AIL2/8, AIL2/9, AIL2/10, AIL2/11, AIL2/12, AIL2/12, AIL2/13, AIL2/14, AIL2/15, AIL3/0, AIL3/1, AIL3/2, AIL3/3, AIL3/4, AIL3/5, AIL3/6, AIL3/7, AIL3/8, AIL3/9, AIL3/10, AIL3/11, AIL3/12, AIL3/12, AIL3/13, AIL3/14, AIL3/15, AIL4/0, AIL4/1, AIL4/2, AIL4/3, AIL4/4, AIL4/5, AIL4/6, AIL4/7, AIL4/8, AIL4/9, AIL4/10, AIL4/11, AIL4/12, AIL4/12, AIL4/13, AIL4/14, AIL4/15, AIL5/0, AIL5/1, AIL5/2, AIL5/3, AIL5/4, AIL5/5, AIL5/6, AIL5/7, AIL5/8, AIL5/9, AIL5/10, AIL5/11, AIL5/12, AIL5/12, AIL5/13, AIL5/14, AIL5/15, AIL6/0, AIL6/1, AIL6/2, AIL6/3, AIL6/4, AIL6/5, AIL6/6, AIL6/7, AIL6/8, AIL6/9, AIL6/10, AIL6/11, AIL6/12, AIL6/12, AIL6/13, AIL6/14, AIL6/15, AIL7/0, AIL7/1, AIL7/2, AIL7/3, AIL7/4, AIL7/5, AIL7/6, AIL7/7, AIL7/8, AIL7/9, AIL7/10, AIL7/11, AIL7/12, AIL7/12, AIL7/13, AIL7/14, AIL7/15, AIL8/0, AIL8/1, AIL8/2, AIL8/3, AIL8/4, AIL8/5, AIL8/6, AIL8/7, AIL8/8, AIL8/9, AIL8/10, AIL8/11, AIL8/12, AIL8/12, AIL8/13, AIL8/14, AIL8/15, AIL9/0, AIL9/1, AIL9/2, AIL9/3, AIL9/4, AIL9/5, AIL9/6, AIL9/7, AIL9/8, AIL9/9, AIL9/10, AIL9/11, AIL9/12, AIL9/12, AIL9/13, AIL9/14, AIL9/15, AIL10/0, AIL10/1, AIL10/2, AIL10/3, AIL1/4, AIL10/5, AIL1/6, AIL10/7, AIL1/8, AIL10/9, AIL10/10, AIL10/11, AIL10/12, AIL10/12, AIL10/13, AIL10/14, AIL10/15, AIL11/0, AIL11/1, AIL11/2, AIL11/3, AIL11/4, AIL11/5, AIL11/6, AIL11/7, AIL11/8, AIL11/9, AIL11/10, AIL11/11, AIL11/12, AIL11/12, AIL11/13, AIL11/14, AIL11/15, AIL12/0, AIL12/1, AIL12/2, AIL12/3, AIL12/4, AIL12/5, AIL12/6, AIL12/7, AIL12/8, AIL12/9, AIL12/10, AIL12/11, AIL12/12, AIL12/12, AIL12/13, AIL12/14, AIL12/15, AIL13/0, AIL13/1, AIL13/2, AIL13/3, AIL13/4, AIL13/5, AIL13/6, AIL13/7, AIL13/8, AIL13/9, AIL13/10, AIL13/11, AIL13/12, AIL13/12, AIL13/13, AIL13/14, AIL13/15, AIL14/0, AIL14/1, AIL14/2, AIL14/3, AIL14/4, AIL14/5, AIL14/6, AIL14/7, AIL14/8, AIL14/9, AIL14/10, AIL14/11, AIL14/12, AIL14/12, AIL14/13, AIL14/14, AIL14/15, AIL15/0, AIL15/1, AIL15/2, AIL15/3, AIL15/4, AIL15/5, AIL15/6, AIL15/7, AIL15/8, AIL15/9, AIL15/10, AIL15/11, AIL15/12, AIL15/12, AIL15/13, AIL15/14 or AIL15/15. The number of nucleotides on motif [A] or [a] in AIL region may be identical or different.

An AIL region may be located upstream or downstream of a cleavage site of the pri-miRNA. In one example, motif [A] may be upstream of motif [B]. In one example, motif [a] may be downstream of motif [b]. In one example, motif [A] may be 1, 2, 3, 4, 5, 6, 7, 8, 9, 10, 11, 12, 13, 14 or 15 nucleotides upstream of motif [B]. In another example, motif [A] is 3-8 nucleotides upstream of motif [B]. In another example, motif [a] may be 1, 2, 3, 4, 5, 6, 7, 8, 9, 10, 11, 12, 13, 14 or 15 nucleotides downstream of motif [b]. In another example, motif [a] is 3-8 nucleotides downstream of motif [b].

An AIL may be formed due to mismatched base pairing of nucleotides in the AIL region, or when there is a different number of nucleotides on motifs [A] and [a] in the AIL region. In one example, mismatched pairing of nucleotides in the AIL region may be formed when at least 1 nucleotide on motif [A] is not complementary to at least 1 nucleotide on motif [a]. It is generally known that when one nucleotide on motif [A] is not complementary to one nucleotide on motif [a], it is the same as when one nucleotide on motif [a] is not complementary to one nucleotide on motif [A]. Complementary pairing of nucleotides on a double stranded RNA occurs when a uracil (U) on one RNA strand binds to a arginine (A) on the other RNA strand; or when a cytosine (C) or uracil (U) on one RNA strand binds to a guanine (G) on the other RNA strand. Therefore, mismatched pairings occur when uracil (U) on one RNA strand binds to cytosine (C) on the other RNA strand. Mismatched pairings also occur when adenine (A) on one RNA strand binds to cytosine (C) or guanine (G) on the other RNA strand. In another example, mismatched pairing of nucleotides in the AIL region may be formed when 1-15 nucleotides on motif [A] are not complementary to the nucleotide on motif [a]. In another example, mismatched pairing of nucleotides in the AIL region may be formed when 1-9 nucleotides on motif [A] are not complementary to the nucleotide on motif [a]. In another example, mismatched pairing of nucleotides in the AIL region may be formed when 1, 2, 3, 4, 5, 6, 7, 8, 9, 10, 11, 12, 13, 14, 15 nucleotides on motif [A] are not complementary to the nucleotide on motif [a].

As mentioned above, a different number of nucleotides on motifs [A] and [a] also give rise to an AIL region. In one example, the difference in the number of nucleotides between motifs [A] and [a] may be 1-15. In another example, the difference in the number of nucleotides between motifs [A] and [a] may be 1-9. In another example, the difference in the number of nucleotides between motifs [A] and [a] may be 1, 2, 3, 4, 5, 6, 7, 8, 9, 10, 11, 12, 13, 14, or 15. In a preferred example, the difference in the number of nucleotides between motifs [A] and [a] is 6.

The inventors of the present disclosure have found a method of producing single cut precursor microRNA (pre-miRNA) in a host cell from a primary microRNA (pri-miRNA) as disclosed herein. Increasing the size of the AIL region increases the single cut activity of the Microprocessor, which leads to the production of single cut pre-miRNA. In one example, the method comprises: a) introducing one or more mutations in a region upstream of motif [B] and/or downstream of motif [b] to produce a genetically modified primary microRNA (pri-miRNA) comprising the following structure:

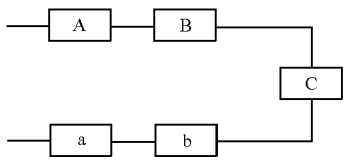

Formula II wherein motifs [A] and [a] constitute the asymmetric internal loop (AIL) region in the stem region; b) transfecting the genetically modified primary microRNA (pri-miRNA) from step b) to the host cell; wherein the single cut precursor microRNA (pre-miRNA) is produced from cleaving at motif [B]. In another example, the method comprises: a) introducing one or more mutations at one or both of motifs [A] and [a] to modulate the size of the asymmetric internal loop (AIL) region; b) transfecting the primary microRNA (pri-miRNA) from step b) to the host cell; wherein the single cut precursor microRNA (pre-miRNA) is produced from cleaving at motif [B]. In another example, the method of producing single cut precursor microRNA (pre-miRNA) in a host cell from a primary microRNA (pri-miRNA) comprising the following structure:

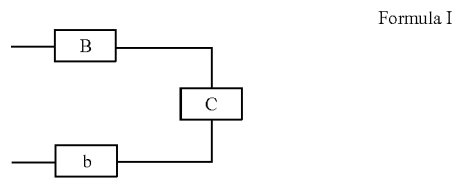

Formula I wherein [B] to [b] is in the 5' to 3' directionality to form a stem loop structure, and wherein: motifs [B] and [b] each constitute a cleavage site in the stem region; motif [C] constitute a loop region; the method comprising: a) introducing one or more mutations in a region upstream of motif [B] and/or downstream of motif [b] to produce a genetically modified primary microRNA (pri-miRNA) comprising the following structure:

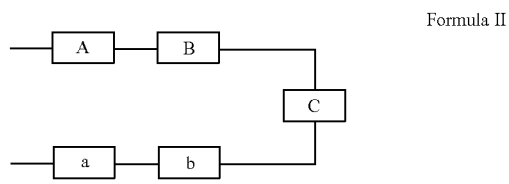

Formula II wherein motifs [A] and [a] constitute the asymmetric internal loop (AIL) region in the stem region; b) transfecting the genetically modified primary microRNA (pri-miRNA) from step b) to the host cell; wherein the single cut precursor microRNA (pre-miRNA) is produced from cleaving at motif [B]. In another example, the method of producing single cut precursor microRNA (pre-miRNA) in a host cell from a primary microRNA (pri-miRNA) comprising the following structure:

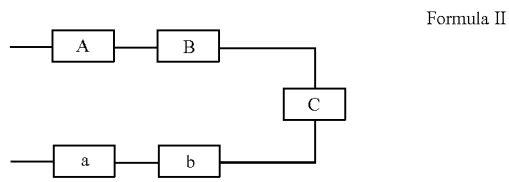

Formula II wherein [A] to [a] is in the 5' to 3' directionality to form a stem loop structure, and wherein: motifs [A] and [a] constitute the asymmetric internal loop (AIL) region in the stem region; motifs [B] and [b] each constitute a cleavage site in the stem region; motif [C] constitute a loop region; the method comprising: a) introducing one or more mutations at one or both of motifs [A] and [a] to modulate the size of the asymmetric internal loop (AIL) region; b) transfecting the primary microRNA (pri-miRNA) from step b) to the host cell; wherein the single cut precursor microRNA (pre-miRNA) is produced from cleaving at motif [B].

Controlling the size of the AIL region may also control the single cut activity and the double cut activity of the Microprocessor on primary miRNA transcripts (pri-miRNAs). This modulates the production of single cut precursor miR- NAs (pre-miRNAs) and/or double cut precursor miRNAs (pre-miRNAs), which controls the expression of miRNA (FIG. 1B).

The inventors of the present disclosure have found a method of increasing production levels of single cut precursor microRNA (pre-miRNA) and decreasing production levels of double cut precursor microRNA (pre-miRNA) in a host cell from a primary microRNA (pri-miRNA) as disclosed herein. In one example, the method comprises: a) introducing one or more mutations in a region upstream of motif [B] and/or downstream of motif [b] to produce a genetically modified primary microRNA (pri-miRNA) comprising the following structure:

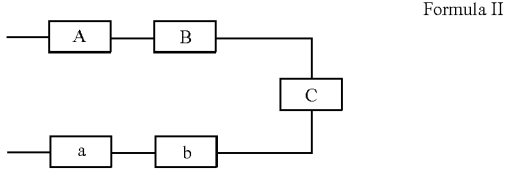

Formula II wherein motifs [A] and [a] constitute the asymmetric internal loop (AIL) region in the stem region; b) transfecting the genetically modified primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b]. In another example, the method comprises: a) introducing one or more mutations at one or both of motifs [A] and [a] to modulate the size of the asymmetric internal loop (AIL) region; b) transfecting the primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b]. In another example, the method of increasing production levels of single cut precursor microRNA (pre-miRNA) and decreasing production levels of double cut precursor microRNA (pre-miRNA) in a host cell from a primary microRNA (pri-miRNA) comprising the following structure:

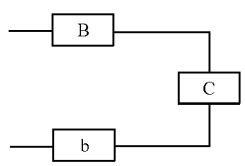

Formula I wherein [B] to [b] is in the 5' to 3' directionality to form a stem loop structure, and wherein: motifs [B] and [b] each constitute a cleavage site in the stem region; motif [C] constitute a loop region; the method comprising: a) introducing one or more mutations in a region upstream of motif [B] and/or downstream of motif [b] to produce a genetically modified primary microRNA (pri-miRNA) comprising the following structure:

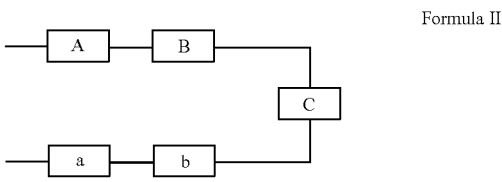

Formula II wherein motifs [A] and [a] constitute the asymmetric internal loop (AIL) region in the stem region; b) transfecting the genetically modified primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b]. In another example, the method of increasing production levels of single cut precursor microRNA (pre-miRNA) and decreasing production of double cut precursor microRNA (pre-miRNA) in a host cell from a primary microRNA (pri-miRNA) comprising the following structure:

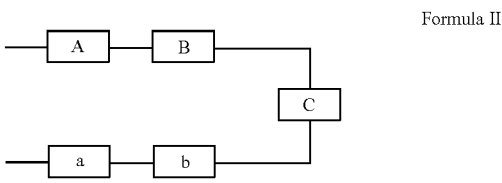

Formula II wherein [A] to [a] is in the 5' to 3' directionality to form a stem loop structure, and wherein: motifs [A] and [a] constitute the asymmetric internal loop (AIL) region in the stem region; motifs [B] and [b] each constitute a cleavage site in the stem region; motif [C] constitute a loop region; the method comprising: a) introducing one or more mutations at one or both of motifs [A] and [a] to modulate the size of the asymmetric internal loop (AIL) region; b) transfecting the primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b].

The AIL region in the pri-miRNA may be naturally occurring, or may be genetically inserted by introducing one or more mutations to result in a genetically modified pri-miRNA. As used herein, the term "genetically modified pri-miRNA" refers to a pri-miRNA as described herein that has modifications made to the AIL region by gene editing techniques. The inventors of the present disclosure have also found a genetically modified primary microRNA (pri-miRNA) comprising the following structure:

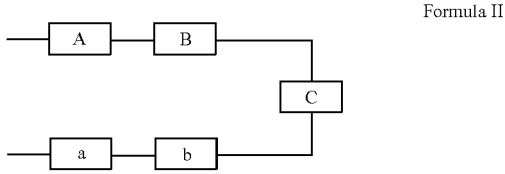

Formula II wherein [A] to [a] is in the 5' to 3' directionality to form a stem loop structure, and wherein: motifs [A] and [a] constitute an asymmetric internal loop (AIL) region in the stem region; motifs [B] and [b] each constitute a cleavage site in the stem region; motif [C] constitute a loop region; wherein one or both motifs [A] and [a] comprise 0-9 nucleotides; wherein motif [A] comprises at least 1 nucleotide that does not match to any nucleotide in motif [a]; or wherein motif [a] comprises at least 1 nucleotide that does not match to any nucleotide in motif [A]. In one example, the genetically modified primary microRNA (pri-miRNA) comprises the structure of the pri-miRNA as disclosed herein. In another example, the genetically modified primary microRNA (pri-miRNA) has motif [a] comprising 1-15 nucleotides, 1-14 nucleotides, 1-13 nucleotides, 1-12 nucleotides, 1-11 nucleotides, 1-10 nucleotides, 1-9 nucleotides, 1-8 nucleotides, 1-7 nucleotides, 1-6 nucleotides, 1-5 nucleotides, 1-4 nucleotides, 1-3 nucleotides, or 1-2 nucleotides more than motif [A] to create a larger bulge on motif [a]. In a preferred example, the genetically modified primary microRNA (pri-miRNA) has motif [a] comprising 1-9 nucleotides more than motif [A] to create a larger bulge on motif [a]. In another example, the genetically modified primary microRNA (pri-miRNA) has motif [A] comprising 1-15 nucleotides, 1-14 nucleotides, 1-13 nucleotides, 1-12 nucleotides, 1-11 nucleotides, 1-10 nucleotides, 1-9 nucleotides, 1-8 nucleotides, 1-7 nucleotides, 1-6 nucleotides, 1-5 nucleotides, 1-4 nucleotides, 1-3 nucleotides, or 1-2 nucleotides more than motif [a] to create a larger bulge on motif [A]. In a preferred example, the genetically modified primary microRNA (pri-miRNA) has motif [A] comprising at least 1-9 nucleotides more than motif [a] to create a larger bulge on motif [A]. In another example, the genetically modified primary microRNA (pri-miRNA) has motif [A] comprising 1, 2, 3, 4, 5, 6, 7, 8, 9, 10, 11, 12, 13, 14, or 15 nucleotides more than motif [a] to create a larger bulge on motif [A]. In another example, the genetically modified primary microRNA (pri-miRNA) has motif [a] comprising 1, 2, 3, 4, 5, 6, 7, 8, 9, 10, 11, 12, 13, 14, or 15 nucleotides more than motif [A] to create a larger bulge on motif [a]. In a preferred example, the genetically modified primary microRNA (pri-miRNA) has motif [a] comprising 6 nucleotides more than motif [A] to create a larger bulge on motif [a]. In another example, the genetically modified primary microRNA (pri-miRNA) comprises SEQ ID NO: 1. In another example, the genetically modified primary microRNA (pri-miRNA) can be produced by any one of the methods as disclosed herein.

The method of the present invention uses the gene editing techniques to modulate the size of asymmetric internal loop (AIL) at the lower stem region of pri-miRNA. The gene editing techniques comprises those that are commonly used, for example, mutagenesis, cloning, CRISPR-Cas9, Cre-Lox technique, and Transcription activator-like effector nucleases (TALEN). Such gene editing techniques may also be employed to modulate the size of the AIL region. In one example, the size of the AIL region may be increased or decreased by introducing one or more mutations.

As used herein, the term "mutation" refers to a natural or artificial modification, or genetic alteration of the genome or part of a pri-miRNA sequence of any biological organism, virus or extra-chromosomal genetic element. This mutation can be induced artificially using, but not limited to, chemicals and radiation, but can also occur spontaneously during nucleic acid replication in cell division. Mutations may or may not produce discernible changes in the observable characteristics (phenotype) of an organism. There are various types of mutations known, which can either be small-scale mutations or large-scale mutations. Examples of small-scale mutations are, but are not limited to, substitution mutations, silent mutations, missense mutations, nonsense mutations, insertions, and deletions. Examples of large-scale mutations are, but are not limited to, amplifications, deletions, chromosomal translocations, interstitial deletions, chromosomal inversions and mutations that result in a loss of heterozygosity. Mutations can also be grouped by their effect on the function of the resulting product. These include, but are not limited to, loss-of-function (inactivating) mutations, gain-of-function (activating) mutations, dominant-negative (antimorphic) mutations, lethal mutations and back or reverse mutations. Insertion, for example, is a mutation wherein one or more nucleotides are inserted into a new region along the sequence. Substitution, for example, is a mutation that exchanges one nucleotide base for another (for example, switching an A to a G). Deletion, for example, is a mutation wherein one or more nucleotides are removed from the sequence.

The one or more mutations can increase the size of the AIL region. In one example, the one or more mutations comprises insertion and/or substitution of at least one nucleotide to increase the size of one or both motifs [A] and [a]. Insertion of at least one nucleotide to motif [A] and/or [a] may either increase the bulge of the AIL region, or result in a different number of nucleotides on motifs [A] and [a]. Substitution of at least one nucleotide in motif [A] and/or [a] can create mismatched base pairing of nucleotides in the AIL region. In another example, the one or more mutations comprises insertion and/or substitution of at least 2 nucleotides, at least 3 nucleotides, at least 4 nucleotides, at least 5 nucleotides, at least 6 nucleotides, at least 7 nucleotides, at least 8 nucleotides or at least 9 nucleotides to increase the size of one or both motifs [A] and [a]. In another example, the one or more mutations comprises insertion of 1 to 15 nucleotides, 1 to 14 nucleotides, 1 to 13 nucleotides, 1 to 12 nucleotides, 1 to 11 nucleotides, 1 to 10 nucleotides, 1 to 9 nucleotides, 1 to 8 nucleotides, 1 to 7 nucleotides, 1 to 6 nucleotides, 1 to 5 nucleotides, 1 to 4 nucleotides, 1 to 3 nucleotides, or 1 to 2 nucleotides in one or both motifs [A] and [a] to increase the size of one or both motifs [A] and [a]. In a preferred example, the one or more mutations comprises insertion of 1-9 nucleotides in one or both motifs [A] and [a] to increase the size of one or both motifs [A] and [a]. In another example, the one or more mutations comprises insertion of 1, 2, 3, 4, 5, 6, 7, 8, 9, 10, 11, 12, 13, 14, or 15 nucleotides in one or both motifs [A] and [a] to increase the size of one or both motifs [A] and [a]. In a preferred example, the one or more mutations comprise insertion of 1 to 9 nucleotides in motif [A] to increase the size of motif [A]. In another preferred example, the one or more mutations comprise insertion of 1 to 9 nucleotides in motif [a] to increase the size of motif [a]. In another example, the one or more mutations comprise substitution of at least one nucleotide in one or both motifs [A] and [a] to produce at least one mismatched pair in the asymmetric internal loop (AIL) region to increase the size of one or both motifs [A] and [a].

In one example, the one or more mutations comprises substitution of at least 2 nucleotides, at least 3 nucleotides, at least 4 nucleotides, at least 5 nucleotides, at least 6 nucleotides, at least 7 nucleotides, at least 8 nucleotides or at least 9 nucleotides to increase the size of one or both motifs [A] and [a]. In another example, the one or more mutations comprises substitution of 1 to 15 nucleotides, 1 to 14 nucleotides, 1 to 13 nucleotides, 1 to 12 nucleotides, 1 to 11 nucleotides, 1 to 10 nucleotides, 1 to 9 nucleotides, 1 to 8 nucleotides, 1 to 7 nucleotides, 1 to 6 nucleotides, 1 to 5 nucleotides, 1 to 4 nucleotides, 1 to 3 nucleotides, or 1 to 2 nucleotides in one or both motifs [A] and [a] to increase the size of one or both motifs [A] and [a]. In a preferred example, the one or more mutations comprise substitution of 1-9 nucleotides in motif [A] to increase the size of one or both motifs [A] and [a]. In another preferred example, the one or more mutations comprise substitution of 1-9 nucleotides in motif [a] to increase the size of one or both motifs [A] and [a]. In another example, the one or more mutations comprises substitution of 1, 2, 3, 4, 5, 6, 7, 8, 9, 10, 11, 12, 13, 14, or 15 nucleotides in one or both motifs [A] and [a] to increase the size of one or both motifs [A] and [a].

The inventors of the present disclosure have also found a method of decreasing production levels of single cut precursor microRNA (pre-miRNA) and increasing production of double cut precursor microRNA (pre-miRNA) in a host cell from a primary microRNA (pri-miRNA) as disclosed herein. In one example, the method comprises: a) introducing one or more mutations at one or both of motifs [A] and [a] to modulate the size of the asymmetric internal loop (AIL) region; b) transfecting the primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b]. In another example, the method of decreasing production levels of single cut precursor microRNA (pre-miRNA) and increasing production of double cut precursor microRNA (pre-miRNA) in a host cell from a primary microRNA (pri-miRNA) comprising the following structure:

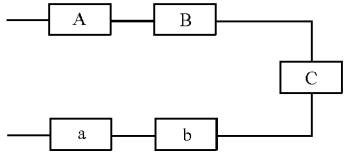

Formula II wherein [A] to [a] is in the 5' to 3' directionality to form a stem loop structure, and wherein: motifs [A] and [a] constitute the asymmetric internal loop (AIL) region in the stem region; motifs [B] and [b] each constitute a cleavage site in the stem region; motif [C] constitute a loop region; the method comprising: a) introducing one or more mutations at one or both of motifs [A] and [a] to modulate the size of the asymmetric internal loop (AIL) region; b) transfecting the primary microRNA (pri-miRNA) from step b) to the host cell; c) producing one or both single cut precursor microRNA (pre-miRNA) and double cut precursor microRNA (pre-miRNA) by controlling cleaving at one or both motifs [B] and [b]; wherein the single cut precursor microRNA (pre-miRNA) is produced from cleaving at motif [B]; wherein the double cut precursor microRNA (pre-miRNA) is produced from cleaving at motifs [B] and [b].

The one or more mutations can decrease the size of the AIL region. In one example, the one or more mutations comprises deletion and/or substitution of at least one nucleotide to decrease the size of one or both motifs [A] and [a]. Deletion of at least one nucleotide to motif [A] and/or [a] may remove any extra nucleotides to result in a decreased number of nucleotides on motifs [A] and [a], thereby decreasing the bulge of the AIL region, or even eliminating the AIL region entirely. Substitution of at least one nucleotide in motif [A] and/or [a] can correct and remove any mismatched base pairing of nucleotides in the AIL region. In another example, the one or more mutations comprises deletion and/or substitution of at least 2 nucleotides, at least 3 nucleotides, at least 4 nucleotides, at least 5 nucleotides, at least 6 nucleotides, at least 7 nucleotides, at least 8 nucleotides or at least 9 nucleotides to decrease the size of one or both motifs [A] and [a]. In another example, the one or more mutations comprises deletion of 1 to 15 nucleotides, 1 to 14 nucleotides, 1 to 13 nucleotides, 1 to 12 nucleotides, 1 to 11 nucleotides, 1 to 10 nucleotides, 1 to 9 nucleotides, 1 to 8 nucleotides, 1 to 7 nucleotides, 1 to 6 nucleotides, 1 to 5 nucleotides, 1 to 4 nucleotides, 1 to 3 nucleotides, or 1 to 2 nucleotides in one or both motifs [A] and [a] to decrease the size of one or both motifs [A] and [a]. In a preferred example, the one or more mutations comprises deletion of 1-9 nucleotides in one or both motifs [A] and [a] to decrease the size of one or both motifs [A] and [a]. In another example, the one or more mutations comprises deletion of 1, 2, 3, 4, 5, 6, 7, 8, 9, 10, 11, 12, 13, 14, or 15 nucleotides in one or both motifs [A] and [a] to decrease the size of one or both motifs [A] and [a]. In a preferred example, the one or more mutations comprise deletion of 1 to 9 nucleotides in motif [A] to decrease the size of motif [A]. In another preferred example, the one or more mutations comprise deletion of 1 to 9 nucleotides in motif [a] to decrease the size of motif [a]. In another example, the one or more mutations comprise substitution of at least one nucleotide in one or both motifs [A] and [a] to produce at least one matched pair in the asymmetric internal loop (AIL) region to decrease the size of one or both motifs [A] and [a]. In one example, the one or more mutations comprises substitution of at least 2 nucleotides, at least 3 nucleotides, at least 4 nucleotides, at least 5 nucleotides, at least 6 nucleotides, at least 7 nucleotides, at least 8 nucleotides or at least 9 nucleotides to decrease the size of one or both motifs [A] and [a]. In another example, the one or more mutations comprises substitution of 1 to 15 nucleotides, 1 to 14 nucleotides, 1 to 13 nucleotides, 1 to 12 nucleotides, 1 to 11 nucleotides, 1 to 10 nucleotides, 1 to 9 nucleotides, 1 to 8 nucleotides, 1 to 7 nucleotides, 1 to 6 nucleotides, 1 to 5 nucleotides, 1 to 4 nucleotides, 1 to 3 nucleotides, or 1 to 2 nucleotides in one or both motifs [A] and [a] to decrease the size of one or both motifs [A] and [a]. In a preferred example, the one or more mutations comprise substitution of 1-9 nucleotides in motif [A] to decrease the size of one or both motifs [A] and [a]. In another preferred example, the one or more mutations comprise substitution of 1-9 nucleotides in motif [a] to decrease the size of one or both motifs [A] and [a]. In another example, the one or more mutations comprises substitution of 1, 2, 3, 4, 5, 6, 7, 8, 9, 10, 11, 12, 13, 14, or 15 nucleotides in one or both motifs [A] and [a] to decrease the size of one or both motifs [A] and [a].

The inventors of the present disclosure have found a method of modulating expression levels of microRNA (miRNA) in a host cell comprising modulating expression levels of one or both of single cut precursor microRNA (pre-miRNA) and double cut precursor microRNA (pre-miRNA) using the methods as described herein. As used herein, the term "host cell" refers to a cell derived from an animal including, but not limited to, a mammal or a bird. "Mammal" includes humans and both domestic animals such as laboratory animals and household pets, (e.g. cats, dogs, swine, cattle, sheep, goats, horses, rabbits), and non-domestic animals such as wildlife, fowl, birds and the like. In one example, the host cell is a cell from a cell line that is derived from an animal. In one example, the host cell is a human cell. In one example, increasing the expression levels of single cut precursor microRNA (pre-miRNA) decreases the expression levels of microRNA (miRNA) in a host cell. In another example, increasing the expression levels of double cut precursor microRNA (pre-miRNA) increases the expression levels of microRNA (miRNA) in a host cell.

The inventors of the present disclosure have also found a method of modulating expression levels of microRNA (miRNA) in a subject comprising modulating expression levels of one or both of single cut precursor microRNA (pre-miRNA) and double cut precursor microRNA (pre-miRNA) using the methods as described herein. In one example, the method further comprises a step of detecting the absence or presence of a microRNA (miRNA) of a sample obtained from the subject. As used herein, the term "subject" refers to an animal, preferably a mammal or a bird. "Mammal" includes humans and both domestic animals such as laboratory animals and household pets, (e.g. cats, dogs, swine, cattle, sheep, goats, horses, rabbits), and non-domestic animals such as wildlife, fowl, birds and the like. In a preferred example, the mammal is a human. As used herein, the term "sample" refers to a specimen taken, obtained or derived from an organism. The sample can be obtained or derived from an animal.

The methods as disclosed herein can be used on its own, or in combination with other methods. In one example, the methods as disclosed herein can be included in a method to generate a stable cell line, wherein the expression levels of miRNA can be controlled to examine cellular functions of miRNAs. The methods as disclosed herein can be used in vitro, in vivo or ex vivo.

As the methods as disclosed herein only targets the lower stem region of pri-miRNA that does not make up the miRNA sequences, the methods would not interfere with miRNA sequences. This prevents the production of abnormal or unwanted miRNA sequences, which might lead to unwanted off-target gene expressions that causes aberrant functions. Therefore, the methods as disclosed herein can also be used to treat different diseases caused by aberrant miRNA expressions, without the disadvantage of unwanted off-target gene expressions. The inventors of the present disclosure have found a method of treating a disease in a subject, comprising: a) detecting the presence or absence of a mutation in a microRNA related to the disease, wherein the mutation alters or disrupts expression of microRNA; b) modulating expression levels of one or both of single cut precursor microRNA (pre-miRNA) and double cut precursor microRNA (pre-miRNA) in a host cell using the method. In one example, the disease is selected from the group consisting of cancer, viral diseases, immune-related diseases, and neurodegenerative diseases.

As used in this application, the singular form "a," "an," and "the" include plural references unless the context clearly dictates otherwise. For example, the term "a genetic marker" includes a plurality of genetic markers, including mixtures and combinations thereof.

As used herein, the terms "increase" and "decrease" refer to the relative alteration of a chosen trait or characteristic in a subset of a population in comparison to the same trait or characteristic as present in the whole population. An increase thus indicates a change on a positive scale, whereas a decrease indicates a change on a negative scale. The term "change", as used herein, also refers to the difference between a chosen trait or characteristic of an isolated population subset in comparison to the same trait or characteristic in the population as a whole. However, this term is without valuation of the difference seen.

As used herein, the term "about" in the context of concentration of a substance, size of a substance, length of time, or other stated values means+/−5% of the stated value, or +/−4% of the stated value, or +/−3% of the stated value, or +/−2% of the stated value, or +/−1% of the stated value, or +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Material and Methods

Preparation of the Substrates

The pri-miRNAs were synthesized by in vitro transcription (IVT) in 20 μl reaction mixture containing 200 ng of double-stranded DNA templates using MEGAscript T7 Kit (Invitrogen). The DNA templates were prepared by polymerase chain reaction (PCR) with the proper primers. The PCR templates are either the genomic DNAs or pri-miRNA-containing vectors. The IVT mixture was incubated at 37° C. overnight. The reaction was stopped by adding 20 μl of 2×TBE-Urea sample buffer [20 mM Tris-HCl (pH 7.5), 20 mM EDTA, 8 M Urea], heated at 75° C. for 5 min, and separated by 10% urea polyacrylamide gel electrophoresis (Urea-PAGE) gel. The RNAs were gel-eluted overnight, precipitated by Isopropanol, washed by 80% ethanol, dried, and finally dissolved in distilled water. The RNA concentration was measured by Nanodrop and the RNA quality was assessed by 10% Urea-PAGE before usage. The purified RNAs were stored at −80° C.

Pri-miRNA Processing Assay

Figure 2:
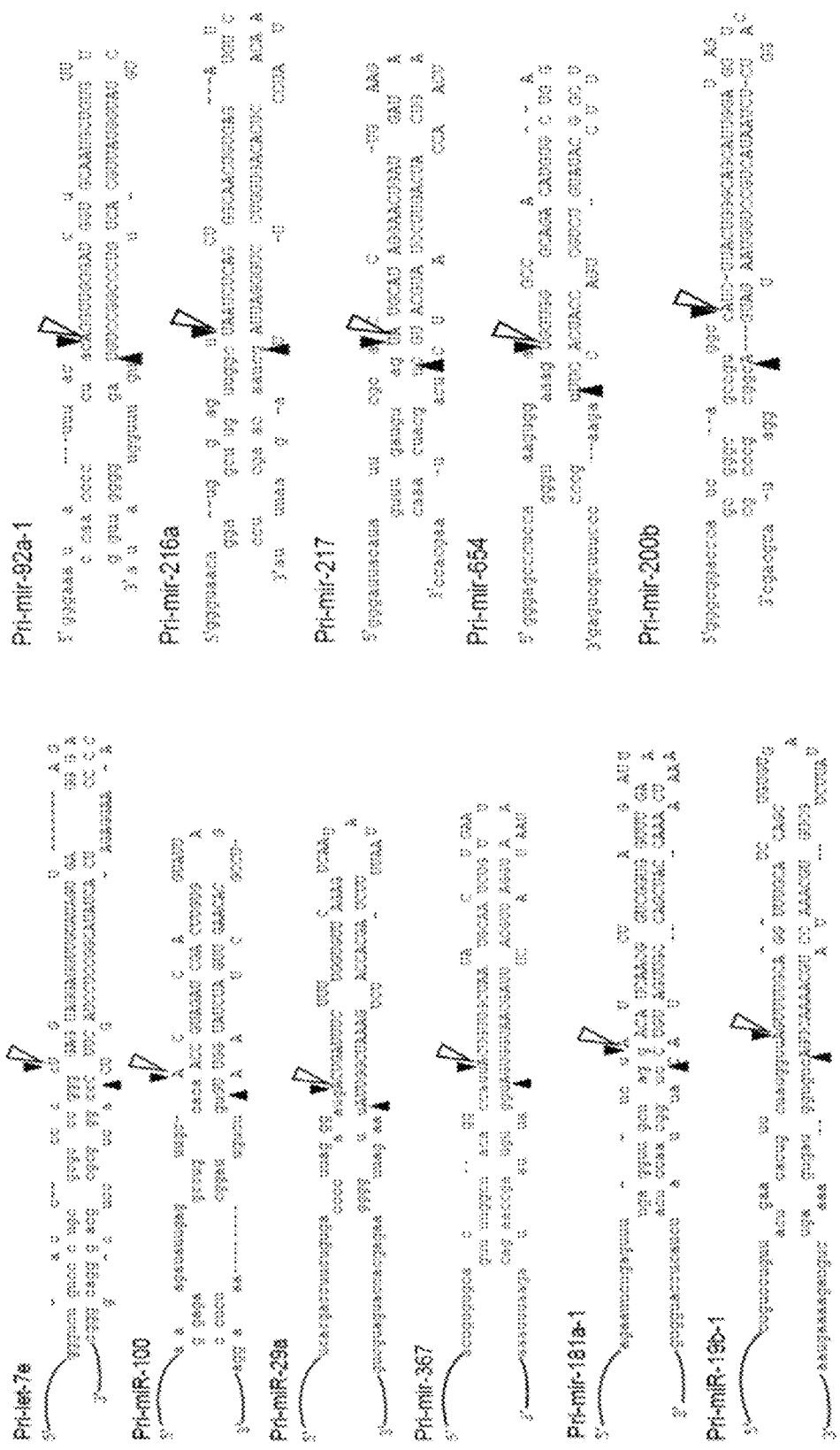
FIG. 2 shows representative images of primary microRNA (pri-miRNA) and images of RNA bands visualized on Urea polyacrylamide gel electrophoresis (Urea PAGE) gels and verification of the single cut product by NGS (Next Generation Sequencing).
Figure 2:
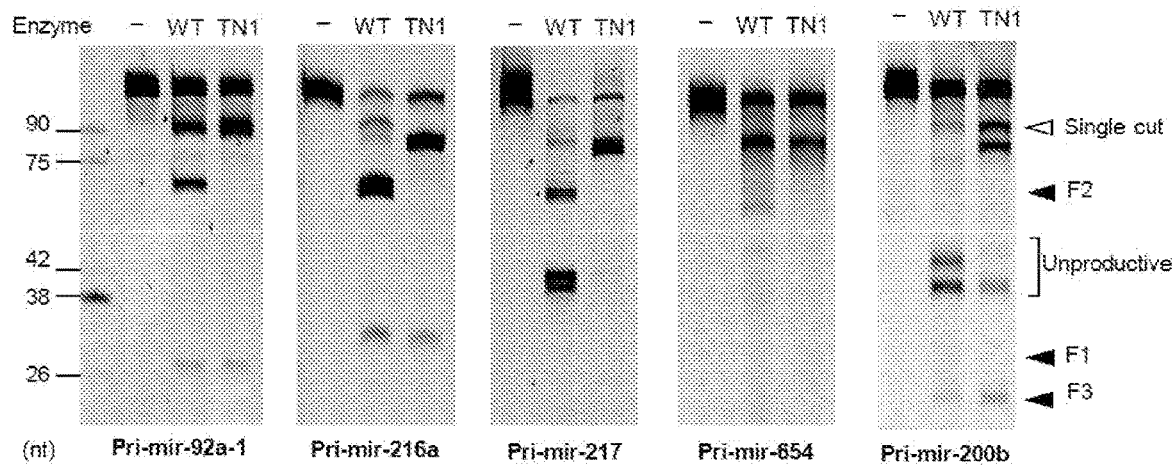
Figure 2:
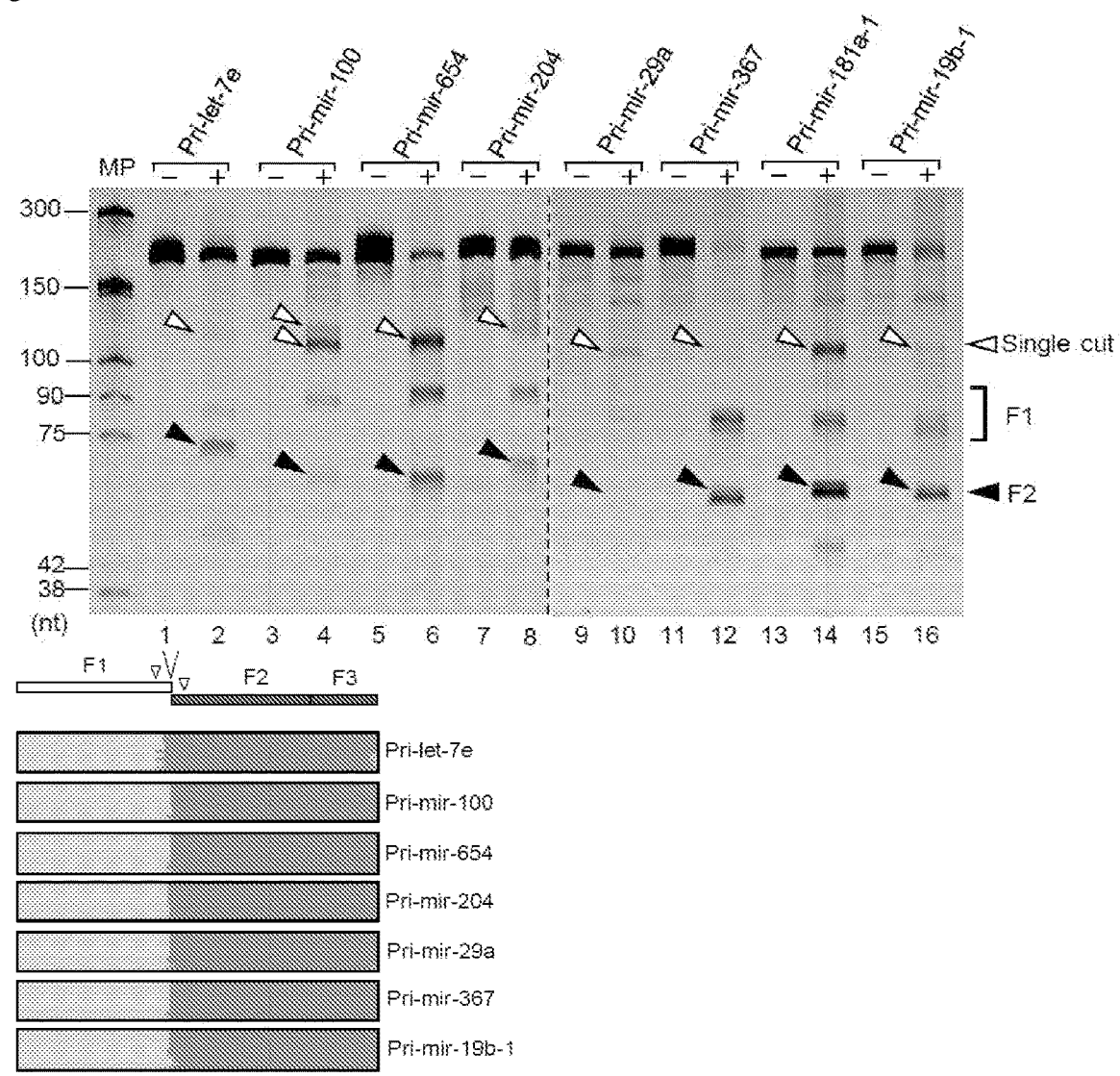
Figure 3:
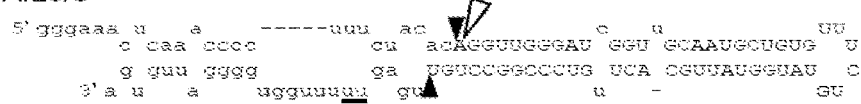
FIG. 3 shows representative images of primary microRNA (pri-miRNA) of pri-mir-92a-1 and its variants with the different AIL sizes and images of RNA bands visualized on Urea polyacrylamide gel electrophoresis (Urea PAGE) gels.
Figure 3:
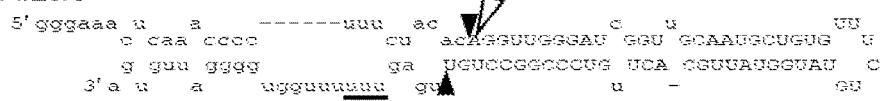
Figure 3:
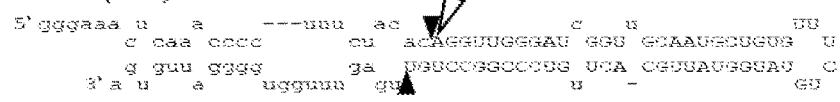
Figure 3:
Figure 3:
Figure 3:
Figure 3:
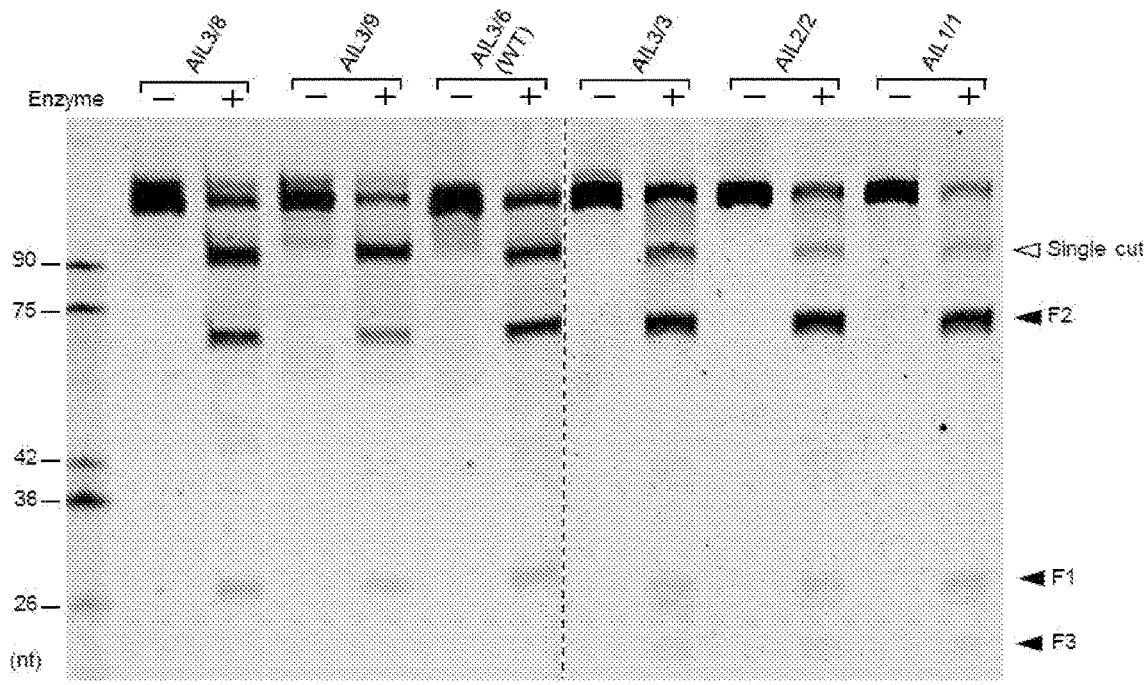
Figure 4:
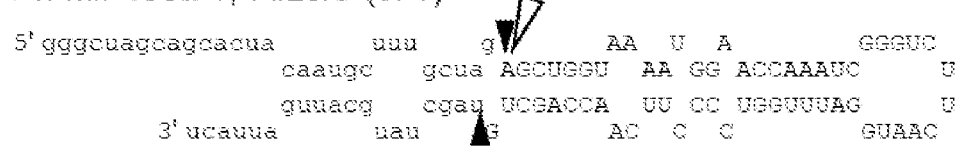
FIG. 4 shows representative images of primary microRNA (pri-miRNA) of pri-mir-133a-1, pri-mir-217, pri-mir-204, pri-mir-181a-1 and their variants with the different AIL sizes and images of RNA bands visualized on Urea polyacrylamide gel electrophoresis (Urea PAGE) gels.
Figure 4:
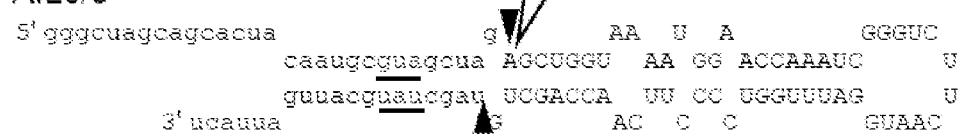
Figure 4:
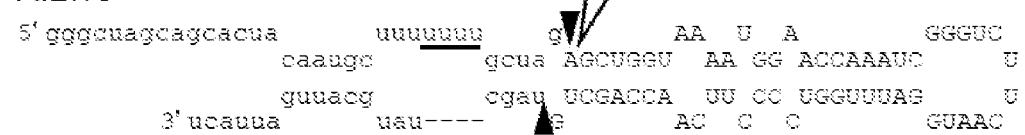
Figure 4:
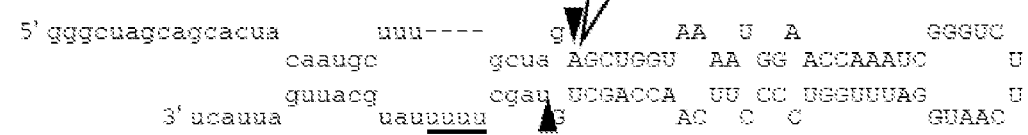
Figure 4:
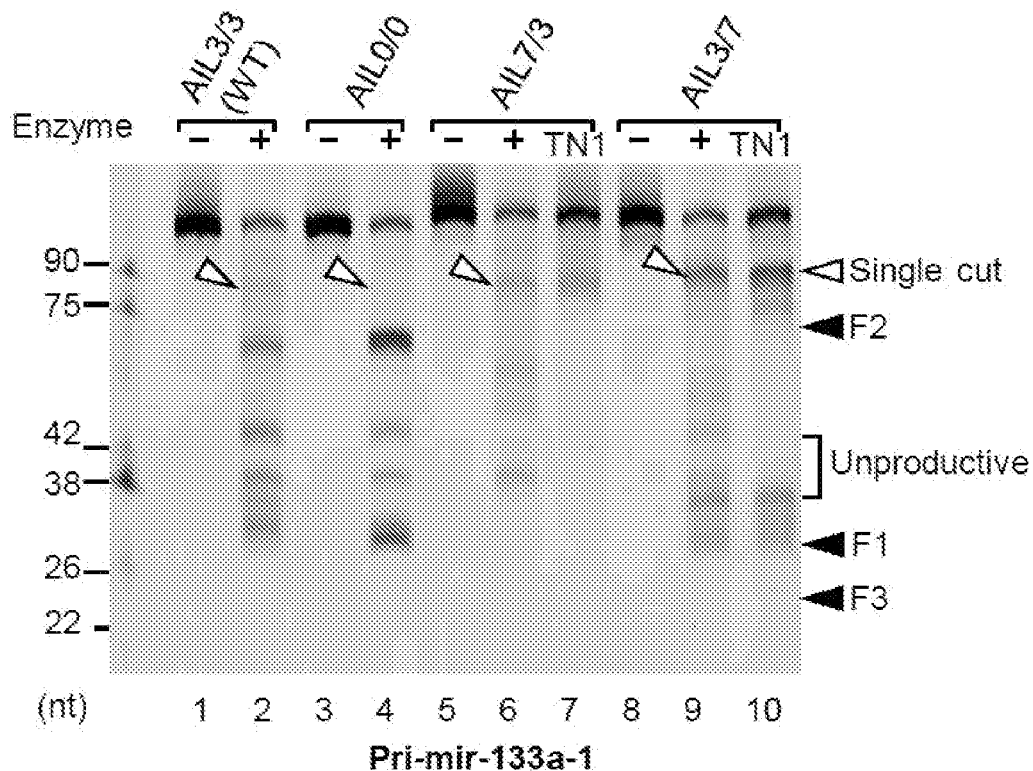
Figure 4:
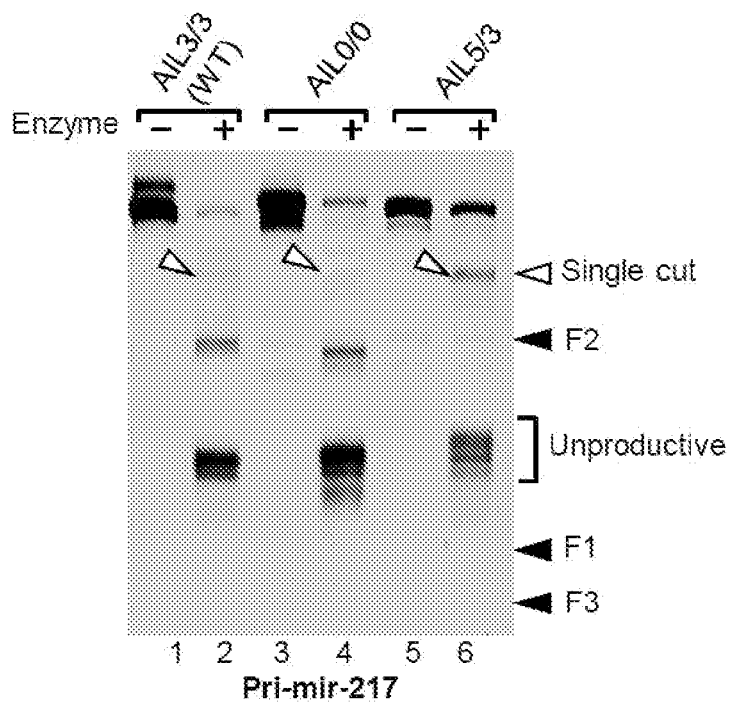
Figure 4:
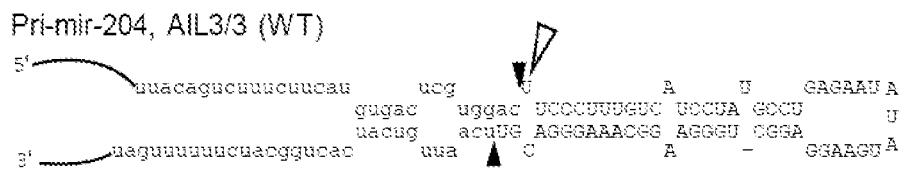
Figure 4:
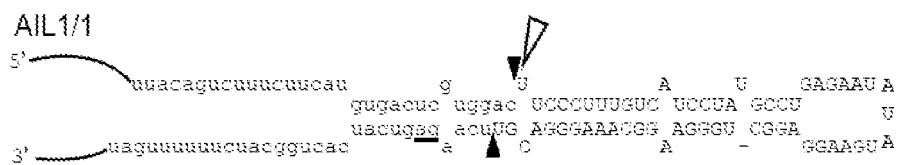
Figure 4:
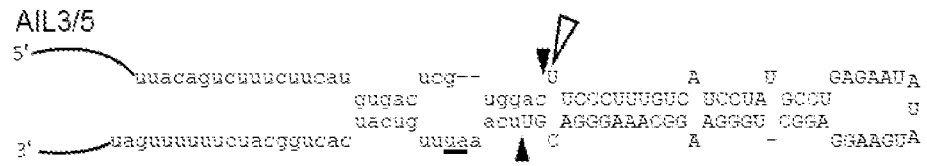
Figure 4:
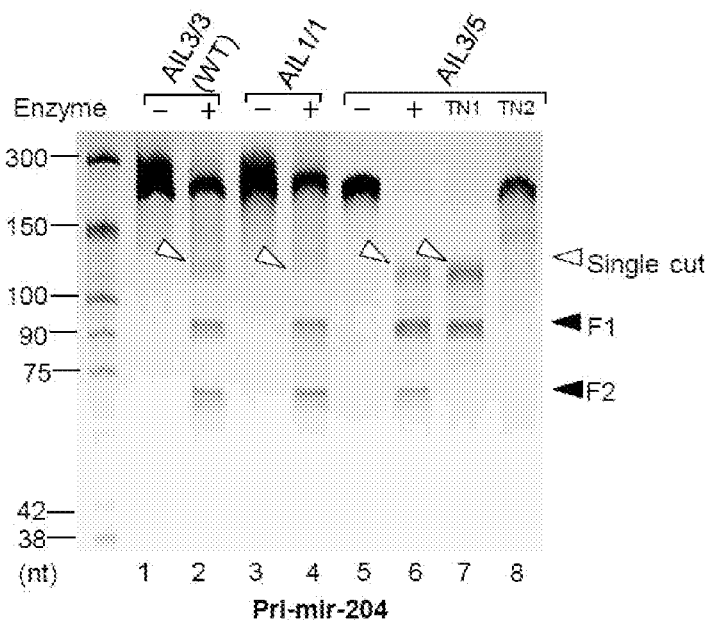
Figure 4:
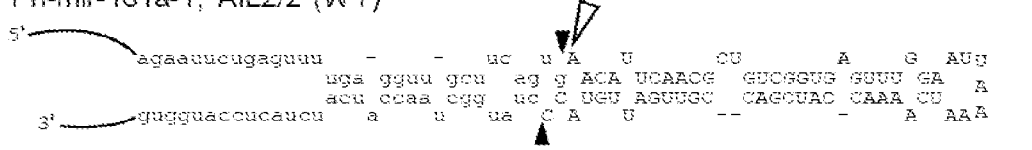
Figure 4:
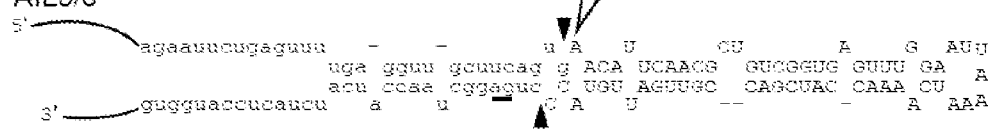
Figure 4:
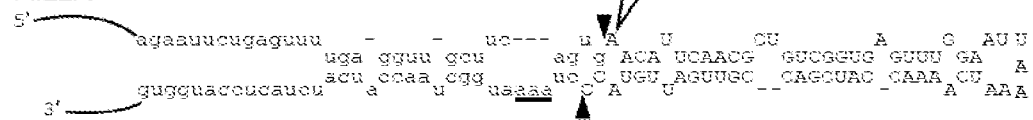
Figure 4:
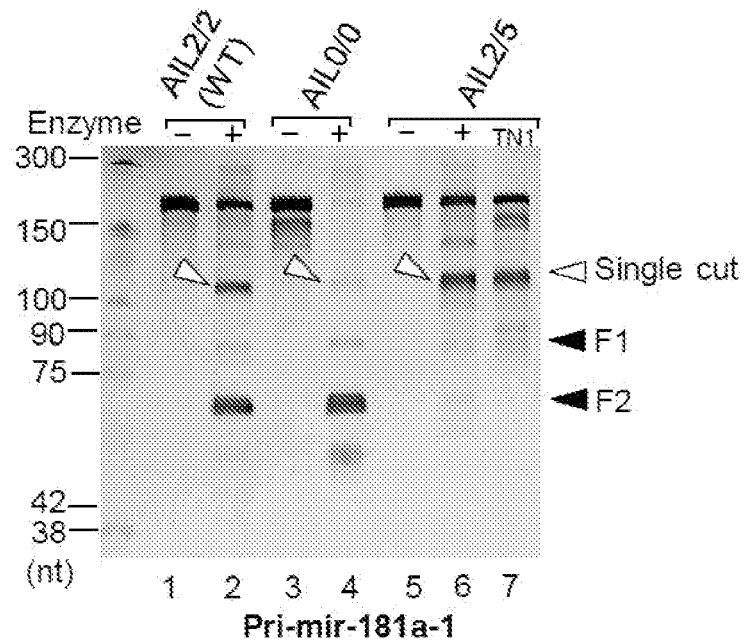

The pri-miRNA processing assay was carried out at 37° C. in 10 μl of a buffer containing 50 mM Tris-HCl (pH 7.5), 150 mM NaCl, 10% glycerol, 0.2 μg/μl BSA, 1 mM DTT and 2 mM MgCl2. Five pmol of each pri-miRNA were incubated with 6 pmol of Microprocessor for 2 hours at 37° C. (FIGS. 2C, 4F and 4H). Five pmol of each pri-miRNA were incubated with 8 pmol of Microprocessor for 2 hours at 37° C. (FIGS. 2B, 3B, 4B, 4D and 5B). The reaction was stopped by adding 10 μl of 2×TBE-Urea sample buffer, and immediately chilled on ice. The stopped reaction mixture was treated with 20 μg of Proteinase K for 15 min at 37° C. followed by 15 min at 50° C. Finally, the reaction mixture was heated at 95° C. for 10 min and quickly chilled on ice before loading onto a pre-run 12% Urea-PAGE in 1×TBE buffer. Gel running condition was at 300 V for 40 min. The gel was finally stained with SYBR™ Green II RNA Gel Stain for 5 min and captured by Bio-Rad Gel Doc XR+ system. RNA band intensities were estimated using the Image Lab 3.0 program.

Vector Construction, Transfection, and Quantitative Reverse Transcription PCR (RT-qPCR)

The DNA regions encoding for the pri-miRNA sequences were cloned in the pcDNA3 vector. The cloning detail information is presented in Table 1. The sequence of the cloned pcDNA3 vectors was confirmed by Sanger sequencing. Two micrograms of wild-type (WT) or mutant pri-miRNA vector was co-transfected with 0.5 μg of pcDNA3-pri-mir-16-1 in one well of HCT116 cells in 6-well plate using Lipofectamine 3000 transfection reagent (Thermo Scientific). The total RNAs were extracted from the transfected cells two days after transfection using miRNeasy Mini Kit (Qiagen).

TABLE 1

Cloning printer list

| Backbone vector | Primer name | Primer sequences | Inserted sequence name |
|---|---|---|---|
| pcDNA3 | F-miR92a XhoI | CGCCTCGAGCTGTGGTAGTGAAAAGTCTGTAG AAAAG (SEQ ID NO: 109) | Pri-mir-92a-1 WT and Pri-mir-92a-1 AIL3/9 |
| | R-92a XbaI (WT, and AIL3/9) | GGCTCTAGACAGTGGAAGTCGAAATCTTCAGT AA (SEQ ID NO: 110) | Pri-mir-92a-1 WT and Pri-mir-92a-1 AIL3/9 |
| | F-mir216a-HindIII | AGACCCAAGCTTGGGTAACACGGATGGCTGT G (SEQ ID NO: 111) | Pri-mir-216a WT; Pri-mir-216a AIL6/2 and Pri-mir-216a AIL8/2 |
| | R-mir216a-BamHI | ACTAGTGGATCCTAGGAAATTGCTCTGTTTAG C (SEQ ID NO: 112) | Pri-mir-216a WT |
| | R-mir216a2M M-BamHI (AIL6/2 and AIL8/2) | ACTAGTGGATCCTAGGAAATTGCTCTGTTTTA GC (SEQ 1D NO: 113) | Pri-mir-216a AIL6/2 and Pri-mir-216a AIL8/2 |
| | F-mir217-HindIII | AGACCCAAGCTTGGGATTACATAGTTTTTGAT GTCGC (SEQ ID NO: 114) | Pri-mir-217 WT and Pri-mir-217 AIL5/3 |
| | R-mir217-BamHI (WT and AIL5/3) | ACTAGTGGATCCGGTGCTTGTTTAGATGCTGA (SEQ ID NO: 115) | Pri-mir-217 WT and Pri-mir-217 AIL5/3 |

TABLE 1-continued

Cloning printer list

| Backbone vector | Primer name | Primer sequences | Inserted sequence name |
|---|---|---|---|
| | F-mir654-HindIII | AGACCCAAGCTTGGGAGCCCTCCAGGGTAAGTGG (SEQ ID NO: 116) | Pri-mir-654 WT |
| | F-mir654 AIL8/3-HindIII | AGACCCAAGCTTGGGAGCCCTCCAGGGTAAAAG (SEQ ID NO: 117) | Pri-mir654 AIL8/3 |
| | R-mir654-BamHI | ACTAGTGGATCCCTCAGCGAAAGGGGGCTTCTAAAG (SEQ ID NO: 118) | Pri-mir-654 WT and Pri-mir654 AIL8/3 |
| | F-mir133a1-HindIII | AGACCCAAGCTTGGGCTAGCAGCACTACAATGC (SEQ ID NO: 119) | Pri-mir-133a-1 WT, Pri-mir-133a-1 AIL7/3 and Pri-mir-133a-1 AIL3/7 |
| | R-mir133a1-BamHI (WT and AIL7/3) | ACTAGTGGATCCAGTAATCAATGCATAGCTACAGC (SEQ ID NO: 120) | Pri-mir-133a-1 WT and Pri-mir-133a-1 AIL7/3 |
| | R-mir133a1 AIL3/7-BamHI | ACTAGTGGATCCAGTAATCAATGCATAAAAAGCTACAGC (SEQ ID NO: 121) | Pri-mir-133a-1 AIL3/7 |

Fifty nanograms of total RNA were used in the reverse transcription (RT) step using stem-loop RT primers that were designed for each miRNA. The stem-loop RT primers were bound to miRNA and are reverse transcribed to form cDNA. cDNA was quantified by qPCR using common miRNA reverse primer and miRNA-specific forward primer. The qPCR for miRNAs was performed using iTaq Universal SYBR Green Supermix (Bio-Rad).

Experimental Result

The Single Cut Activity of the Microprocessor is Exhibited on Pri-miRNAs Containing the Asymmetric Internal Loops (AIL) at the Lower Stem Primary microRNA (pri-miRNA) processing activity of the Microprocessor was examined on several pri-miRNAs containing the asymmetric internal loop (AIL) at their lower stem. It was observed that the Microprocessor showed a single cut and double cut activities on all these tested pri-miRNAs (FIGS. 2A-C). The single cut occurred on the 5'-strand of the stem of the pri-miRNA, resulting in the production of a single cut product. This single cut pre-miRNA is similarly produced by the mutant TN1-Microprocessor, wherein the mutation causes the enzyme to cleave only at the 5'-strand of pri-miRNAs. The TN1 mutant Microprocessor contains an E1045Q mutation wherein the catalytic glutamic acid residue at positions 1045 of DROSHA is mutated to a glutamine residue. This mutation blocks the catalysis of RNAseIII a of DROSHA, making DROSHA only can use RNAseIII b to carry out the 5'-strand cleavage. Since the Microprocessor displayed the single cut activity on pri-miRNAs that possess the asymmetric internal loops (AIL), various sizes of the AIL were generated in the lower stem of pri-mir-92a-1, and their effects on the Microprocessor were tested in the processing assays (FIGS. 3A and 3B). A pri-miRNA variant is labelled as "AILx/y", in which x and y refer to the numbers of nucleotides in the AIL region on the 5'- and 3'-strands respectively. It was observed that the different AIL sizes at the lower stem showed distinct ratios of the single cut to double-cut (sc/dc) activity (FIGS. 3A and 3B). The introduction of a few additional nucleotides on the 3'-strand to enlarge the size of the AIL region significantly increased the single cut activity. This is exemplified by pri-mir-92a-1 variant AIL3/8 AIL3/9, wherein 2 and 3 additional uracil nucleotides were added to the AIL region on the 3'-strand of the pri-miRNA. In these examples, the sc/dc ratio was observed to be increased by about 2 and 3.75 times (AIL3/8 and AIL3/9, respectively) compared to that in AIL3/6 (WT) (Table 2)-. In contrast, the removal or decrease of the size of the AIL region significantly decreased the sc/dc ratio. This is exemplified by the pri-mir-92a-1 variant AIL3/3, wherein 3 nucleotides, in this case ugg, were deleted from the AIL region on the 3'-strand of the pri-miRNA. In these examples, the sc/dc ratio was observed to be decreased by 6.5 times (Table 2). In addition, the pri-mir-92a-1 variants containing only 1 (AIL1/1) or 2 (AIL2/2) mismatches almost lost the single cut activity (FIGS. 3A and 3B). pri-mir-92a-1 variant AIL1/1 is produced by deleting ugg and substituting two uracil nucleotides with two guanine nucleotides on the AIL region on the 3'-strand of the pri-miRNA. AIL2/2 is produced by deleting the nucleotides ugg, and substituting a uracil with a guanine on the AIL region on the 3'-strand of the pri-miRNA. This suggests that the large AIL at the lower stem stimulates the single cut activity of Microprocessor.

TABLE 2 sc/dc ratio of pri-mir-92a-1 wildtype and variants

| | | Compared to WT | |
|---|---|---|---|
| Pri-mir-92a-1 | sc/dc ratio | Increased fold change | Decreased fold change |
| AIL3/6 (WT) | 1.1 | 1 | |
| AIL3/8 | 2.19 | 1.990909091 | |

TABLE 2-continued sc/dc ratio of pri-mir-92a-1 wildtype and variants

| Pri-mir-92a-1 | sc/dc ratio | Compared to WT | |
|---|---|---|---|
| | | Increased fold change | Decreased fold change |
| AIL3/9 | 4.13 | 3.754545455 | |
| AIL3/3 | 0.17 | | 6.470588235 |
| AIL2/2 | 0.02 | | 55 |
| AIL1/1 | 0.07 | | 15.71428571 |

It was then examined whether the presence and the size of the AIL region would impact the Microprocessor cleavage pattern on different pri-miRNAs containing the AIL region at the lower stem, like pri-mir-92a-1. Consistent with the pri-mir-92a-1 results, it was observed that the removal of or the reduction in size of the AIL in, for example, pri-mir-133a-1 variant AIL0/0, pri-mir-217 variant AIL0/0, pri-mir-181a-1 AIL0/0 and pri-mir-204 AIL1/1 markedly reduced the single cut activity but enhanced the double-cut activity of the Microprocessor on pri-mir-133a-1, pri-mir-217, pri-mir-181a-1 and pri-mir-204 (FIGS. 4A-4H). In contrast, the addition of nucleotides to increase the size of the AIL region in, for example, pri-mir-133a-1 variants AIL7/3 and AIL3/7, pri-mir-217 variant AIL5/3, pri-mir-204 variant AIL3/5, and pri-mir-181a-1 variant AIL2/5 significantly increased the single cut activity but abated the double-cut activity of the Microprocessor (FIGS. 4A-4H).

Figure 5:
FIG. 5 shows representative images of primary microRNA (pri-miRNA) of pri-mir-216a-1 and its variants with the different AIL sizes and images of RNA bands visualized on Urea polyacrylamide gel electrophoresis (Urea PAGE) gels.
Figure 5:
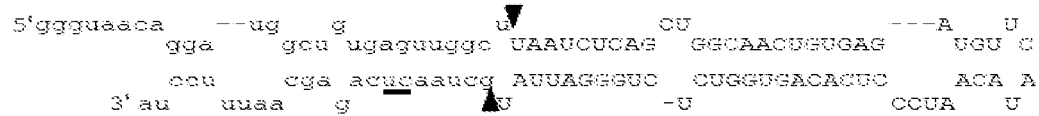
Figure 5:
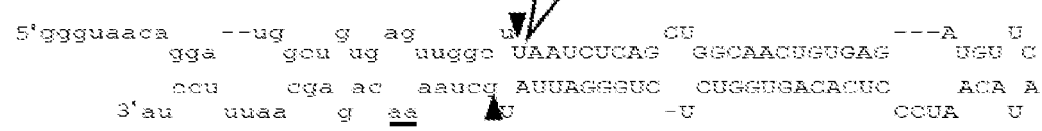
Figure 5:
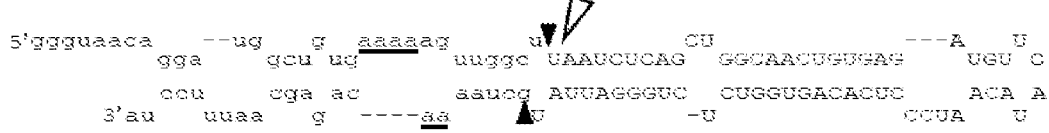
Figure 5:
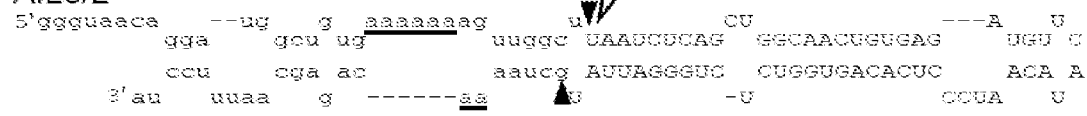
Figure 5:
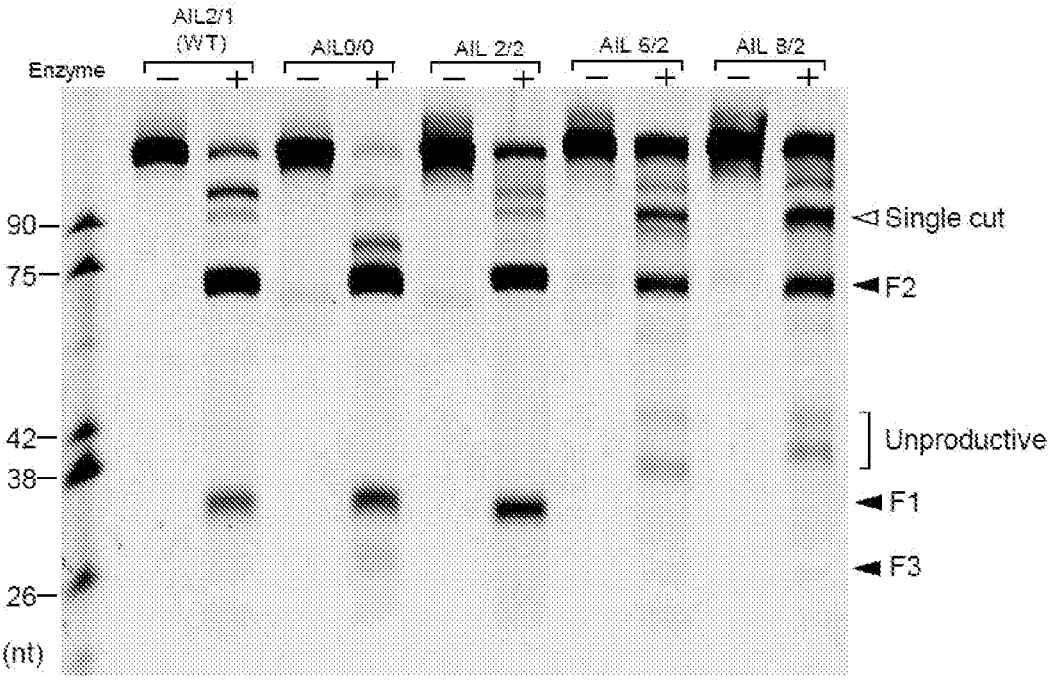

The Large AIL Facilitates the Single Cut Activity of the Microprocessor on Various Pri-miRNAs The effect of adding an AIL region to the lower stem of the pri-miRNAs that are resistant to the single cut activity of the Microprocessor complex was examined. pri-mir-216a was selected as an exemplary pri-miRNAs that are resistant to the single cut activity of the Microprocessor complex. pri-mir-216a has less than 3 unmatched nucleotides on each strand of the lower stem (FIG. 5A). The Microprocessor generated a negligible amount of the single cut product (single cut pre-miRNA) from pri-mir-216a (FIGS. 5A and 5B). The removal (AIL0/0) or the introduction of a mismatch (AIL2/2) altered the 5'-strand single cleavage level. For example, when compared with the WT (AIL2/1), pri-mir-216a-AIL0/0 resulted in less while pri-mir-216a-AIL2/2 led to marginally more single cleavage product (single cut pre-miRNA). In contrast, the addition of a large AIL profoundly enhanced the single cleavage products of Microprocessor, but largely diminished its double-cut products (double cut pre-miRNA) from pri-mir-216a-AIL6/2 and AIL8/2. The increase in size of the AIL region by additional nucleotides profoundly facilitated the Microprocessor's single cut activity resulting in an increase in the levels of single cut products, while largely diminished its double-cut activity on pri-mir-216a-AIL6/2 and AIL8/2 (FIGS. 5A and 5B) reflected by an increase in sc/dc ratio by 9.94 and 11.49 times (Table 3), respectively. Consistent with the pri-mir-92a-1 results in FIGS. 3A and 3B, the increase in size of the AIL region in pri-mir-216a considerably increased the ratios of single cut over double-cut cleavages (FIGS. 5A and 5B).

TABLE 3 sc/dc ratio of pri-mir-216a wildtype and variants

| Pri-mir-216a | sc/dc ratio | Compared to WT | |
|---|---|---|---|
| | | Increased fold change | Decreased fold change |
| AIL2/1 (WT) | 0.09 | 1 | |
| AIL0/0 | 0.05 | | 1.8 |
| AIL2/2 | 0.1 | 1.11 | |
| AIL6/2 | 0.895 | 9.94 | |
| AIL8/2 | 1.034 | 11.49 | |

Figure 6:
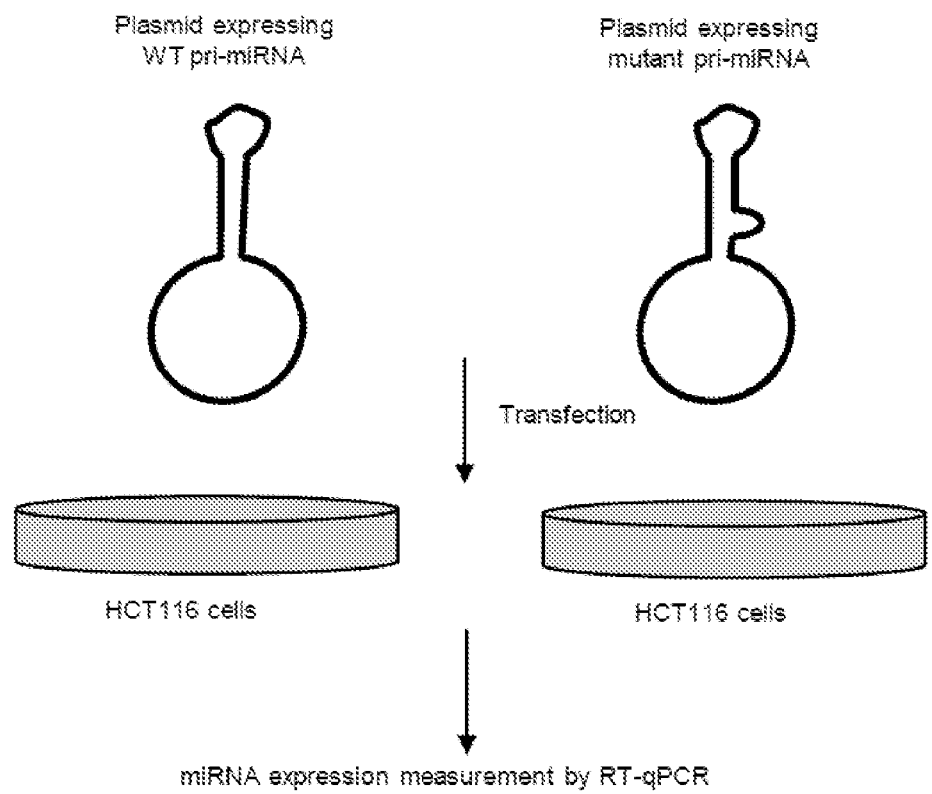
FIG. 6 shows a cartoon illustrating an example of the experimental setup of the method as described herein, and a column graph.
Figure 6:
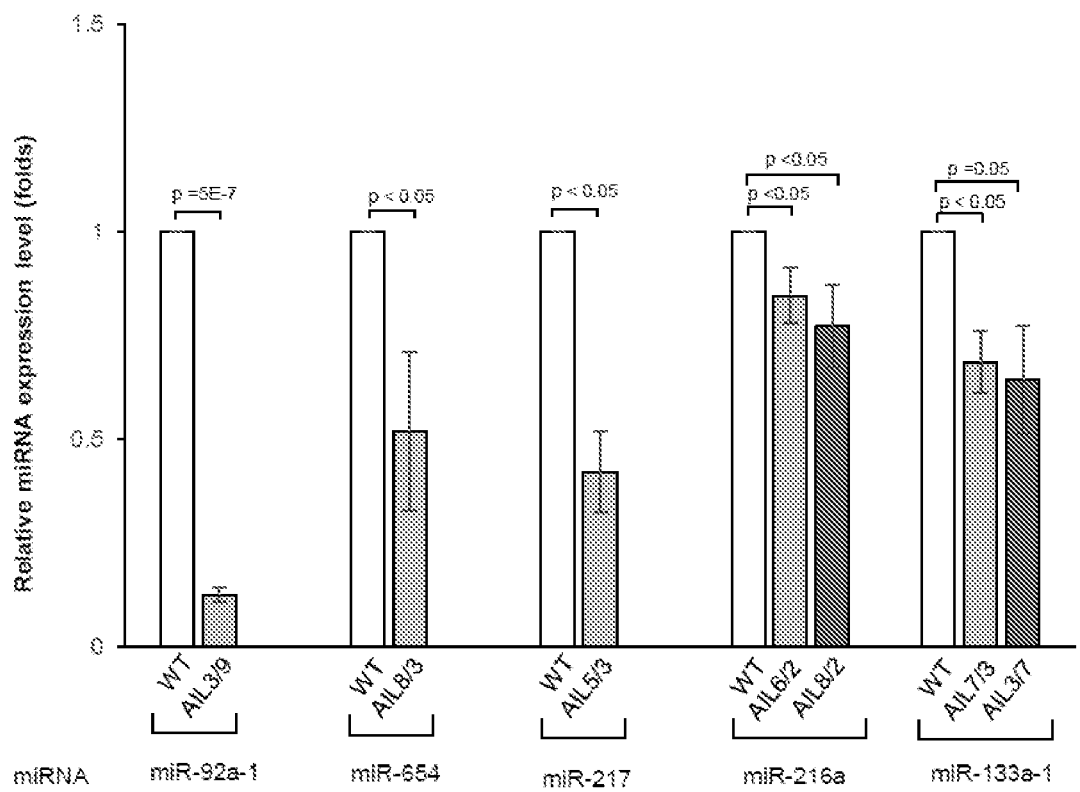

Modulate miRNA Expression in Human Cells by Changing the Size of AIL at Lower Stem of pri-miRNAs The addition of an AIL region or the increase in size of the AIL region to the lower stem of pri-miRNAs does not affect the miRNA region, and can reduce double cut pre-miRNA production in vitro. Therefore, it would be possible to modulate the size of the AIL region at the lower stem of pri-miRNA so as to modulate the level of miRNA expression. pCDNA3 vectors expressing pri-miRNA with small or large AIL regions were generated. Based on the various AIL sizes that were tested on the different pri-miRNAs, AILx/y with x<3 and y<3 would be considered as a small AIL region; whereas AILx/y with x>3 and y>3 or x+y≥6 would be considered as a large AIL region. Two vectors expressing one of the pri-miRNA variants and pri-mir-16-1 were co-transfected. miRNA expression in the transfected cells was measured by real time quantitative polymerase chain reaction (RT-qPCR) as described in the Material and Methods section. The miRNA expression from the different pri-miRNA variants was normalized to the level of miR-16-1. The data in FIG. 6 showed that the AILs significantly reduced the miRNA expression of all tested pri-miRNAs (FIGS. 6A and 6B). This was consistent with the in vitro processing data (FIGS. 3B, 4B, 4D, 4F, 4H and 5B) showing that the AIL-containing pri-miRNAs generated less pre-miRNA than the wild-type pri-miRNA. This data suggests that the addition of an AIL region or the increase in size of the AIL region would be alternative methods to knockdown miRNA expression in human cells.

In addition, based on the data, it was suggested that it would be possible to modulate the AIL region to manipulate the expression of a certain clustered miRNA without affecting neighboring miRNAs in the same cluster, for example, miR-92a-1 of the miR-17/92 cluster. The specificity in targeting clustered miRNA without affecting other neighboring miRNAs in the same cluster and outside of cluster is shown in FIG. 7C.

Modulate miRNA Expression Using Gene Editing Technique that Targets AIL

Figure 7:
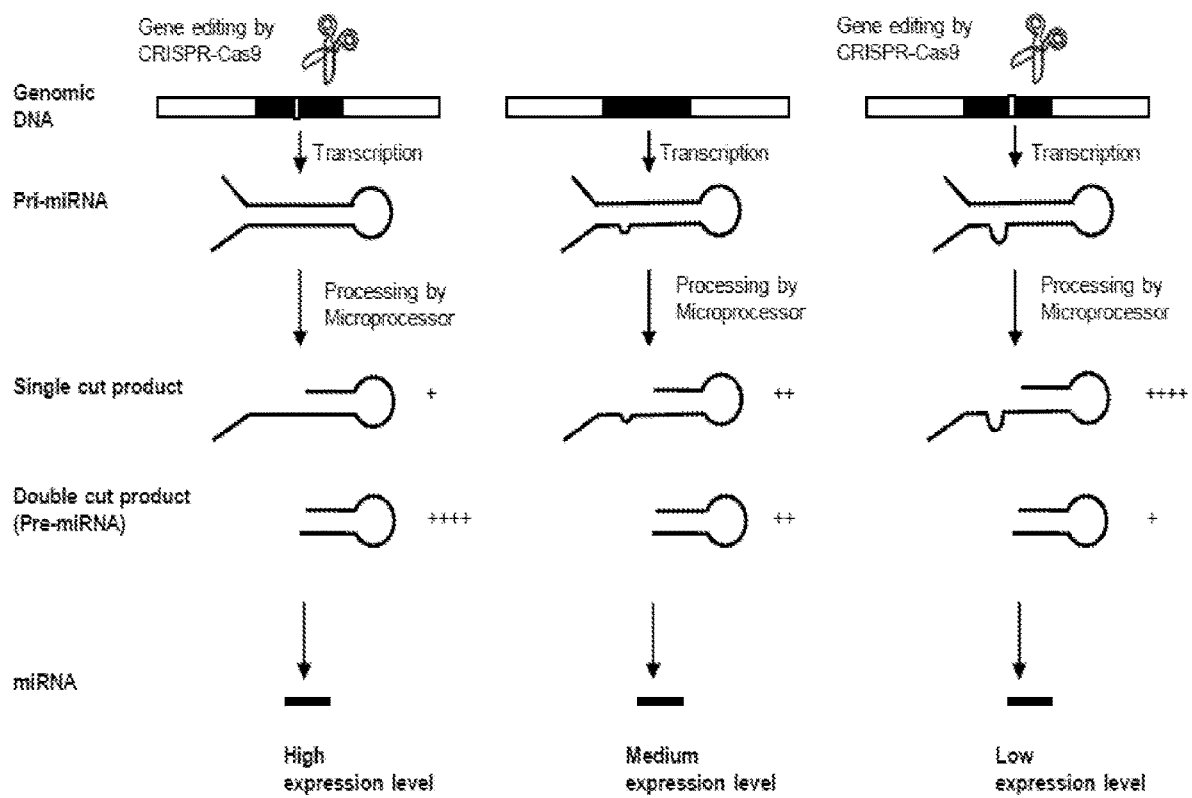
FIG. 7 shows two cartoons illustrating an example of the experimental setup of the method as described herein, and a column graph.
Figure 7:
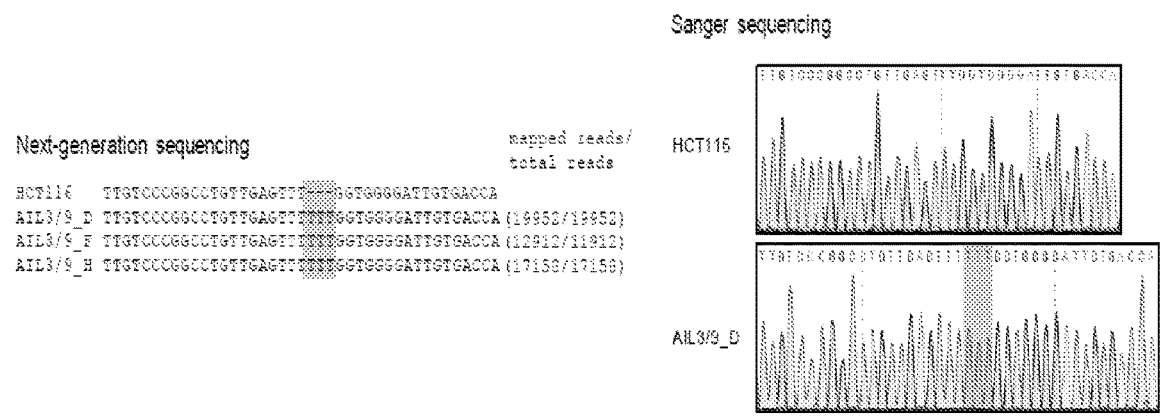
Figure 7:
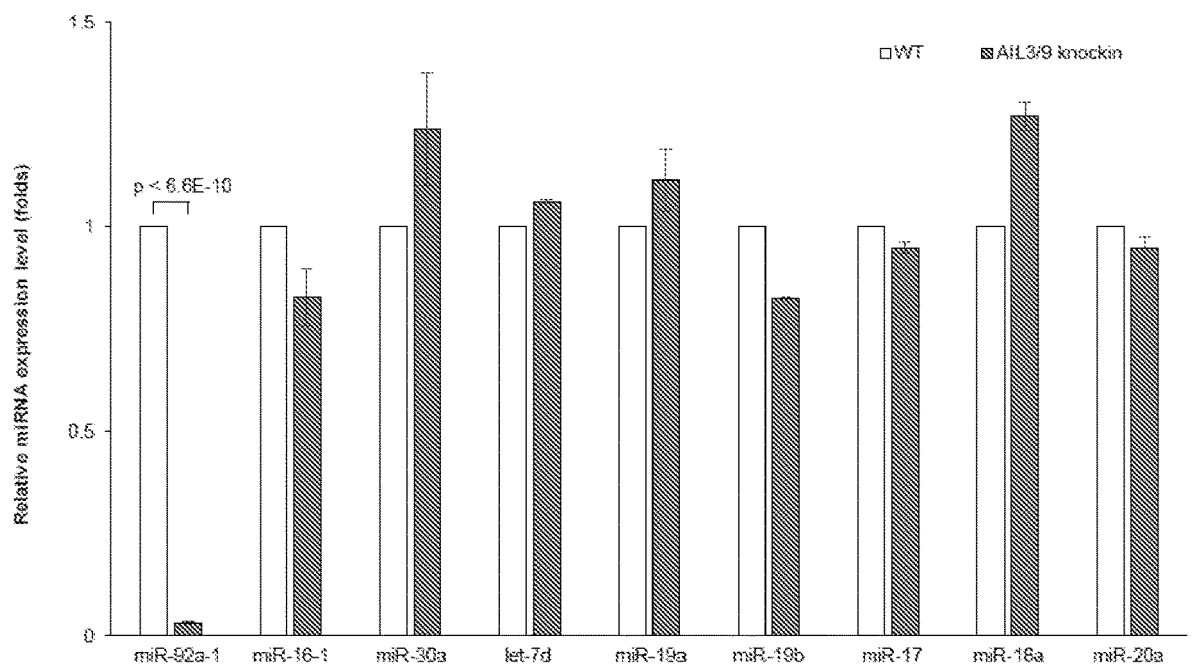

After validating the effect of the AIL on the Microprocessor's single cut activity in vitro and miRNA expression in human cells using the transfection system, an experiment was designed to edit the genome region encoding for the AIL region using CRISPR-Cas9 technique (FIG. 7A). Single guide RNA (sgRNA) that guides Cas9 to cut the genomic site at proximity of the AIL region will be synthesized. The sgRNA will be synthesized using T7 RNA polymerases. Subsequently, the resulting Cas9-sgRNA complex will be reconstituted in vitro. Donor ssDNAs (~150 nt) containing the mutant DNA region that adds or deletes nucleotides from the AIL region will be used. The mixture of Cas9-sgRNA and donor ssDNA will be transfected into human cells using electroporation. After that, the single cell that contains the expected knock-in sequence in the genome will be isolated.

The above can be summarized as a three-step experiment:
Step 1: Examine the effects of pri-miRNA with AIL regions of various sizes using the pri-miRNA processing assay, and select the pri-miRNA with the appropriate size of the ALL region that produce the outcome of your choice (either to increase or decrease the single cut product).
Step 2: Transfect the plasmid containing pri-miRNA with the appropriate size of the ALL region to human cells, and confirm that the outcome of your choice (either to increase or decrease the single cut product) is also produced in human cells.
Step 3: Perform the gene-editing experiments with sgRNA and proper donor ssDNAs to generate the pri-miRNA with the appropriate size of the AIL region that were selected and confirmed from steps 1 and 2. Finally, evaluate the effect of the pri-miRNA with the appropriate size of the AIL region in the edited cells.

Description of SEQ ID

Table 4 below details the SEQ ID NOs referenced herein and their corresponding sequences. A brief description of the sequences is also provided. F1 represents the fragment from 5' end to 5' cleavage site; F2 represents the fragment between 5' and 3' cleavage sites, which is the (double cut precursor microRNA (pre-miRNA)); and F3 represents the fragment from 3' cleavage site to 3' end.

| SEQ ID NO | Sequence (5' to 3') | Description |
|---|---|---|
| 1 | GGGAAACUCAAACCCCUUUCUACACAGGUUGGGAUC GGUUGCAAUGCUGUGUUUCUGUAUGGUAUUGCACU UGUCCCGGCCUGUUGAGUUUGGUGGGGAUUGUGA | Pri-mir-92a-1; Pri-mir-92a-1 AIL3/6 (WT) |
| 2 | GGGAAACUCAAACCCCUUUCUACAC | Pri-mir-92a-1 F1; Pri-mir-92a-1 AIL3/6 (WT) F1; Pri-mir-92a-1 AIL3/8 F1; Pri-mir-92a-1 AIL3/9 F1; Pri-mir-92a-1 AIL3/3 F1; Pri-mir-92a-1 AIL2/2 F1; Pri-mir-92a-1 AIL1/1 F1 |
| 3 | AGGUUGGGAUCGGUUGCAAUGCUGUGUUUCUGUAU GGUAUUGCACUUGUCCCGGCCUGU | Pri-mir-92a-1 F2; Pri-mir-92a-1 AIL3/8 F2; Pri-mir-92a-1 AIL3/9 F2; Pri-mir-92a-1 AIL3/6 (WT) F2; Pri-mir-92a-1 AIL3/3 F2; Pri-mir-92a-1 AIL2/2 F2; Pri-mir-92a-1 AIL1/1 F2 |
| 4 | UGAGUUUGGUGGGGAUUGUGA | Pri-mir-92a-1 F3; Pri-mir-92a-1 AIL3/6 (WT) F3 |
| 5 | GGGUAACAGGAUGGCUGUGAGUUGGCUUAAUCUCA GCUGGCAACUGUGAGAUGUUCAUACAAUCCCUCACA GUGGUCUCUGGGAUUAUGCUAAACAGAGCAAUUUCC UA | Pri-mir-216a; Pri-mir-216a AIL2/1 (WT) |
| 6 | GGGUAACAGGAUGGCUGUGAGUUGGCU | Pri-mir-216a F1; Pri-mir-216a A IL2/1 (WT) F1; Pri-mir-216a AIL2/2 F1 |
| 7 | UAAUCUCAGCUGGCAACUGUGAGAUGUUCAUACAAU CC CUCACAGUGGUCUCUGGGAUUAU | Pri-mir-216a F2; Pri-mir-216a AIL2/1 (WT) F2; Pri-mir-216a AIL0/0 F2; Pri-mir-216a AIL2/2 F2; Pri-mir-216a |

| SEQ ID NO | Sequence (5' to 3') | Description |
|---|---|---|
| | | AIL6/2 F2; Pri-mir-216a AIL8/2 F2 |
| 8 | GCUAAACAGAGCAAUUUCCUA | Pri-mir-216a F3; Pri-mir-216a AIL2/1 (WT) F3 |
| 9 | GGGAUUACAUAGUUUUUGAUGUCGCAGAUACUGCAUCAGGAACUGAUUGGAUAAGAAUCAGUCACCAUCAGUUCCUAAUGCAUUGCCUUCAGCAUCUAAACAAGCACC | Pri-mir-217; Pri-mir-217 AIL3/3 (WT) |
| 10 | GGGAUUACAUAGUUUUUGAUGUCGCAGA | Pri-mir-217 F1; Pri-mir-217 AIL3/3 (WT) F1; Pri-mir-217 AIL0/0 F1 |
| 11 | UACUGCAUCAGGAACUGAUUGGAUAAGAAUCAGUCACCAUCAGUUCCUAAUGCAUUGCC | Pri-mir-217 F2; Pri-mir-217 AIL3/3 (WT) F2; Pri-mir-217 AIL0/0 F2; Pri-mir-217 AIL5/3 F2 |
| 12 | UUCAGCAUCUAAACAAGCACC | Pri-mir-217 F3; Pri-mir-217 AIL3/3 (WT) F3; Pri-mir-217 AIL5/3 F3 |
| 13 | GGGAUUACAUAGUUUUUGAUGUCGCAGAUACUGCAUCAGGA | Pri-mir-217 unproductive product 1; Pri-mir-217 AIL3/3 (WT) unproductive product 1; Pri-mir-217 AIL0/0 unproductive product 1 |
| 14 | ACUGAUUGGAUAAGAAUCAGUCACCAUCAGUUC | Pri-mir-217 unproductive product 2; Pri-mir-217 AIL3/3 (WT) unproductive product 2; Pri-mir-217 AIL0/0 unproductive product 2; Pri-mir-217 AIL5/3 unproductive product 2 |
| 15 | CUAAUGCAUUGCCUUCAGCAUCUAAACAAGCACC | Pri-mir-217 unproductive product 3; Pri-mir-217 AIL3/3 (WT) unproductive product 3; Pri-mir-217 AIL5/3 unproductive product 3 |

| SEQ ID NO | Sequence (5' to 3') | Description |
|---|---|---|
| 16 | GGGAGCCCUCCAGGGUAAGUGGAAAGAUGGUGGGCC GCAGAACAUGUGCUGAGUUCGUGCCAUAUGUCUGCU GACCAUCACCUUUAGAAGCCCCCUUUCGCUGAG | Pri-mir-654 |
| 17 | GGGAGCCCUCCAGGGUAAGUGGAAAGA | Pri-mir-654 F1 |
| 18 | UGGUGGGCCGCAGAACAUGUGCUGAGUUCGUGCCAU AUGUCUGCUGACCAUCACCUU | Pri-mir-654 F2 |
| 19 | UAGAAGCCCCCUUUCGCUGAG | Pri-mir-654 F3 |
| 20 | GGGAGCCCUCCAGGGUAAGUGGAAAGAUGGUGGGCC GCAG | Pri-mir-654 unproductive product 1 |
| 21 | AACAUGUGCUGAGUUCGUGCCAUAUGUCU | Pri-mir-654 unproductive product 2 |
| 22 | GCUGACCAUCACCUUUAGAAGCCCCCUUUCGCUGAG | Pri-mir-654 unproductive product 3 |
| 23 | GGGCGGACCCAGCUCGGGCAGCCGUGGCCAUCUUAC UGGGCAGCAUUGGAUGGAGUCAGGUCUCUAAUACUG CCUGGUAAUGAUGACGGCGGAGCCCUGCACGCAGC | Pri-mir-200b |
| 24 | GGGCGGACCCAGCUCGGGCAGCCGUGGCC | Pri-mir-200b F1 |
| 25 | AUCUUACUGGGCAGCAUUGGAUGGAGUCAGGUCUCU AAUACUGCCUGGUAAUGAUGA | Pri-mir-200b F2 |
| 26 | CGGCGGAGCCCUGCACGCAGC | Pri-mir-200b F3 |
| 27 | GGGCCCUCCCCCUCAUCCCUGGUCCUCCUGGUCCCUG UCUGUCUGUCUGUCGGGUCUGUCCACCUGCCGCGCC CCCCGGGCUGAGGUAGGAGGUUGUAUAGUUGAGGA GGACACCCAAGGAGAUCACUAUACGGCCUCCUAGCU UUCCCCAGGCUGCGCCCUGCACGGGACGGGGCCCGG CGGGGACCCCCAGCCCCA | Pri-let-7e |
| 28 | GGGCCCUCCCCCUCAUCCCUGGUCCUCCUGGUCCCUG UCUGUCUGUCUGUCGGGUCUGUCCACCUGCCGCGCC CCCCGGGC | Pri-let-7e F1 |
| 29 | UGAGGUAGGAGGUUGUAUAGUUGAGGAGGACACCC AAGGAGAUCACUAUACGGCCUCCUAGCUUUCC | Pri-let-7e F2 |
| 30 | CCAGGCUGCGCCCUGCACGGGACGGGGCCCGGCGGG GACCCCCAGCCCCA | Pri-let-7e F3 |
| 31 | GGGUUGGAUUAAUGGUUGUAAUAUUUUAUUUUCAG ACAUGUCACAGCCCCAAAAGAGAAGAUAUUGAGG CCUGUUGCCACAAACCCGUAGAUCCGAACUUGUGGU AUUAGUCCGCACAAGCUUGUAUCUAUAGGUAUGUGU CUGUUAGGCAAUCUCACGGACCUGGGGCUUUGCUUA UAUGCCAUUCA | Pri-mir-100 |
| 32 | GGGUUGGAUUAAUGGUUGUAAUAUUUUAUUUUCAG ACAUGUCACAGCCCCAAAAGAGAAGAUAUUGAGG CCUGUUGCCACA | Pri-mir-100 F1 |
| 33 | AACCCGUAGAUCCGAACUUGUGGUAUUAGUCCGCAC AAGCUUGUAUCUAUAGGUAUG | Pri-mir-100 F2 |
| 34 | UGUCUGUUAGGCAAUCUCACGGACCUGGGGCUUUGC UUAUAUGCCAUUCA | Pri-mir-100 F3 |
| 35 | GGGAAAGAGCCCAAUGUAUGCUGGAUUUAGUAAGA UUUGGGCCCUCCCAACCCUCACGACCUUCUGUGACC CCUUAGAGGAUGACUGAUUUCUUUUGGUGUUCAGA | Pri-mir-29a |

| SEQ ID NO | Sequence (5' to 3') | Description |
|---|---|---|
| | GUCAAUAUAAUUUUCUAGCACCAUCUGAAAUCGGUU AUAAUGAUUGGGGAAGAGCACCAUGAUGCUGACUGC UGAGAGGAAAUGUAU | |
| 36 | GGGAAAGAGCCCAAUGUAUGCUGGAUUUAGUAAGA UUUGGGCCCUCCCAACCCUCACGACCUUCUGUGACC CCUUAGAGGAUG | Pri-mir-29a F1 |
| 37 | ACUGAUUUCUUUUGGUGUUCAGAGUCAAUAUAAUU UUCUAGCACCAUCUGAAAUCGGUUA | Pri-mir-29a F2 |
| 38 | UAAUGAUUGGGGAAGAGCACCAUGAUGCUGACUGCU GAGAGGAAAUGUAU | Pri-mir-29a F3 |
| 39 | GGGUGUUUGAGUGUGGUGGUUCCUACCUAAUCAGCA AUUGCGUUAACGCCCACACUGUGUGCAGUUCUUGGC UACAGGCCAUUACUGUUGCUAAUAUGCAACUCUGUU GAAUAUAAAUUGGAAUUGCACUUUAGCAAUGGGUGA UGGAUUGUUAAGCCAAUGACAGAAUUUAAACCACAG ACUUACUUUGAUAG | Pri-mir-367 |
| 40 | GGGUGUUUGAGUGUGGUGGUUCCUACCUAAUCAGCA AUUGCGUUAACGCCCACACUGUGUGCAGUUCUUGGC UACAGGCCAUU | Pri-mir-367 F1 |
| 41 | ACUGUUGCUAAUAUGCAACUCUGUUGAAUAUAAAU UGGAAUUGCACUUUAGCAAUGGGUGA | Pri-mir-367 F2 |
| 42 | UGGAUUGUUAAGCCAAUGACAGAAUUUAAACCACAG ACUUACUUUGAUAG | Pri-mir-367 F3 |
| 43 | GGGUUUCUGUCUCCCAUCCCCUUCAGAUACUUACAG AUACUGUAAAGUGAGUAGAAUUCUGAGUUUUGAGG UUGCUUCAGUGAACAUUCAACGCUGUCGGUGAGUUU GGAAUUAAAAUCAAAACCAUCGACCGUUGAUUGUAC CCUAUGGCUAACCAUCAUCUACUCCAUGGUGCUCAG AAUUCGCUGAAGACA | Pri-mir-181a-1; Pri-mir-181a-1 AIL2/2 (WT) |
| 44 | GGGUUUCUGUCUCCCAUCCCCUUCAGAUACUUACAG AUACUGUAAAGUGAGUAGAAUUCUGAGUUUUGAGG UUGCUUCAGUG | Pri-mir-181a-1 F1; Pri-mir-181a-1 AIL2/2 (WT) F1; Pri-mir-181a-1 AIL0/0 F1; Pri-mir-181a-1 AIL2/5 F1 |
| 45 | AACAUUCAACGCUGUCGGUGAGUUUGGAAUUAAAA UCAAAACCAUCGACCGUUGAUUGUACC | Pri-mir-181a-1 F2; Pri-mir-181a-1 AIL2/2 (WT) F2; Pri-mir-181a-1 AIL0/0 F2; Pri-mir-181a-1 AIL2/5 F2 |
| 46 | CUAUGGCUAACCAUCAUCUACUCCAUGGUGCUCAGA AUUCGCUGAAGACA | Pri-mir-181a-1 F3; Pri-mir-181a-1 AIL2/2 (WT) F3 |
| 47 | GGGAAGUACUGCUAGCUGUAGAACUCCAGCUUCGGC CUGUCGCCCAAUCAAACUGUCCUGUUACUGAACACU GUUCUAUGGUUAGUUUUGCAGGUUUGCAUCCAGCUG UGUGAUAUUCUGCUGUGCAAAUCCAUGCAAAACUGA CUGUGGUAGUGAAAAGUCUGUAGAAAAGUAAGGGA AACUCAAACCCCUUU | Pri-mir-19b-1 |
| 48 | GGGAAGUACUGCUAGCUGUAGAACUCCAGCUUCGGC CUGUCGCCCAAUCAAACUGUCCUGUUACUGAACACU GUUCUAUGGUU | Pri-mir-19b-1 F1 |

-continued

| SEQ ID NO | Sequence (5' to 3') | Description |
|---|---|---|
| 49 | AGUUUUGCAGGUUUGCAUCCAGCUGUGUGAUAUUCU GCUGUGCAAAUCCAUGCAAAACUGA | Pri-mir-19b-1 F2 |
| 50 | CUGUGGUAGUGAAAAGUCUGUAGAAAAGUAAGGGA AACUCAAACCCCUUU | Pri-mir-19b-1 F3 |
| 51 | GGGAAACUCAAACCCCUUUCUACACAGGUUGGGAUC GGUUGCAAUGCUGUGUUUCUGUAUGGUAUUGCACU UGUCCCGGCCUGUUGAGUUUUUGGUGGGGAUUGUG A | Pri-mir-92a-1 AIL3/8 |
| 52 | UGAGUUUUUGGUGGGGAUUGUGA | Pri-mir-92a-1 AIL3/8 F3 |
| 53 | GGGAAACUCAAACCCCUUUCUACACAGGUUGGGAUC GGUUGCAAUGCUGUGUUUCUGUAUGGUAUUGCACU UGUCCCGGCCUGUUGAGUUUUUUGGUGGGGAUUGU GA | Pri-mir-92a-1 AIL3/9 |
| 54 | UGAGUUUUUUGGUGGGGAUUGUGA | Pri-mir-92a-1 AIL3/9 F3 |
| 55 | GGGAAACUCAAACCCCUUUCUACACAGGUUGGGAUC GGUUGCAAUGCUGUGUUUCUGUAUGGUAUUGCACU UGUCCCGGCCUGUUGAGUUUGGGGAUUGUGA | Pri-mir-92a-1 AIL3/3 |
| 56 | UGAGUUUGGGGAUUGUGA | Pri-mir-92a-1 AIL3/3 F3 |
| 57 | GGGAAACUCAAACCCCUUUCUACACAGGUUGGGAUC GGUUGCAAUGCUGUGUUUCUGUAUGGUAUUGCACU UGUCCCGGCCUGUUGAGUUGGGGGAUUGUGA | Pri-mir-92a-1 AIL2/2 |
| 58 | UGAGUUGGGGGAUUGUGA | Pri-mir-92a-1 AIL2/2 F3 |
| 59 | GGGAAACUCAAACCCCUUUCUACACAGGUUGGGAUC GGUUGCAAUGCUGUGUUUCUGUAUGGUAUUGCACU UGUCCCGGCCUGUUGAGGGUGGGGAUUGUGA | Pri-mir-92a-1 AIL1/1 |
| 60 | UGAGGGUGGGGAUUGUGA | Pri-mir-92a-1 AIL1/1 F3 |
| 61 | GGGCUAGCAGCACUACAAUGCUUUGCUAGAGCUGGU AAAAUGGAACCAAAUCGCCUCUUCAAUGGAUUUGGU CCCCUUCAACCAGCUGUAGCUAUGCAUUGAUUACU | Pri-mir-133a-1 AIL3/3 (WT) |
| 62 | GGGCUAGCAGCACUACAAUGCUUUGCUAG | Pri-mir-133a-1 AIL3/3 (WT) F1; Pri-mir-133a-1 AIL3/7 F1 |
| 63 | AGCUGGUAAAAUGGAACCAAAUCGCCUCUUCAAUGG AUUUGGUCCCCUUCAACCAGCUG | Pri-mir-133a-1 AIL3/3 (WT) F2; Pri-mir-133a-1 AIL0/0 F2; Pri-mir-133a-1 AIL7/3 F2 |
| 64 | UAGCUAUGCAUUGAUUACU | Pri-mir-133a-1 AIL3/3 (WT) F3; Pri-mir-133a-1 AIL0/0 F3; Pri-mir-133a-1 AIL7/3 F3 |
| 65 | GGGCUAGCAGCACUACAAUGCLUUGCUAGAGCUGGU AAAAU | Pri-mir-133a-1 AIL3/3 (WT) unproductive product 1; Pri-mir-133a-1 AIL3/7 |

| SEQ ID NO | Sequence (5' to 3') | Description |
|---|---|---|
| | | unproductive product 1 |
| 66 | GGAACCAAAUCGCCUCUUCAAUGGAUUUGGUCCCCU | Pri-mir-133a-1 AIL3/3 (WT) unproductive product 2; Pri-mir-133a-1 AIL0/0 unproductive product 2; Pri-mir-133a-1 AIL7/3 unproductive product 2; Pri-mir-133a-1 AIL3/7 unproductive product 2 |
| 67 | UCAACCAGCUGUAGCUAUGCAUUGAUUACU | Pri-mir-133a-1 AIL3/3 (WT) unproductive product 3; Pri-mir-133a-1 AIL0/0 unproductive product 3; Pri-mir-133a-1 AIL7/3 unproductive product 3 |
| 68 | GGGCUAGCAGCACUACAAUGCGUAGCUAGAGCUGGUAAAAUGGAACCAAAUCGCCUCUUCAAUGGAUUUGGUCCCCUUCAACCAGCUGUAGCUAUGCAUUGAUUACU | Pri-mir-133a-1 AIL0/0 |
| 69 | GGGCUAGCAGCACUACAAUGCGUAGCUAG | Pri-mir-133a-1 AIL0/0 F1 |
| 70 | GGGCUAGCAGCACUACAAUGCGUAGCUAGAGCUGGUAAAAU | Pri-mir-133a-1 AIL0/0 unproductive product 1 |
| 71 | GGGCUAGCAGCACUACAAUGCGCUAGAGCUGGUAAAAUGGAACCAAAUCGCCUCUUCAAUGGAUUUGGUCCCCUUCAACCAGCUGUAGCUAUGCAUUGAUUACU | Pri-mir-133a-1 AIL7/3 |
| 72 | GGGCUAGCAGCACUACAAUGCUUUUUUUGCUAG | Pri-mir-133a-1 AIL7/3 F1 |
| 73 | GGGCUAGCAGCACUACAAUGCGCUAGAGCUGGUAAAAU | Pri-mir-133a-1 AIL7/3 unproductive product 1 |
| 74 | GGGCUAGCAGCACUACAAUGCUUUGCUAGAGCUGGUAAAAUGGAACCAAAUCGCCUCUUCAAUGGAUUUGGUCCCCUUCAACCAGCUGUAGCUUUUUAUGCAUUGAUUACU | Pri-mir-133a-1 AIL3/7 |
| 75 | GCUGGUAAAAUGGAACCAAAUCGCCUCUUCAAUGGAUUUGGUCCCCUUCAACCAGCUG | Pri-mir-133a-1 AIL3/7 F2 |
| 76 | UAGCUUUUUAUGCAUUGAUUACU | Pri-mir-133a-1 AIL3/7 F3 |
| 77 | UCAACCAGCUGUAGCUUUUUAUGCAUUGAUUACU | Pri-mir-133a-1 AIL3/7 unproductive product 3 |

-continued

| SEQ ID NO | Sequence (5' to 3') | Description |
|---|---|---|
| 78 | GGGAUUACAUAGUUUUUGAUGUCGCAGAUACUGCAUCAGGAACUGAUUGGAUAAGAAUCAGUCACCAUCAGUUCCUAAUGCAUUGCCUGCGGCAUCUAAACAAGCACC | Pri-mir-217 AIL0/0 |
| 79 | UGCGGCAUCUAAACAAGCACC | Pri-mir-217 AIL0/0 F3 |
| 80 | CUAAUGCAUUGCCUGCGGCAUCUAAACAAGCACC | Pri-mir-217 AIL0/0 unproductive product 3 |
| 81 | GGGAUUACAUAGUUUUUGAUGUCGCUUAGAUACUGCAUCAGGAACUGAUUGGAUAAGAAUCAGUCACCAUCAGUUCCUAAUGCAUUGCCUUCAGCAUCUAAACAAGCACC | Pri-mir-217 AIL5/3 |
| 82 | GGGAUUACAUAGUUUUUGAUGUCGCUUAGA | Pri-mir-217 AIL5/3 F1 |
| 83 | GGGAUUACAUAGUUUUUGAUGUCGCUUAGAUACUGCAUCAGGA | Pri-mir-217 AIL5/3 unproductive product 1 |
| 84 | GGGAGGGUGGGGUGGAGGCAAGCAGAGGACUUCCUGAUCGCGUACCCAUGGCUACAGUCUUUCUUCAUGUGACUCGUGGACUUCCCUUUGUCAUCCUAUGCCUGAGAAUAUAUGAAGGAGGCUGGGAAGGCAAAGGGACGUUCAAUUGUCAUCACUGGCAUCUUUUUUGAUCAUUGCACCAUCAUCAAAUG | Pri-mir-204 AIL3/3 (WT) |
| 85 | GGGAGGGUGGGGUGGAGGCAAGCAGAGGACUUCCUGAUCGCGUACCCAUGGCUACAGUCUUUCUUCAUGUGACUCGUGGAC | Pri-mir-204 AIL3/3 (WT) F1; Pri-mir-204 AIL1/1 F1; Pri-mir-204 AIL3/5 F1 |
| 86 | UUCCCUUUGUCAUCCUAUGCCUGAGAAUAUAUGAAGGAGGCUGGGAAGGCAAAGGGACGU | Pri-mir-204 AIL3/3 (WT) F2; Pri-mir-204 ALL1/1 F2; Pri-mir-204 AIL3/5 F2 |
| 87 | UCAAUUGUCAUCACUGGCAUCUUUUUUGAUCAUUGCACCAUCAUCAAAUG | Pri-mir-204 AIL3/3 (WT) F3 |
| 88 | GGGAGGGUGGGGUGGAGGCAAGCAGAGGACUUCCUGAUCGCGUACCCAUGGCUACAGUCUUUCUUCAUGUGACUCGUGGACUUCCCUUUGUCAUCCUAUGCCUGAGAAUAUAUGAAGGAGGCUGGGAAGGCAAAGGGACGUUCAAGAGUCAUCACUGGCAUCUUUUUUGAUCAUUGCACCAUCAUCAAAUG | Pri-mir-204 AIL1/1 |
| 89 | UCAAGAGUCAUCACUGGCAUCUUUUUUGAUCAUUGCACCAUCAUCAAAUG | Pri-mi r-204 AIL1/1 F3 |
| 90 | GGGAGGGUGGGGUGGAGGCAAGCAGAGGACUUCCUGAUCGCGUACCCAUGGCUACAGUCUUUCUUCAUGUGACUCGUGGACUUCCCUUUGUCAUCCUAUGCCUGAGAAUAUAUGAAGGAGGCUGGGAAGGCAAAGGGACGUUCAAAUUGUCAUCACUGGCAUCUUUUUUGAUCAUUGCACCAUCAUCAAAUG | Pri-mir-204 AIL3/5 |
| 91 | UCAAAUUGUCAUCACUGGCAUCUUUUUUGAUCAUUGCACCAUCAUCAAAUG | Pri-mir-204 AIL3/5 F3 |
| 92 | GGGUUUCUGUCUCCCAUCCCCUUCAGAUACUUACAGAUACUGUAAAGUGAGUAGAAUUCUGAGUUUUGAGGUUGCUUCAGUGAACAUUCAACGCUGUCGGUGAGUUU | Pri-mir-181a-1 AIL0/0 |

| SEQ ID NO | Sequence (5' to 3') | Description |
|---|---|---|
|  | GGAAUUAAAAUCAAAACCAUCGACCGUUGAUUGUAC CCUGAGGCUAACCAUCAUCUACUCCAUGGUGCUCAG AAUUCGCUGAAGACA |  |
| 93 | CUGAGGCUAACCAUCAUCUACUCCAUGGUGCUCAGA AUUCGCUGAAGACA | Pri-mi r-181a-1 AIL0/0 F3 |
| 94 | GGGUUUCUGUCUCCCAUCCCCUUCAGAUACLTUACAG AUACUGUAAAGUGAGUAGAAUUCUGAGUUUUGAGG UUGCUUCAGUGAACAUUCAACGCUGUCGGUGAGUUU GGAAUUAAAAUCAAAACCAUCGACCGUUGAUUGUAC CCUAAAAUGGCUAACCAUCAUCUACUCCAUGGUGCU CAGAAUUCGCUGAAGACA | Pri-mir-181a-1 AIL2/5 |
| 95 | CUAAAAUGGCUAACCAUCAUCUACUCCAUGGUGCUC AGAAUUCGCUGAAGACA | Pri-mir-181a-1 AIL2/5 F3 |
| 96 | GGGUAACAGGAUGGCUGUGAGUUGGCUUAAUCUCA GCUGGCAACUGUGAGAUGUUCAUACAAUCCCUCACA GUGGUCUCUGGGAUUAUGCUAACUCAGAGCAAUUUC CUA | Pri-mir-216a AIL0/0 |
| 97 | GGGUAACACGGAUGGCUGUGAGUUGGCU | Pri-mir-216a AIL0/0 F1 |
| 98 | GCUAACUCAGAGCAAUUUCCUA | Pri-mir-216a AIL0/0 F3 |
| 99 | GGGUAACAGGAUGGCUGUGAGUUGGCUUAAUCUCA GCUGGCAACUGUGAGAUGUUCAUACAAUCCCUCACA GUGGUCUCUGGGAUUAUGCUAAAACAGAGCAAUUUC CUA | Pri-mir-216a AIL2/2 |
| 100 | GCUAAAACAGAGCAAUUUCCUA | Pri-mir-216a AIL2/2 F3; Pri-mir-216a AIL6/2 F3; Pri-mir-216a AIL8/2 F3 |
| 101 | GGGUAACAGGAUGGCUGUGAAAAAGUUGGCUUAAU CUCAGCUGGCAACUGUGAGAUGUUCAUACAAUCCCU CACAGUGGUCUCUGGGAUUAUGCUAAAACAGAGCAA UUUCCUA | Pri-mir-216a AIL6/2 |
| 102 | GGGUAACAGGAUGGCUGUGAAAAAGUUGGCU | Pri-mir-216a AIL6/2 F1 |
| 103 | GGGUAACAGGAUGGCUGUGAAAAAGUUGGCUUAAU CUCAGCUG | Pri-mir-216a AIL6/2 unproductive product 1 |
| 104 | GCAACUGUGAGAUGLTUCAUACAAUCCCUCACAGUGG UCU | Pri-mir-216a AIL6/2 unproductive product 2; Pri-mir-216a AIL8/2 unproductive product 2 |
| 105 | CUGGGAUUAUGCUAAAACAGAGCAAUUUCCUA | Pri-mir-216a AIL6/2 Vunproductive product 3; Pri-mir-216a AIL8/2 unproductive product 3 |
| 106 | GGGUAACAGGAUGGCUGUGAAAAAAGUUGGCUUA AUCUCAGCUGGCAACUGUGAGAUGUUCAUACAAUCC CUCACAGUGGUCUCUGGGAUUAUGCUAAAACAGAGC AAUUUCCUA | Pri-mir-216a AIL8/2 |

-continued

| SEQ ID NO | Sequence (5' to 3') | Description |
|---|---|---|
| 107 | GGGUAACAGGAUGGCUGUGAAAAAAAGUUGGCU | Pri-mir-216a AIL8/2 F1 |
| 108 | GGGUAACAGGAUGGCUGUGAAAAAAAGUUGGCUUAAUCUCAGCUG | Pri-mir-216a AIL8/2 unproductive product 1 |

The invention claimed is:

1. A method of decreasing production levels of single cut precursor microRNA (pre-miRNA) and increasing production of double cut precursor microRNA (pre-miRNA) in a host cell from a primary microRNA (pri-miRNA) comprising the following structure:

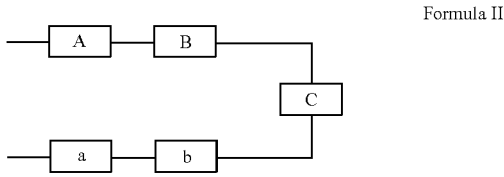

Formula II wherein [A] to [a] is in the 5' to 3' directionality to form a stem loop structure, and wherein:
  motifs [A] and [a] constitute the asymmetric internal loop (AIL) region in the stem region;
  motifs [B] and [b] each constitute a cleavage site in the stem region;
  motif [C] constitute a loop region;

the method comprising:
  a) introducing one or more mutations at one or both of motifs [A] and [a] to modulate the size of the asymmetric internal loop (AIL) region;
  b) transfecting the primary microRNA (pri-miRNA) from step b) to the host cell;
  c) producing one or both single cut precursor microRNA (pre-miRNA) and double cut precursor microRNA (pre-miRNA) by controlling cleaving at one or both motifs [B] and [b];
  wherein the single cut precursor microRNA (pre-miRNA) is produced from cleaving at motif [B];
  wherein the double cut precursor microRNA (pre-miRNA) is produced from cleaving at motifs [B] and [b].

2. The method of claim 1, wherein the one or more mutations in step a) comprises deletion and/or substitution of at least one nucleotide to decrease the size of one or both motifs [A] and [a].

3. The method of claim 2, wherein the one or more mutations comprises deletion of 1 to 9 nucleotides in one or both motifs [A] and [a].

4. The method of claim 2, wherein the one or more mutations comprise deletion of 1 to 9 nucleotides in motif [A].

5. The method of claim 2, wherein the one or more mutations comprise deletion of 1 to 9 nucleotides in motif [a].

6. The method of claim 1, wherein the one or more mutations comprise substitution of at least one nucleotide in one or both motifs [A] and [a] to produce at least one matched pair in the asymmetric internal loop (AIL) region.

7. The method of claim 6, wherein 1-9 nucleotides is substituted in motif [A].

8. The method of claim 6, wherein 1-9 nucleotides is substituted in motif [a].

9. A method of modulating expression levels of microRNA (miRNA) in a host cell comprising modulating expression levels of one or both of single cut precursor microRNA (pre-miRNA) and double cut precursor microRNA (pre-miRNA) using the method of claim 1.

10. The method of claim 9, wherein increasing the expression levels of single cut precursor microRNA (pre-miRNA) decreases the expression levels of microRNA (miRNA) in a host cell.

11. The method of claim 9, wherein increasing the expression levels of double cut precursor microRNA (pre-miRNA) increases the expression levels of microRNA (miRNA) in a host cell.

12. A method of modulating expression levels of microRNA (miRNA) in a subject comprising modulating expression levels of one or both of single cut precursor microRNA (pre-miRNA) and double cut precursor microRNA (pre-miRNA) using the method of claim 1.

13. The method of claim 12 further comprising a step of detecting the absence or presence of a microRNA (miRNA) of a sample obtained from the subject.

14. A genetically modified primary microRNA (pri-miRNA) comprising the following structure:

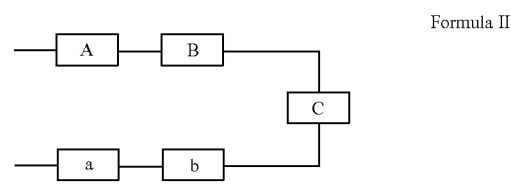

Formula II wherein [A] to [a] is in the 5' to 3' directionality to form a stem loop structure, and wherein:
motifs [A] and [a] constitute an asymmetric internal loop (AIL) region in the stem region;
motifs [B] and [b] each constitute a cleavage site in the stem region;
motif [C] constitute a loop region;
wherein one or both motifs [A] and [a] comprise 0-9 nucleotides;
wherein motif [A] comprises at least 1 nucleotide that does not match to any nucleotide in motif [a]; or
wherein motif [a] comprises at least 1 nucleotide that does not match to any nucleotide in motif [A];
wherein the AIL region is genetically modified to modulate the size of the AIL region.

15. The genetically modified primary microRNA (pri-miRNA) of claim 14, wherein motif [a] comprises 1-9 nucleotides more than motif [A] to create a larger bulge on motif [a]; or wherein motif [A] comprises at least 1-9 nucleotides more than motif [a] to create a larger bulge on motif [A].

16. The genetically modified primary microRNA (pri-miRNA) of claim 15, wherein motif [a] comprises 6 nucleotides more than motif [A] to create a larger bulge on motif [a].

* * * * *